(12) United States Patent
Tomigashi

(10) Patent No.: US 7,482,777 B2
(45) Date of Patent: Jan. 27, 2009

(54) MOTOR CONTROL DEVICE

(75) Inventor: Yoshio Tomigashi, Hirakata (JP)

(73) Assignee: SANYO Electric Co., Ltd., Osaka (JP)

(*) Notice: Subject to any disclaimer, the term of this patent is extended or adjusted under 35 U.S.C. 154(b) by 0 days.

(21) Appl. No.: 12/032,482

(22) Filed: Feb. 15, 2008

(65) Prior Publication Data
US 2008/0197799 A1 Aug. 21, 2008

(30) Foreign Application Priority Data
Feb. 15, 2007 (JP) ............... 2007-034607

(51) Int. Cl.
H02P 23/00 (2006.01)
(52) U.S. Cl. .................. 318/807; 318/809; 318/400.02; 318/805
(58) Field of Classification Search ................. 318/807, 318/809, 400.02, 801, 798, 805, 812
See application file for complete search history.

(56) References Cited

U.S. PATENT DOCUMENTS

| 2004/0257030 | A1 | 12/2004 | Taguchi et al. | |
| 2008/0100253 | A1* | 5/2008 | Kiyamura | 318/696 |

FOREIGN PATENT DOCUMENTS

| EP | 1280266 | A2 | 1/2003 |
| EP | 1376849 | A1 | 1/2004 |
| EP | 1401093 | A2 | 3/2004 |
| JP | 02-197295 | | 8/1990 |
| JP | 2003-189670 | | 7/2003 |
| JP | 2004-282873 | A | 10/2004 |

OTHER PUBLICATIONS

Shinji Shinnaka; A New High-Frequency Voltage Injection Method for Sensorless Drive of Permanent-Magnet Synchronous Motors with Pole Saliency; Institute of Electrical Engineers of Japan, Papers D, 2006, vol. 126-11, pp. 1572-1584.

(Continued)

Primary Examiner—Karen Masih
(74) Attorney, Agent, or Firm—Ditthavong Mori & Steiner, P.C.

(57) ABSTRACT

The motor control device includes a current detecting portion for detecting a phase current that flows in an armature winding of a stator of a three-phase motor based on current that flows between an inverter for driving the motor and a DC power supply. The motor control device performs a position sensorless vector control for the motor based on a control current that is obtained by a three-phase to two-phase conversion of the phase current based on an estimated rotor position of the motor. The motor control device further includes a superposing portion for superposing a superposed voltage having a predetermined frequency on a drive voltage for driving the motor and an estimating portion for deriving the estimated rotor position based on the superposed current that is extracted from the control current and flows in the motor in accordance with the superposed voltage. A voltage vector locus of the superposed voltage from the superposing portion presents an ellipse.

10 Claims, 28 Drawing Sheets

OTHER PUBLICATIONS

Hajime Hida, et al.; Position Sensorless Vector Control for Permanent Magnet Synchronous Motors Based on Maximum Torque Control Frame; Institute of Electrical Engineers, Industrial Application Department Conference Lecture Papers, Aug. 2006, pp. 385-388 (I-385-I-388).

Takaharu Takeshita, et al.; Parameter Measurement of Sensorless Permanent Magnet Synchronous Motor; Institute of Electrical Engineers of Japan, Papers D, 1999, vol. 119-10, pp. 1184-1191.

Shigeo Morimoto, et al.; Parameter Identification of PM Motor System at Standstill; Institute of Electrical Engineers of Japan, Papers D, 2003, vol. 123-9, pp. 1081-1082.

Naomitsu Urasaki, et al.; On-Line Dead-Time Compensation Method for Permanent Magnet Synchronous Motor Drive; Institute of Electrical Engineers of Japan, Industrial Application Department, 2002 Convention Lecture Papers, 2002, pp. 1491-1496.

* cited by examiner

| U | V | W | BUS CURRENT |
|---|---|---|---|
| L | L | L | - |
| L | L | H | w |
| L | H | L | v |
| L | H | H | -u |
| H | L | L | u |
| H | L | H | -v |
| H | H | L | -w |
| H | H | H | - |

FIG.6

DETECTED PHASE CURRENT

| | T1 | T2 | T3 | MODE | T1-T2 | T2-T3 |
|---|---|---|---|---|---|---|
| $V_u > V_v > V_w$ | CntW | CntV | CntU | 1 | -w | u |
| $V_v > V_u > V_w$ | CntW | CntU | CntV | 2 | -w | v |
| $V_v > V_w > V_u$ | CntU | CntW | CntV | 3 | -u | v |
| $V_w > V_v > V_u$ | CntU | CntV | CntW | 4 | -u | w |
| $V_w > V_u > V_v$ | CntV | CntU | CntW | 5 | -v | w |
| $V_u > V_w > V_v$ | CntV | CntW | CntU | 6 | -v | u |

SAMPLING TIMING
 ST1:T1-T2
 ST2:T2-T3

BEFORE CORRECTION

AFTER CORRECTION $\Delta \theta = 0°$ $\Delta \theta \neq 0°$

AT A STANDSTILL

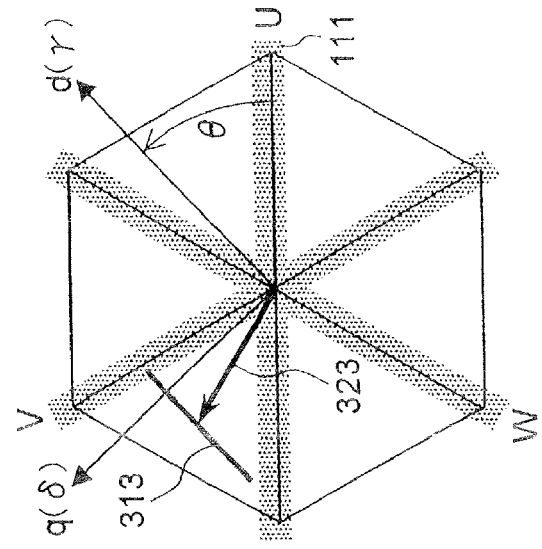
FIG.25A — AT A STANDSTILL
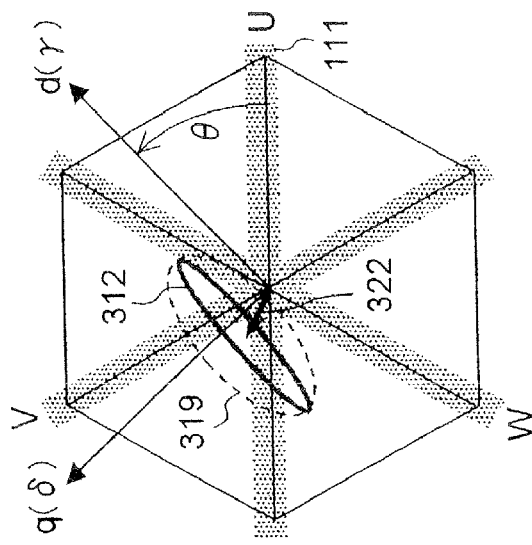
FIG.25B — AT A LOW ROTATION SPEED
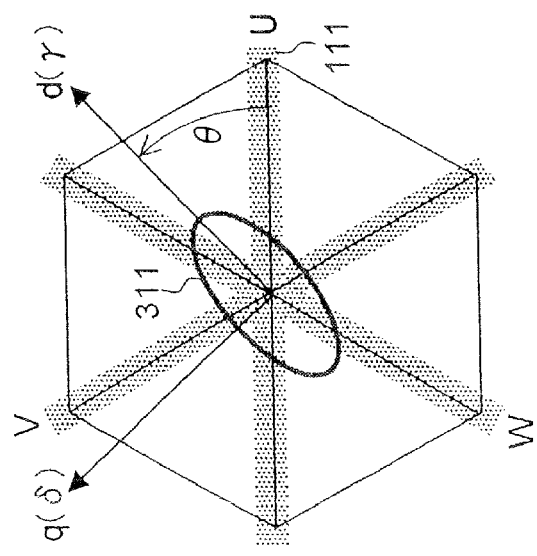
FIG.25C — AT A HIGH ROTATION SPEED

MOTOR CONTROL DEVICE

This nonprovisional application claims priority under 35 U.S.C. § 119(a) on Patent Application No. 2007-034607 filed in Japan on Feb. 15, 2007, the entire contents of which are hereby incorporated by reference.

BACKGROUND OF THE INVENTION

1. Field of the Invention

The present invention relates to a motor control device for driving and controlling a motor.

2. Description of Related Art

In order to perform a vector control of a motor by supplying three-phase AC power to the motor, it is necessary to detect phase currents of two phases (e.g., the U-phase current and the V-phase current) among three phases including the U-phase, the V-phase and the W-phase. Although two current sensors (current transformers or the like) are usually used for detecting the phase currents of two phases, the use of two current sensors causes an increase of cost of the entire system equipped with the motor.

For this reason, a conventional method is proposed, in which bus current (DC current) between an inverter and a DC power supply is sensed by a single current sensor, and the phase currents of two phases are detected from the sensed bus current. This method is also called a single shunt current detecting method.

FIG. 41 shows a general block diagram of a conventional motor driving system in which the single shunt current detecting method is adopted. An inverter (PWM inverter) 902 is equipped with half bridge circuits for three phases, each of which includes an upper arm and a lower arm, and it converts a DC voltage from a DC power supply 904 into a three-phase AC voltages by switching the individual arms in accordance with three-phase specified voltage values given by a controller 903. The three-phase AC voltage is supplied to a three-phase permanent-magnet synchronous motor 901, so that the motor 901 is driven and controlled.

A line connecting the individual lower arms in the inverter 902 with the DC power supply 904 is called a bus line $M_L$. A current sensor 905 transmits a signal indicating the bus current that flows in the bus line $M_L$ to the controller 903. The controller 903 performs sampling of an output signal of the current sensor 905 at appropriate timing so as to detect a phase current of the phase in which a voltage level becomes a maximum value (maximum phase) and phase current of a phase in which a voltage level becomes a minimum value (minimum phase), i.e., the phase currents of two phases.

If voltage levels of phases are separated from each other sufficiently, the phase currents of two phases can be detected by the process described above. However, if the maximum phase of voltage and an intermediate phase become close to each other, or if the minimum phase of voltage and the intermediate phase become close to each other, it is difficult to detect the phase currents of two phases. Note that the description of the single shunt current detecting method including the description of the reason why it becomes difficult to detect the phase currents of two phases will appear later with reference to FIGS. 3, 4 and 5A-5D.

Considering this, a method is proposed in which if the phase currents of two phases cannot be detected by the single shunt current detecting method in a certain period, pulse widths of PWM signals with respect to arms in the inverter are corrected based on three-phase gate signals.

An example of usual correction of the specified voltage value (pulse width) that corresponds to the above-mentioned correction is shown in FIG. 42. In FIG. 42, the horizontal axis indicates time, and reference numerals 920u, 920v and 920w denote voltage levels of the U-phase, the V-phase and the W-phase, respectively. Since a voltage level of each phase follows the specified voltage value (pulse widths) for each phase, they are considered to be equivalent. As shown in FIG. 42, the specified voltage value (pulse width) of each phase is corrected so that "a maximum phase and an intermediate phase" as well as "a minimum phase and the intermediate phase" of the voltage do not approach each other closer than a predetermined distance. Thus, voltages of individual phases do not become close to each other to the extent that the phase currents of two phases cannot be detected, and the phase currents of two phases can be detected stably.

On the other hand, as a method for estimating a rotor position without using a position sensor, there is proposed a method of applying a high frequency voltage. It is known that the rotor position estimating method based on the application of a high frequency voltage can perform a good estimation at a standstill or at a low rotation speed because the method utilizes salient magnetic poles of the motor.

It is possible to realize low cost and stable estimation at a standstill or the like by combining the single shunt current detecting method with the rotor position estimating method based on the application of a high frequency voltage, but a method for realizing the combination is not proposed yet. Therefore, as a matter of course, there is no technique about items to be considered when both the methods are combined.

SUMMARY OF THE INVENTION

A motor control device according to a first aspect of the present invention includes a current detecting portion for detecting the phase current that flows in an armature winding of a stator of a three-phase motor based on current that flows between an inverter for driving the motor and a DC power supply. The motor control device performs a position sensorless vector control for the motor based on a control current that is obtained by a three-phase to two-phase conversion of the phase current based on an estimated rotor position of the motor. The motor control device further includes a superposing portion for superposing a superposed voltage having a predetermined frequency on a drive voltage for driving the motor and an estimating portion for deriving the estimated rotor position based on a superposed current that is extracted from the control current and flows in the motor in accordance with the superposed voltage. A voltage vector locus of the superposed voltage from the superposing portion presents an ellipse.

For example, the motor control device further includes a voltage correcting portion for correcting the drive voltage on which the superposed voltage is superposed so that the phase currents of two phases can be detected, and it controls the motor in accordance with the voltage after the correction.

In addition, more concretely, for example, the minor axis of the ellipse has a size corresponding to quantity of the voltage correction performed by the voltage correcting portion.

More concretely, for example, when a b-axis is orthogonal to a fixed axis of a U-phase, a V-phase or a W-phase, the size of the minor axis of the ellipse is larger than a maximum value of a b-axis component of quantity of the voltage correction performed by the voltage correcting portion.

Alternatively, more concretely, for example, when a b-axis is orthogonal to a fixed axis of a U-phase, a V-phase or a W-phase, the size of the minor axis of the ellipse at a standstill of the motor is larger than a maximum value of a b-axis component of quantity of the voltage correction performed by the voltage correcting portion.

In addition, for example, the superposing portion reduces the size of the minor axis of the ellipse in accordance with increase of the rotation speed or the drive voltage of the motor.

In addition, for example, the superposing portion changes the superposed voltage to be an alternating voltage so that the voltage vector locus changes from the ellipse to a line segment when the rotation speed of the motor becomes a predetermined speed or higher, or when the drive voltage becomes a predetermined voltage or higher.

In addition, for example, the minor axis of the ellipse is parallel with the δ-axis, which is an estimation axis for control corresponding to a q-axis that is orthogonal to magnetic flux generated by a permanent magnet constituting a rotor of the motor.

In addition, a motor control device according to a second aspect of the present invention performs a position sensorless vector control of a three-phase motor based on a control current that is obtained by a three-phase to two-phase conversion of phase current that flows in an armature winding of a stator of the motor, the three-phase to two-phase conversion being based on an estimated rotor position of the motor that is connected to an inverter. The motor control device includes a superposing portion for superposing a superposed voltage having a predetermined frequency on a drive voltage for driving the motor, an estimating portion for deriving the estimated rotor position based on the superposed current that is extracted from the control current and flows in the motor in accordance with the superposed voltage, a PWM signal generating portion for generating a PWM signal for a switching circuit that constitutes the inverter in accordance with the drive voltage on which the superposed voltage is superposed, and a dead time assigning portion for assigning dead time to the PWM signal. The motor is driven by an output of the inverter based on the PWM signal to which the dead time is assigned, a voltage vector locus of the superposed voltage from the superposing portion presents an ellipse, and a minor axis of the ellipse has a size corresponding to quantity of a voltage drop due to the dead time.

In addition, a motor driving system according to the present invention includes three-phase motor, an inverter for driving the motor, and a motor control device for controlling the inverter so as to drive the motor as described above.

The significance or the effect of the present invention will be more apparent from the following description of the preferred embodiment. However, the embodiment described below is merely an embodiment of the present invention, so the significance of the present invention or the term of each structural element is not limited to the following description.

BRIEF DESCRIPTION OF THE DRAWINGS

FIG. 6 is a diagram as a table showing combinations (modes) of a relationship of phase voltage levels in the motor shown in FIG. 1 and phases of current detected in the combinations.

FIGS. 25A-25C are diagrams for explaining characteristics of the superposed voltage according to the embodiment of the present invention.

DETAILED DESCRIPTION OF THE PREFERRED EMBODIMENTS

Figure 1:
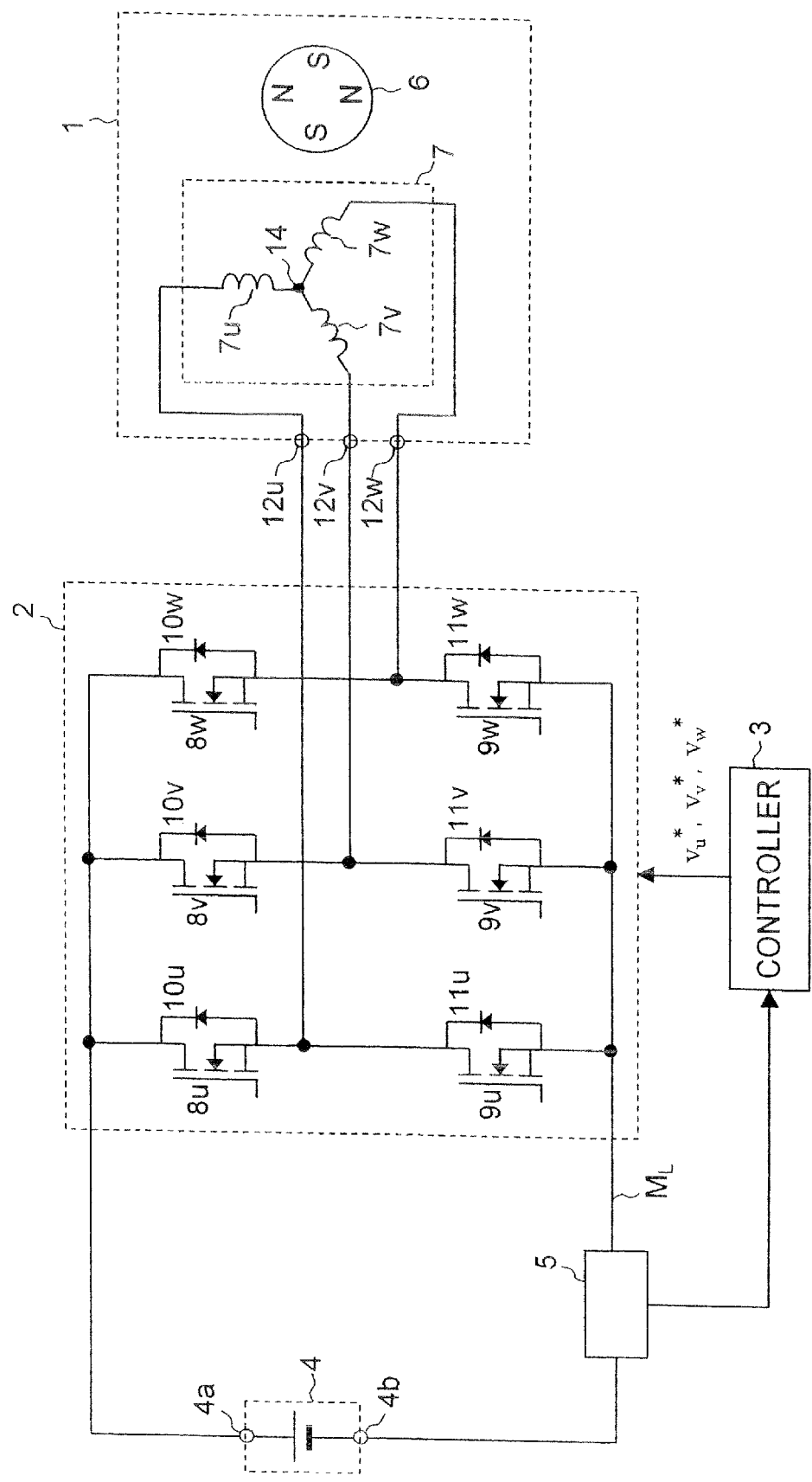
FIG. 1 is a structural diagram showing a general structure of a motor driving system according to an embodiment of the present invention.

Hereinafter, embodiments of the present invention will be described concretely with reference to the attached drawings. In the drawings to be referred to, the same portions are denoted by the same references so that overlapping descriptions for the same portions will be omitted as a general rule. Prior to descriptions of first to sixth examples, items that are common to the examples or items to be referred to in each example will be described first.

[General Structure and Single Shunt Current Detecting Method]

First, a general structure of a motor driving system according to the embodiment of the present invention will be described, and a single shunt current detecting method that is adopted for this motor driving system will also be described. FIG. 1 is a structural diagram showing a general structure of the motor driving system.

The motor driving system shown in FIG. 1 is equipped with a three-phase permanent-magnet synchronous motor 1 (hereinafter referred to as a "motor 1" simply), a PWM (Pulse Width Modulation) inverter 2 (hereinafter referred to as an "inverter 2" simply), a controller 3 as the motor control device, a DC power supply 4 and a current sensor 5. The DC power supply 4 delivers a DC voltage between a positive output terminal 4a and a negative output terminal 4b so that the negative output terminal 4b becomes a low voltage side.

The motor 1 includes a rotor 6 to which a permanent magnet is provided and a stator 7 to which armature windings (stator windings) 7u, 7v and 7w of the U-phase, the V-phase and the W-phase are provided. The armature windings 7u, 7v and 7w are connected at a neutral point 14 as a center in a form of Y-connection. Non-connection ends of the armature windings 7u, 7v and 7w that are opposite ends to the neutral point 14 are connected to terminals 12u, 12v and 12w, respectively.

The inverter 2 is provided with a half bridge circuit for the U-phase, a half bridge circuit for the V-phase and a half bridge circuit for the W-phase. These three half bridge circuits constitute a switching circuit for driving the motor 1. Each of the half bridge circuits includes a pair of switching elements that are connected in series. In each of the half bridge circuits, the pair of switching elements are connected in series between the positive output terminal 4a and the negative output terminal 4b of the DC power supply 4, so that the DC voltage from the DC power supply 4 is applied to each of the half bridge circuits.

The half bridge circuit for the U-phase is made up of a high voltage side switching element 8u (hereinafter referred to as an upper arm 8u, too) and a low voltage side switching element 9u (hereinafter referred to as a lower arm 9u, too). The half bridge circuit for the V-phase is made up of a high voltage side switching element 8v (hereinafter referred to as an upper arm 8v, too) and a low voltage side switching element 9v (hereinafter referred to as a lower arm 9v, too). The half bridge circuit for the W-phase is made up of a high voltage side switching element 8w (hereinafter referred to as an upper arm 8w, too) and a low voltage side switching element 9w (hereinafter referred to as a lower arm 9w, too). In addition, the switching elements 8u, 8v, 8w, 9u, 9v and 9w are respectively connected to diodes 10u, 10v, 10w, 11u, 11v and 11w in parallel so that the direction from the low voltage side to the high voltage side of the DC power supply 4 becomes the forward direction. Each of the diodes works as a freewheel diode.

The connection node of the upper arm 8u and the lower arm 9u that are connected directly, the connection node of the upper arm 8v and the lower arm 9v that are connected directly, and the connection node of the upper arm 8w and the lower arm 9w that are connected directly are connected to the terminals 12u, 12v and 12w, respectively. Note that field-effect transistors are shown as the switching elements in FIG. 1, but they can be replaced with IGBTs (Insulated Gate Bipolar Transistors) or the like.

The inverter 2 generates a PWM (Pulse Width Modulation) signal for each phase based on three-phase specified voltage values supplied from the controller 3 and supplies the PWM signal to a control terminal (base or gate) of each switching element in the inverter 2, so that each switching element performs switching action. The three-phase specified voltage values that are supplied from the controller 3 to the inverter 2 include a U-phase specified voltage value $v_u^*$, a V-phase specified voltage value $v_v^*$ and a W-phase specified voltage value $v_w^*$. The specified voltage values $v_u^*$, $v_v^*$ and $v_w^*$ represent voltage levels (voltage values) of a U-phase voltage $v_u$, a V-phase voltage $v_v$ and a W-phase voltage $v_w$, respectively. Then, the inverter 2 controls on (conducting state) or off (nonconducting state) of the switching elements based on the specified voltage values $v_u^*$, $v_v^*$ and $v_w^*$.

Ignoring a dead time for preventing the upper arm and the lower arm of the same phase from being turned on simultaneously, the upper arm is turned on when the lower arm is turned off in each half bridge circuit. On the contrary, the upper arm is turned off when the lower arm is turned on. Although an example considering the dead time will be described later, the dead time will be ignored unless there is a particular description.

The DC voltage applied to the inverter 2 by the DC power supply 4 is converted into a three-phase AC voltage that is modulated by PWM (Pulse Width Modulation), for example, by the switching action of the switching elements in the inverter 2. When the three-phase AC voltage is applied to the motor 1, current corresponding to the three-phase AC voltage flows in the armature winding (7u, 7v and 7w) so that the motor 1 is driven.

The current sensor 5 senses the current that flows in a bus line $M_L$ of the inverter 2 (hereinafter referred to as "bus current"). The bus current includes a DC component, so it may be regarded as a DC current. In the inverter 2, the low voltage sides of the lower arms 9u, 9v and 9w are connected together to the negative output terminal 4b of the DC power supply 4. The wiring line to which the low voltage sides of the lower arms 9u, 9v and 9w are connected together is the bus line $M_L$, and the current sensor 5 is inserted in the bus line $M_L$, in series. The current sensor 5 transmits a signal indicating a current value of the bus current (sensed current) to the controller 3. The controller 3 refers to an output signal of the current sensor 5 and the like so as to generate and deliver the above-mentioned three-phase specified voltage values. Note that the current sensor 5 is a shunt resistor, a current transformer or the like for example. In addition, it is possible to insert the current sensor 5 not in the wire (bus line $M_L$) between the low voltage sides of the lower arms 9u, 9v and 9w and the negative output terminal 4b but in the wire between the high voltage sides of the upper arms 8u, 8v and 8w and the positive output terminal 4a.

Here, with reference to FIGS. 2, 3, 4, 5A-5D, and 6, a relationship between the bus current and the phase current flowing in the armature winding of each phase and the like will be described. The current flowing in the armature windings 7u, 7v and 7w shown in FIG. 1 are referred to as the U-phase current, the V-phase current and the W-phase current, respectively, and each of them (or a generic name of them) is referred to as the phase current. Further, concerning the phase current, a polarity of the current direction flowing from the terminal 12u, 12v or 12w to the neutral point 14 is regarded as positive while a polarity of the current direction flowing from the neutral point 14 outward is regarded as negative.

Figures 2, 3:
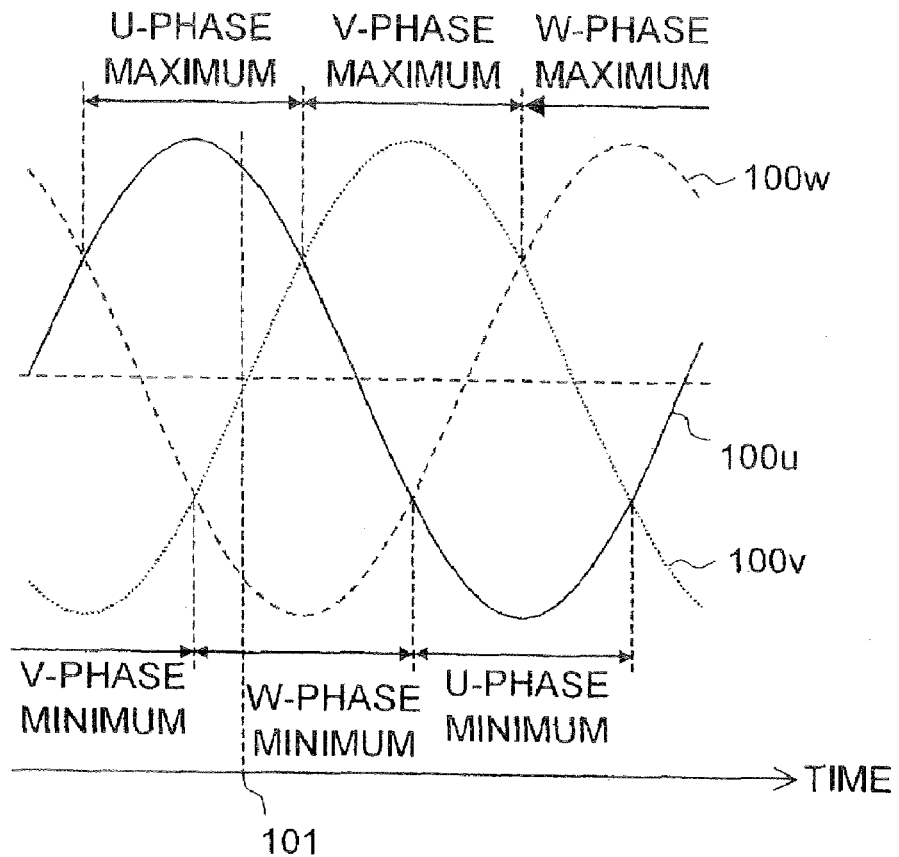
FIG. 2 is a diagram showing a typical example of a three-phase AC voltage that is applied to the motor shown in FIG. 1.
FIG. 3 is a diagram as a table showing a relationship between energizing patterns of the motor shown in FIG. 1 and bus current.

FIG. 2 shows a typical example of the three-phase AC voltage that is applied to the motor 1. In FIG. 2, reference numerals 100u, 100v and 100w show waveforms of the U-phase voltage, the V-phase voltage and the W-phase voltage to be applied to the motor 1, respectively. Each of the U-phase voltage, the V-phase voltage and the W-phase voltage (or a generic name of them) is referred to as phase voltage. When a sinusoidal current is to be supplied to the motor 1, an output voltage of the inverter 2 should have a sine waveform. Although each of the phase voltages shown in FIG. 2 is an ideal sine wave, a distortion is added to the sine wave in the present embodiment (as described later in detail).

As shown in FIG. 2, a relationship among the voltage levels of the U-phase voltage, the V-phase voltage and the W-phase voltage alters as time passes. This relationship is determined by the three-phase specified voltage values, and the inverter 2 decides an energizing pattern for each phase in accordance with the three-phase specified voltage values. FIG. 3 shows this energizing pattern as a table. In FIG. 3, the first to the third columns from the left side indicate the energizing pattern. The fourth column will be described later.

The energizing pattern includes:

an energizing pattern "LLL" in which all the lower arms of the U, V and W-phases are turned on;

an energizing pattern "LLH" in which the upper arm of the W-phase is turned on while the lower arms of the U and V-phases are turned on;

an energizing pattern "LHL" in which the upper arm of the V-phase is turned on while the lower arms of the U and W-phases are turned on;

an energizing pattern "LHH" in which the upper arms of the V and W-phases are turned on while the lower arm of the U-phase is turned on;

an energizing pattern "HLL" in which the upper arm of the U-phase is turned on while the lower arms of the V and W-phases are turned on;

an energizing pattern "HLH" in which the upper arms of the U and W-phases are turned on while the lower arm of the V-phase is turned on;

an energizing pattern "HHL" in which the upper arms of the U and V-phases are turned on while the lower arm of the W-phase is turned on; and an energizing pattern "HHH" in which all the upper arms of the U, V and W-phases are turned on (reference numerals of the upper arms and the lower arms (8u and the like) are omitted).

Figure 4:
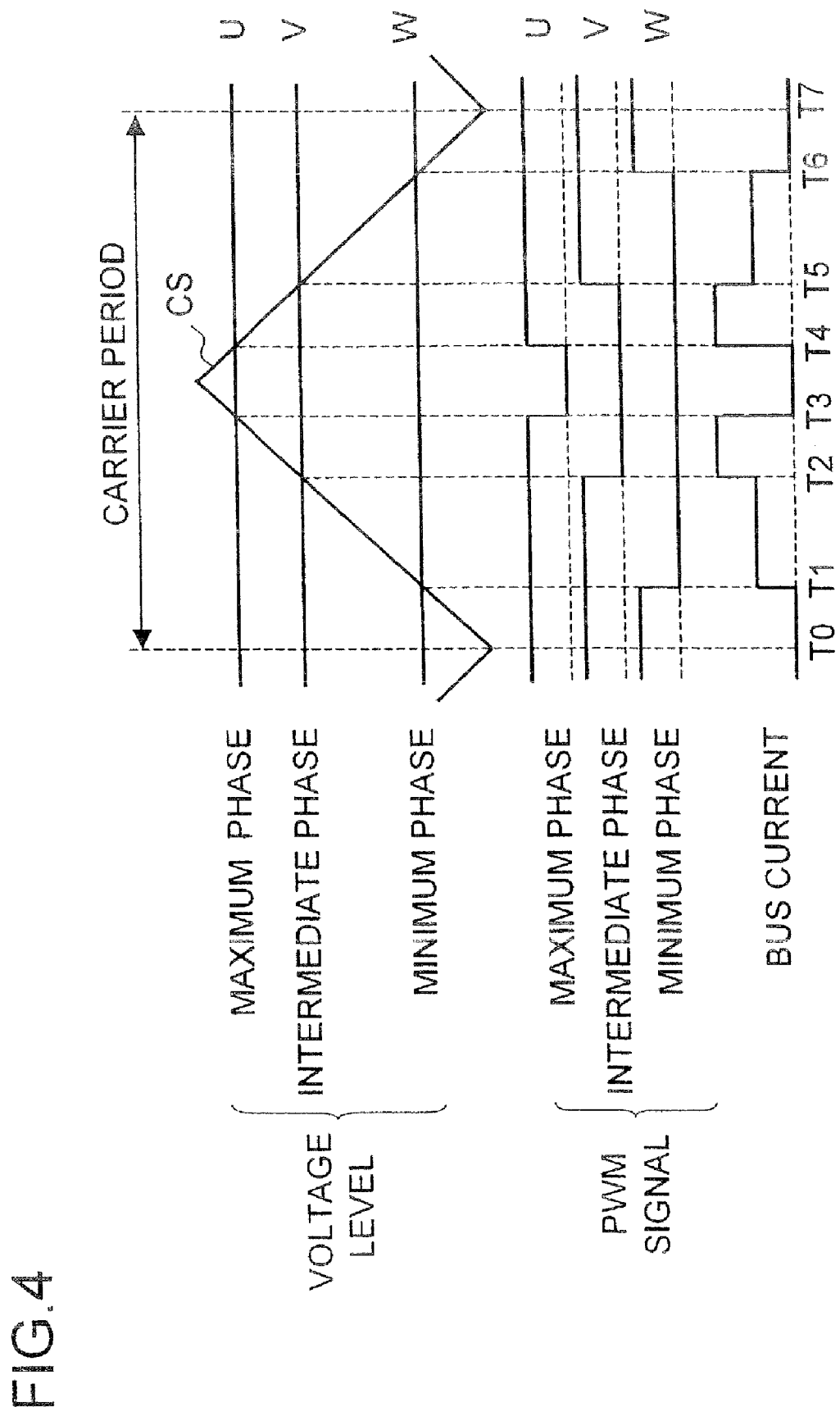
FIG. 4 is a diagram showing a relationship between a voltage level of each phase voltage and a carrier signal in the motor shown in FIG. 1 and waveforms of a PWM signal and bus current corresponding to the relationship.

FIG. 4 shows a relationship between a voltage level of each phase voltage and a carrier signal in the case where three-phase modulation is performed and waveforms of the PWM signal and the bus current corresponding to the relationship. The relationship among voltage levels of the individual phase voltages changes variously, but FIG. 4 shows it by noting a certain timing 101 shown in FIG. 2 for a concrete description. More specifically, FIG. 4 shows the case where a voltage level of the U-phase voltage is the maximum, and a voltage level of the W-phase voltage is the minimum. The phase having the maximum voltage level is referred to as a "maximum phase", the phase having the minimum voltage level is referred to as a "minimum phase", and the phase whose voltage level is not the maximum or the minimum is referred to as an "intermediate phase". In the state shown in FIG. 4, the maximum phase, the intermediate phase and the minimum phase are the U-phase, the V-phase and the W-phase, respectively. In FIG. 4, reference CS denotes a carrier signal that is compared with a voltage level of each phase voltage. The carrier signal is a periodical signal of a triangular wave, and the period of the signal is referred to as a carrier period. Note that the carrier period is much shorter than a period of the three-phase AC voltage shown in FIG. 2. Therefore, if the triangular wave of the carrier signal shown in FIG. 4 is added to the diagram of FIG. 2, the triangular wave will look like a single line.

Further with reference to FIGS. 5A-5D, a relationship between the phase current and the bus current will be described. FIGS. 5A-5D are equivalent circuits of the armature windings and a periphery thereof at individual timings shown in FIG. 4.

Figure 5A:
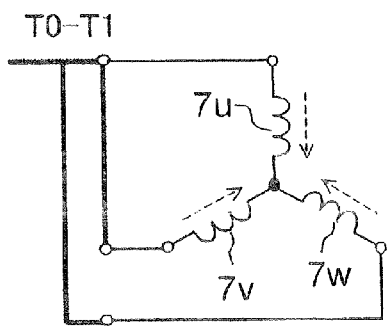
FIGS. 5A-5D are equivalent circuit diagrams of armature windings and a periphery thereof shown in FIG. 1 at each timing shown in FIG. 4.

A start timing of each carrier period, i.e., the timing when the carrier signal is the lowest level is referred to as T0. At the timing T0, the upper arms ($8u$, $8v$ and $8w$) of the individual phases are turned on. In this case, as shown in FIG. 5A, a short circuit is formed so that current from or to the DC power supply 4 becomes zero. Therefore, the bus current becomes zero.

Figure 5B:
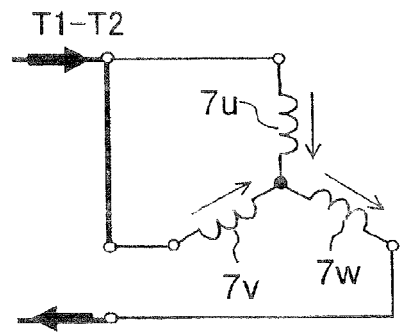

The inverter 2 refers to $v_u^*$, $v_v^*$ and $v_w^*$ so as to compare a voltage level of each phase voltage with the carrier signal. In the increasing process of a level of the carrier signal (voltage level), when a voltage level of the minimum phase crosses the carrier signal at the timing T1, the lower arm of the minimum phase is turned on. Then, as shown in FIG. 5B, current of the minimum phase flows as the bus current. In the example shown in FIG. 4, the lower arm of the W-phase $9w$ is in the turned-on state during the period from the timing T1 to a timing T2 that will be described later. Therefore, the W-phase current (having negative polarity) flows as the bus current.

Figure 5C:
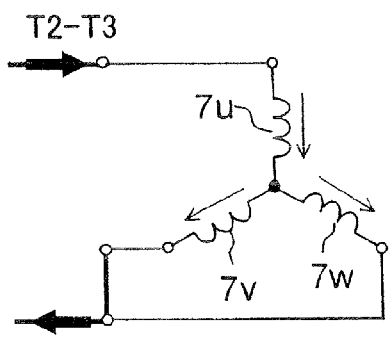

Further when a level of the carrier signal increases and reaches the timing T2 when a voltage level of the intermediate phase crosses the carrier signal, the upper arm of the maximum phase is turned on, and the lower arms of the intermediate phase and the minimum phase are turned on. Therefore, as shown in FIG. 5C, a current of the maximum phase flows as the bus current. In the example shown in FIG. 4, the upper arm of the U-phase $8u$ is in the turned-on state, and the lower arms of the V-phase and the W-phase $9v$ and $9w$ are turned on in the period from the timing T2 to a timing T3 that will be described later. Therefore, the U-phase current (having positive polarity) flows as the bus current.

Figure 5D:
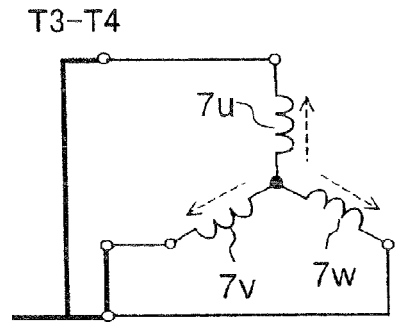

Further when a level of the carrier signal increases and reaches the timing T3 for a voltage level of the maximum phase to cross the carrier signal, the lower arms of all phases are turned on. Therefore, as shown in FIG. 5D, a short circuit is formed so that current from or to the DC power supply 4 becomes zero. Therefore, the bus current becomes zero.

At a middle timing between the timing T3 and a timing T4 that will be described later, the carrier signal reaches the maximum level, then a level of the carrier signal decreases. In the decreasing process of a level of the carrier signal, the states as shown in FIGS. 5D, 5C, 5B and 5A appear one by one in this order. More specifically, in the decreasing process of a level of the carrier signal, it is supposed that a voltage level of the maximum phase crosses the carrier signal at the timing T4, a voltage level of the intermediate phase crosses the carrier signal at a timing T5, a voltage level of the minimum phase crosses the carrier signal at a timing T6, and a next carrier period starts at a timing T7. Then, the period between the timing T4 and the timing T5, the period between the timing T5 and the timing T6, the period between the timing T6 and the timing T7 have the same energizing patterns as the period T2-T3, the period T1-T2 and the period T0-T1, respectively.

Therefore, if the bus current is sensed in the period T1-T2 or T5-T6, the minimum phase current can be detected from the bus current. If the bus current is sensed in the period T2-T3 or T4-T5, the maximum phase current can be detected from the bus current. Then, the intermediate phase current can be obtained by calculation utilizing the fact that a sum of the three phase current values becomes zero. The fourth column in the table shown in FIG. 3 indicates a phase of current that flows as the bus current in each energizing pattern with a polarity of the current. For example, in the energizing pattern "HHL" corresponding to the eighth row in the table shown in FIG. 3, the W-phase current (having negative polarity) flows as the bus current.

Furthermore, the period obtained by removing the period between the timing T1 and the timing T6 from the carrier period indicates a pulse width of the PWM signal for the minimum phase. The period obtained by removing the period between the timing T2 and the timing T5 from the carrier period indicates a pulse width of the PWM signal for the intermediate phase. The period obtained by removing the period between the timing T3 and the timing T4 from the carrier period indicates a pulse width of the PWM signal for the maximum phase.

Although the above description exemplifies the case where the U-phase is the maximum phase and the W-phase is the minimum phase, there are six combinations of the maximum phase, the intermediate phase and the minimum phase. FIG. 6 shows the combinations as a table. When the U-phase voltage, the V-phase voltage and the W-phase voltage are denoted by $v_u$, $v_v$ and $v_w$, respectively, the state that satisfies "$v_u > v_v > v_w$" is referred to as a first mode, the state that satisfies "$v_v > v_u > v_w$" is referred to as a second mode, the state that satisfies "$v_v > v_w > v_u$" is referred to as a third mode, the state that satisfies "$v_w > v_v > v_u$" is referred to as a fourth mode, the state that satisfies "$v_w > v_u > v_v$" is referred to as a fifth mode, and the state that satisfies "$v_u > v_w > v_v$" is referred to as a sixth mode. The examples shown in FIGS. 4 and 5A-5D correspond to the first mode. In addition, FIG. 6 also indicates a phase of current sensed in each mode.

The U-phase specified voltage value $v_u^*$, the V-phase specified voltage value $v_v^*$ and the W-phase specified voltage value $v_w^*$ are specifically shown as set values of counters CntU, CntV and CntW, respectively. A larger set value is assigned to a higher phase voltage. For example, "CntU>CntV>CntW" holds in the first mode.

The counter (not shown) that is provided to the controller 3 increments its count value from zero every carrier period with reference to the timing T0. When the count value reaches CntW, the state in which the upper arm $8w$ of the W-phase is turned on is switched to the state in which the lower arm $9w$ is turned on. When the count value reaches CntV, the state in which the upper arm $8v$ of the V-phase is turned on is switched to the state in which the lower arm $9v$ is turned on. When the count value reaches CntU, the state in which the upper arm $8u$ of the U-phase is turned on is switched to the state in which the lower arm $9u$ is turned on. After the carrier signal reached the maximum level, the count value is decremented so that the switching action is performed reversely.

Therefore, in the first mode, the timing when the above-mentioned counter value reaches CntW corresponds to the timing T1. The timing when it reaches CntV corresponds to the timing T2. The timing when it reaches CntU corresponds to the timing T3. For this reason, in the first mode, the counter value is incremented while the output signal of the current sensor 5 is sampled at a timing when the counter value is larger than CntW and is smaller than CntV, so that the W-phase current (having negative polarity) flowing as the bus current can be detected. Furthermore, the output signal of the current sensor 5 is sampled at a timing when the counter value is larger than CntV and is smaller than CntU, so that the U-phase current (having positive polarity) flowing as the bus current can be detected.

In the same manner, as shown in FIG. 6, in the second mode, the timing when the above-mentioned counter value reaches CntW corresponds to the timing T1. The timing when it reaches CntU corresponds to the timing T2. The timing when it reaches CntV corresponds to the timing T3. For this reason, in the second mode, the counter value is incremented while the W-phase current (having negative polarity) can be detected from the bus current at the timing when the counter value is larger than CntW and is smaller than CntU. The V-phase current (having positive polarity) can be detected from the bus current at the timing when the counter value is larger than CntU and is smaller than CntV. Ditto for the third to the sixth modes.

In addition, sampling timing for sensing the phase current of the minimum phase in the period T1-T2 (e.g., mid-term between the timing T1 and the timing T2) is denoted by ST1, and sampling timing for sensing the phase current of the maximum phase in the period T2-T3 (e.g., mid-term between the timing T2 and the timing T3) is denoted by ST2.

Note that a pulse width (and a duty factor) of the PWM signal for each phase is specified by the set values CntU, CntV and CntW of the counter as the three-phase specified voltage values ($v_u^*$, $v_v^*$ and $v_w^*$).

When each phase current is detected from the bus current based on the above-mentioned principle, as understood from FIG. 4, if the voltage levels of the maximum phase and the intermediate phase approach each other for example, a time length between the period T2-T3 and the period T4-T5 becomes short. When the bus current is detected by converting an analog output signal from the current sensor 5 shown in FIG. 1 into a digital signal, if this time length is extremely short, it is difficult to secure necessary time for A/D conversion or time for converging ringing (current ripple that is caused by the switching). As a result, the phase current of the maximum phase cannot be sensed. In the same manner, if the voltage levels of the minimum phase and the intermediate phase approach each other, the phase current of the minimum phase cannot be sensed. If the phase currents of two phases cannot be measured, the phase current of three phases cannot be reproduced. As a result, a vector control of the motor 1 cannot be performed.

In the present embodiment (examples that will be described later), during the period while it is considered that the phase currents of two phases cannot be measured, a voltage vector (a specified voltage vector) indicating an applied voltage to the motor 1 is corrected so that a voltage level difference between phase voltages is maintained higher than a predetermined value, for canceling the malfunction described above. Alternatively, instead of correcting the voltage vector, it is possible to perform a similar correction at the stage of three-phase voltage (an example of performing the correction at the stage of the three-phase voltages will be described later as a second example).

[Definition of State Quantities and the Like]

Figure 7:
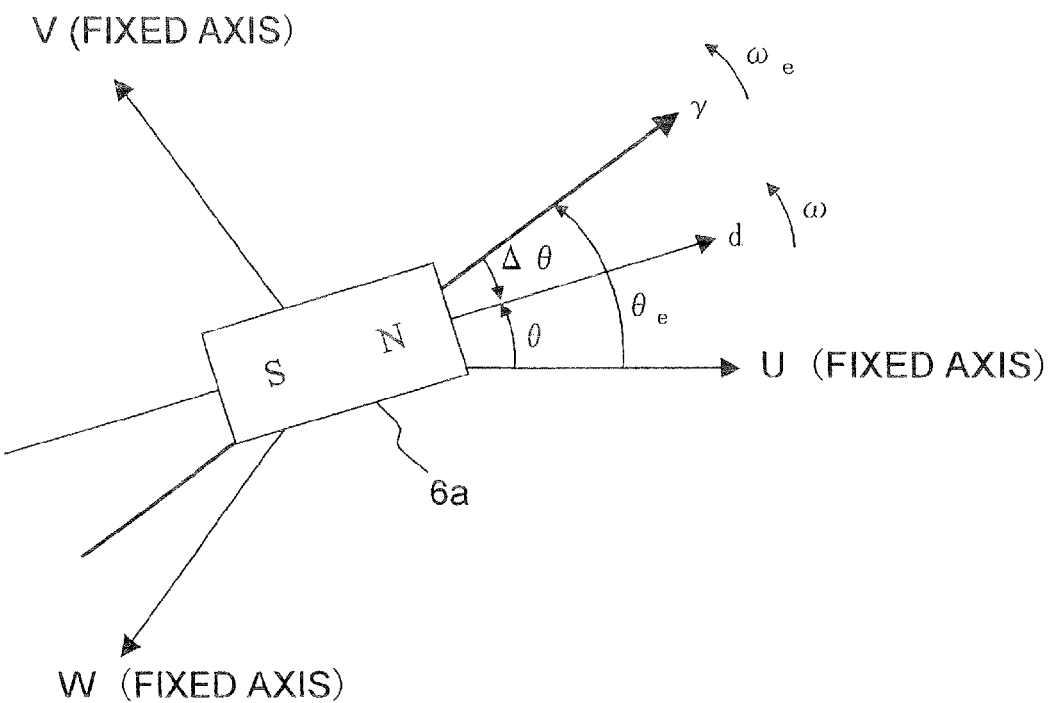
FIG. 7 is an analytic model diagram of the motor shown in FIG. 1.

Prior to a detailed description of the correction method for the voltage vector (the specified voltage vector), various kinds of state quantities (state variables) will be described and defined. FIG. 7 is an analytic model diagram of the motor 1. FIG. 7 shows armature winding fixed axes of the U-phase, the V-phase and the W-phase (hereinafter, they may be simply referred to as the U-phase axis, the V-phase axis and the W-phase axis). Numeral 6a denotes a permanent magnet that is provided to the rotor 6 of the motor 1. In a rotating coordinate system that rotate at the same speed as the magnetic flux generated by the permanent magnet 6a, the d-axis is defined as the direction of the magnetic flux generated by the permanent magnet 6a. In addition the q-axis is defined as the phase leading the d-axis by 90 degrees in the electrical angle though it is not shown.

In addition, if a position sensor for detecting a rotor position is not used for performing the vector control of the motor 1, estimated axes for control are defined because the real d-axis and q-axis are unknown. A γ-axis is defined as the estimated axis for control corresponding to the d-axis, and a δ-axis is defined as the estimated axis for control corresponding to the q-axis. The δ-axis is an axis leading from the γ-axis by 90 degrees in the electrical angle (not shown in FIG. 7). Usually, the vector control is performed so that the γ-axis and the δ-axis match the d-axis and the q-axis, respectively. The d-axis and the q-axis are the coordinate axes in the actual rotating coordinate system, and the coordinates that selects them as the coordinate axes is referred to as the dq coordinates. The γ-axis and the δ-axis are coordinate axes in the rotating coordinate system for control (estimated rotating coordinate system), and the coordinates that selects them as the coordinate axes are referred to as the γδ coordinates.

The d-axis (and the q-axis) is rotating, and its rotation speed (electrical angle speed) is referred to as an actual motor speed ω. The γ-axis (and δ-axis) is also rotating, and its rotation speed (electrical angle speed) is referred to as an estimated motor speed $\omega_e$. In addition, as to the rotating dq coordinates at a moment, a phase of the d-axis is expressed by θ (actual rotor position θ0) with reference to the fixed axis of the armature winding of the U-phase. In the same manner, as to the rotating γδ coordinates at a moment, a phase of the γ-axis is expressed by $\theta_e$ (estimated rotor position $\theta_e$) with reference to the fixed axis of the armature winding of the U-phase. Then, an axial error Δθ between the d-axis and the γ-axis is expressed by "Δθ=θ−$\theta_e$".

In addition, a whole motor voltage that is applied to the motor 1 from the inverter 2 is denoted by $V_a$ while a whole motor current that is supplied to the motor 1 from the inverter 2 is denoted by $I_a$. Then, a γ-axis component, a δ-axis component, a d-axis component and a q-axis component of the motor voltage $V_a$ are expressed as a γ-axis voltage $v_\gamma$, a δ-axis voltage $v_\delta$, a d-axis voltage $v_d$ and a q-axis voltage $v_q$, respectively. Further, a γ-axis component, a δ-axis component, a d-axis component and a q-axis component of the motor current $I_a$ are expressed as a γ-axis current $i_\gamma$, a δ-axis current $i_\delta$, a d-axis current $i_d$ and a q-axis current $I_q$, respectively.

In addition, as referred to in other examples described later too, specified values with respect to the γ-axis voltage $v_\gamma$ and the δ-axis voltage $v_\delta$ are referred to as a γ-axis specified voltage value $v_\gamma^*$ and a δ-axis specified voltage value $v_\delta^*$, respectively. The specified voltage values $v_\gamma^*$ and $v_\delta^*$ are calculated in the motor driving system and indicate voltage (voltage values) that the voltages $v_\delta$ and $v_\delta$ should follow, respectively. Furthermore, specified values with respect to the γ-axis current $i_\gamma$ and the δ-axis current $i_\delta$ are referred to as a γ-axis specified current value $i_\gamma^*$ and a δ-axis specified current value $i_\delta^*$, respectively. The specified current values $i_\gamma^*$ and $i_\delta^*$ are calculated in the motor driving system and indicate current (current values) that the current $i_\gamma$ and $i_\delta$ should follow, respectively.

Furthermore, in the following description, $R_a$ represents motor resistance (a resistance value of the armature winding of the motor 1), $L_d$ and $L_q$ represent respectively d-axis inductance (a d-axis component of inductance of the armature winding of the motor 1) and q-axis inductance (a q-axis component of inductance of the armature winding of the motor 1), and $\Phi_a$ represents armature flux linkage with the permanent magnet 6a. Note that $L_d$, $L_q$, $R_a$ and $\Phi_a$ are the values that are set in advance when the motor driving system is designed. In addition, in the equations that will be shown later, "s" represents the Laplace operator, and "p" represents the differential operator.

[Correction Method of Voltage Vector]

Next, a correction method for the above-mentioned voltage vector will be described.

Figure 8:
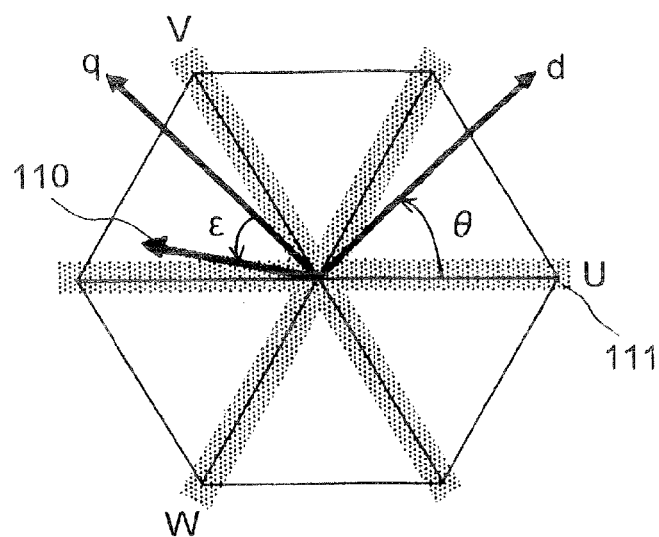
FIG. 8 is a space vector diagram showing a relationship among the U-phase axis, the V-phase axis and the W-phase axis that are fixed axes and a d-axis and a q-axis that are rotation axes and a voltage vector.

FIG. 8 shows a space vector diagram indicating a relationship among the U-phase axis, the V-phase axis and the V-phase axis that are fixed axes and the d-axis and the q-axis that are rotation axes and the voltage vector. The vector denoted by reference numeral 110 is the voltage vector. A phase of the voltage vector 110 viewed from the q-axis is denoted by ϵ. A phase of the voltage vector 110 with reference to the U-phase axis is expressed by (θ+ϵ+π/2).

The voltage vector 110 is the voltage applied to the motor 1 that is regarded as a vector. For example, noting the γδ coordinates, the γ-axis component and the γ-axis component of the voltage vector 110 are $v_\gamma$ and $v_\delta$, respectively. Actually, the γ-axis specified voltage value $v_\gamma^*$ and the δ-axis specified voltage value $v_\delta^*$ are calculated in the motor driving system, and the voltage vector 110 is expressed by using $v_\delta^*$ and $v_\delta^*$. For this reason, the voltage vector can also be referred to as the specified voltage vector.

An asterisk region 111 with hatching that includes the vicinity of the U-phase axis, the vicinity of the V-phase axis and the vicinity of the W-phase axis indicates the region where the phase currents of two phases cannot be detected. For example, if the V-phase voltage and the W-phase voltage are close to each other so that the phase currents of two phases cannot be detected, the voltage vector 110 is located at the vicinity of the U-phase axis. If the U-phase voltage and the W-phase voltage are close to each other so that the phase currents of two phases cannot be detected, the voltage vector 110 is located at the vicinity of the V-phase axis.

In this way, the region 111 where the phase currents of two phases cannot be detected exist every electrical angle of 60 degrees with reference to the U-phase axis. If the voltage vector 110 exists in the region 111, the phase currents of two phases cannot be detected. Therefore, if the voltage vector exists in the region 111, the voltage vector should be corrected so that the voltage vector becomes a vector outside the region 111.

Figure 9:
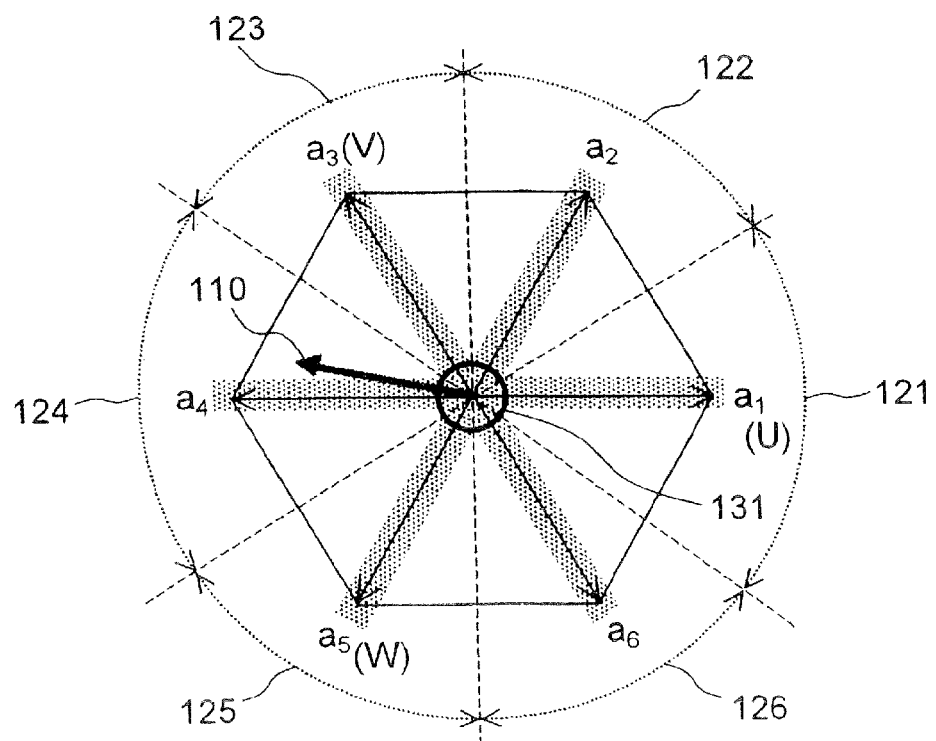
FIG. 9 is a diagram for explaining a-axis defined in the present invention.

In order to perform this correction, noting characteristics of the region 111 in which the phase currents of two phases cannot be detected, it is considered coordinates that rotate in a stepping manner every electrical angle of 60 degrees. The coordinates are referred to as ab coordinates (note that the dq coordinates and the γδ coordinates are coordinates that rotate continuously). The ab coordinates have coordinate axes of the a-axis and the b-axis that are orthogonal to each other. FIG. 9 shows six axes that the a-axis can be. The a-axis becomes any one of $a_1$ to $a_6$ axes in accordance with the phase (θ+ϵ+π/2) of the voltage vector 110. The $a_1$ axis, the $a_3$ axis and the $a_5$ axis match the U-phase axis, the V-phase axis and the W-phase axis, respectively. The $a_2$ axis, the $a_4$ axis and the $a_6$ axis match an intermediate axis between the $a_1$ axis and the $a_3$ axis, an intermediate axis between the $a_3$ axis and the $a_5$ axis, and an intermediate axis between the $a_5$ axis and the $a_1$ axis, respectively. Note that a circle denoted by reference numeral 131 will be described later.

If the voltage vector 110 is located in the range denoted by reference 121, i.e., "11π/6≦(θ+ϵ+π/2)<0" or "0≦(θ+ϵ+π/2)<π/6" holds, the a-axis becomes the $a_1$ axis.

If the voltage vector 110 is located in the range denoted by reference 122, i.e., "π/6≦(θ+ϵ+π/2)<π/2" holds, the a-axis becomes the $a_2$ axis.

If the voltage vector 110 is located in the range denoted by reference 123, i.e., "π/2≦(θ+ϵ+π/2)<5π/6" holds, the a-axis becomes the $a_3$ axis.

If the voltage vector 110 is located in the range denoted by reference 124, i.e., "5π/6≦(θ+ϵ+π/2)<7π/6" holds, the a-axis becomes the $a_4$ axis.

If the voltage vector 110 is located in the range denoted by reference 125, i.e., "7π/6≦(θ+ϵ+π/2)<3π/2" holds, the a-axis becomes the $a_5$ axis.

If the voltage vector 110 is located in the range denoted by reference 126, i.e., "3π/2≦(θ+ϵ+π/2)<11π/6" holds, the a-axis becomes the $a_6$ axis.

For example, if the voltage vector 110 is located at the position shown in FIG. 9, the a-axis becomes the $a_4$ axis.

In this way, the a-axis rotates in a stepping manner every angle of 60 degrees along with rotation of the voltage vector, and the b-axis also rotates in a stepping manner every angle of 60 degrees together with the a-axis and being orthogonal to the same. The a-axis and the b-axis can be expressed to be coordinate axes that are digitized every angle of 60 degrees and rotate every angle of 60 degrees. For this reason, the a-axis is always located at the center of the region where the phase currents of two phases cannot be detected. In this correction method, a voltage vector on the dq coordinates is converted into that on the ab coordinates, and they are corrected if necessary by referring to the a-axis component and the b-axis component of the voltage vector converted into that on the ab coordinates (e.g., the b-axis component is increased by the correction).

Figure 10:
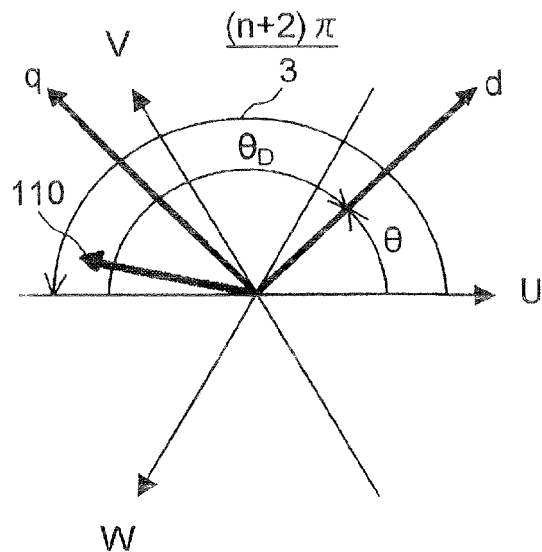
FIG. 10 is a diagram showing a state in which a rotor phase (θ) is disassembled considering a relationship with the a-axis shown in FIG. 9.

More concrete method of realizing this correction process will be described. A phase of the axis to which the voltage vector 110 is closest among the $a_1$ to $a_6$ axes is expressed by "(n+2)π/3" with reference to the U-phase axis. Here, "n" is a quotient that is obtained by dividing (θ+ϵ) by π/3. For convenience sake, as shown in FIG. 10, θ is divided into the above-mentioned phase (n+2)π/3 and a phase difference $\theta_D$ between it and the phase (n+2)π/3 A relationship between these phases is expressed by the equation (1-1) and the equation (1-2).

$$\theta + \varepsilon = \frac{n\pi}{3} + \alpha, \left(\text{where}, 0 \leq \alpha < \frac{\pi}{3}\right) \quad (1\text{-}1)$$

$$\theta = \theta_D + \frac{(n+2)\pi}{3} \quad (1\text{-}2)$$

Coordinate conversion of the dq coordinates is performed by the phase difference $\theta_D$, so that the voltage vector 110 is regarded as a voltage vector on the ab coordinates. Considering on the ab coordinates, the a-axis component and the b-axis component of the voltage vector 110 is regarded as the a-axis voltage $v_a$ and the b-axis voltage $v_b$. Then, the d-axis voltage $v_d$ and q-axis voltage $v_q$ as well as the a-axis voltage $v_a$ and the b-axis voltage $v_b$ hold a coordinate conversion equation of the equation (1-3) as below.

$$\begin{pmatrix} v_a \\ v_b \end{pmatrix} = \begin{bmatrix} \cos\theta_D & -\sin\theta_D \\ \sin\theta_D & \cos\theta_D \end{bmatrix} \begin{pmatrix} v_d \\ v_q \end{pmatrix} \quad (1\text{-}3)$$

The phase difference $\theta_D$ can be calculated as below. A value of n matching $\epsilon$ calculated by using the equation (1-4) as below (i.e., a quotient obtained by dividing $(\theta+\epsilon)$ by $\pi/3$) is determined by referring to $\theta$. Substituting the determined n and $\theta$ into the above-mentioned equation (1-2), then the phase difference $\theta_D$ can be obtained.

$$\varepsilon = \tan^{-1}\left(\frac{-v_d}{v_q}\right) \quad (1\text{-}4)$$

Figure 11:
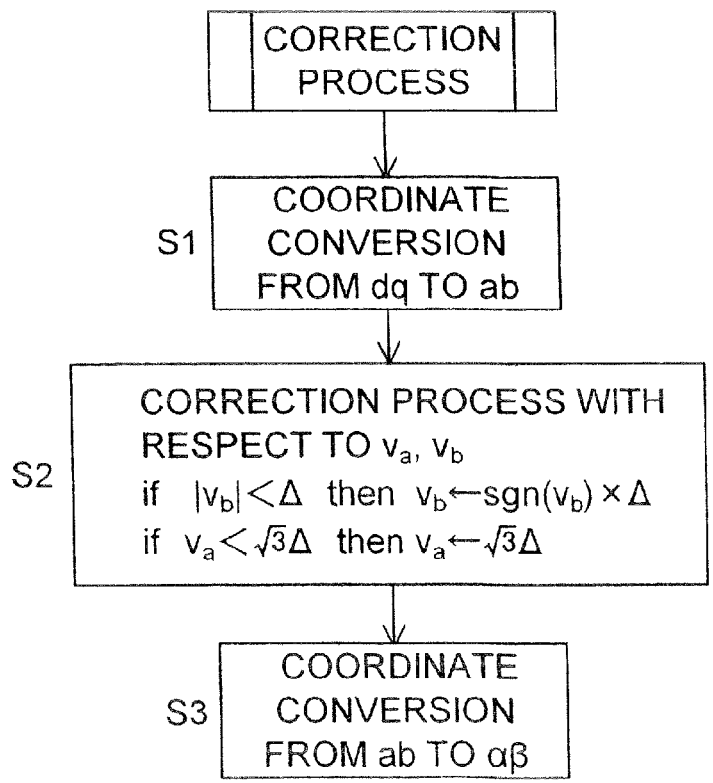
FIG. 11 is a flowchart showing a procedure of a correction process of a voltage vector according to the embodiment of the present invention.

Then, the correction process is performed with referring to the a-axis voltage $v_a$ and the b-axis voltage $v_b$ calculated in accordance with the equation (1-3). FIG. 11 shows a flowchart indicating a procedure of this correction process. In the step S1, the coordinate conversion is performed in accordance with the equation (1-3). In the following step S2, the correction process with respect to $v_a$ and $v_b$ is performed.

In the step S2, it is decided first whether or not a value that indicates an amplitude of the b-axis voltage $v_b$ (i.e., an absolute value of the b-axis voltage $v_b$) is smaller than a predetermined threshold value $\Delta$ (here, $\Delta$>0). In other words, it is decided whether or not the expression (1-5) as below is satisfied. Further, if the absolute value of the b-axis voltage $v_b$ is smaller than the threshold value $\Delta$ and the b-axis voltage $v_b$ is positive, the correction is performed so that $v_b$ equals $\Delta$. If the absolute value of the b-axis voltage $v_b$ is smaller than the threshold value $\Delta$ and the b-axis voltage $v_b$ is negative, the correction is performed so that $v_b$ equals ($-\Delta$). If the absolute value of the b-axis voltage $v_b$ is more than or equal to the threshold value $\Delta$, the correction is not performed with respect to $v_b$.

Furthermore, in the step S2, it is also decided whether or not the a-axis voltage $v_a$ satisfies the expression (1-6) as below. If it satisfies the expression (1-6), the correction of $v_a$ is performed so that $v_a$ becomes equal to the right side of the expression (1-6). If $v_a$ does not satisfy the expression (1-6) as below) the correction is not performed with respect to $v_a$. Note that the expression (1-6) is used for deciding whether the voltage vector 110 is included inside the circle 131 shown in FIG. 9. The state where the voltage vector 110 is included inside the circle 131 corresponds to the state where the phase voltages of three phases are close to each other. In this state, the phase currents of two phases cannot be detected regardless of a value of the b-axis voltage $v_b$, $$|v_b| < \Delta \quad (1\text{-}5)$$

$$v_a < \sqrt{3}\Delta \quad (1\text{-}6)$$

Figure 12A:
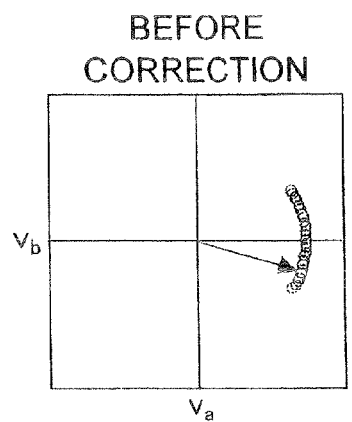
FIG. 12A is a diagram showing a voltage vector locus on the ab coordinates before the correction process shown in FIG. 11.
Figure 12B:
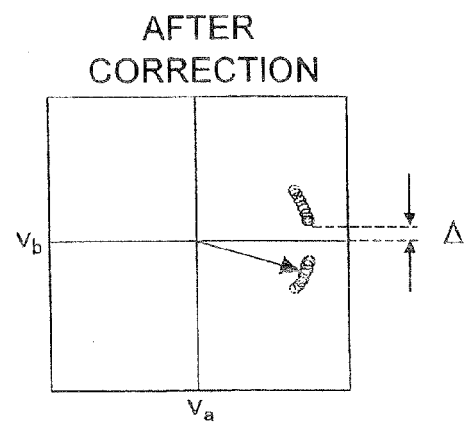
FIG. 12B is a diagram showing a voltage vector locus on the ab coordinates after the correction process shown in FIG. 11.

FIGS. 12A and 12B show a locus of the voltage vector (110) on the ab coordinates before and after the correction process performed in the step S2. FIG. 12A shows a voltage vector locus on the ab coordinates before the correction, and FIG. 12B shows a voltage vector locus on the ab coordinates after the correction. FIGS. 12A and 12B exemplify a case where the b-axis voltage $v_b$ is corrected. Each of FIGS. 12A and 12B shows many plotted dots indicating voltage values at timings. The voltage vector before the correction corresponding to FIG. 12A can be located at the vicinity of the a-axis where the phase currents of two phases cannot be detected while the voltage vector after the correction corresponding to FIG. 12B is not located at the vicinity of the a-axis by the correction with respect to $v_b$.

Figure 13:
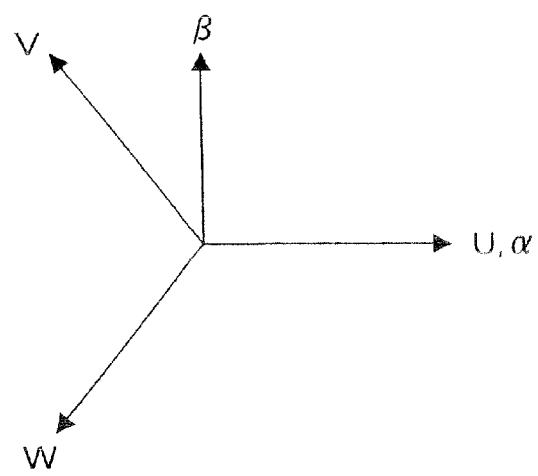
FIG. 13 is a diagram showing a relationship among the U-phase axis, the V-phase axis, the W-phase axis, the α-axis and the β-axis.

After the correction process in the step S2, the coordinates of the voltage vector 110 after the correction is converted by the "phase (n+2)$\pi$/3" in the step S3. In other words, the voltage vector 110 on the ab coordinates after the correction is converted into the voltage vector 110 on the $\alpha\beta$ coordinates. The $\alpha\beta$ coordinates ($\alpha\beta$ fixed coordinates) are fixed coordinates having coordinate axes that are the $\alpha$-axis and the $\beta$-axis orthogonal to the $\alpha$-axis. As shown in FIG. 13, the $\alpha$-axis is identical to the U-phase axis. Supposing that the $\alpha$-axis component and the $\beta$-axis component of the voltage vector 110 is the $\beta$-axis voltage $v_\alpha$ and the $\beta$-axis voltage $v_\beta$ the $\alpha$-axis voltage $v_\alpha$ and the $\beta$-axis voltage $v_\beta$, as well as the a-axis voltage $v_a$ and the b-axis voltage $v_b$ after the correction satisfy the equation (1-7) as below, which is a coordinate conversion equation.

$$\begin{pmatrix} v_\alpha \\ v_\beta \end{pmatrix} = \begin{bmatrix} \cos((n+2)\pi/3) & -\sin((n+2)\pi/3) \\ \sin((n+2)\pi/3) & \cos((n+2)\pi/3) \end{bmatrix} \begin{pmatrix} v_a \\ v_b \end{pmatrix} \quad (1\text{-}7)$$

In addition, it is also possible to convert the a-axis voltage $v_a$ and the b-axis voltage $v_b$ after the correction into the U-phase voltage $v_u$ and the V-phase voltage $v_v$ in accordance with the equation (1-8) below. In addition, the W-phase voltage $v_w$ is calculated in accordance with the equation (1-9) as below.

$$\begin{pmatrix} v_u \\ v_v \end{pmatrix} = \sqrt{\frac{2}{3}} \begin{bmatrix} \cos((n+2)\pi/3) & -\sin((n+2)\pi/3) \\ \cos(n\pi/3) & -\sin(n\pi/3) \end{bmatrix} \begin{pmatrix} v_a \\ v_b \end{pmatrix} \quad (1\text{-}8)$$

$$v_w = -(v_u + v_v) \quad (1\text{-}9)$$

Figure 14:
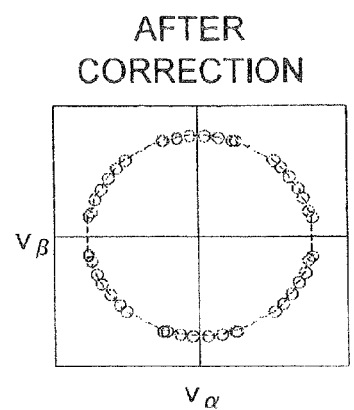
FIG. 14 is a diagram showing the voltage vector locus on the αβ coordinates that are obtained through the correction process shown in FIG. 11.
Figure 15A:
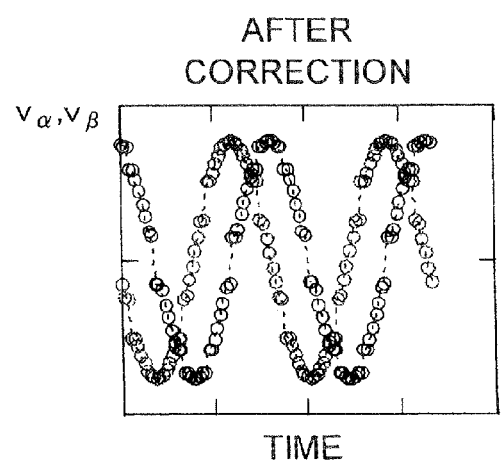
FIG. 15A is a diagram showing voltage waveforms of the α-axis voltage and the β-axis voltage obtained through the correction process shown in FIG. 11.
Figure 15B:
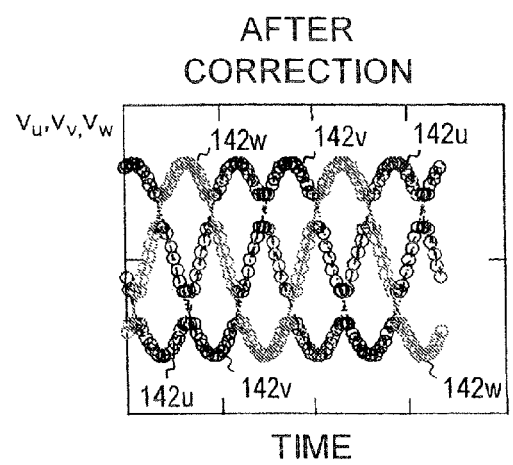
FIG. 15B is a diagram showing voltage waveforms of a U-phase voltage, a V-phase voltage and a W-phase voltage obtained through the correction process shown in FIG. 11.

The voltage vector locus on the $\alpha\beta$ coordinates after the above-mentioned correction process is shown in FIG. 14. By this correction process, an area where the voltage vector is not located exists every electrical angle of 60 degrees in the $\alpha\beta$ coordinates that are fixed coordinates. In addition, the voltage waveform of $v_\alpha$ and $v_\beta$ obtained through the above-mentioned correction process is shown in FIG. 15A with the horizontal axis of time. In addition, the voltage waveform of $v_u$, $v_v$ and $v_w$ obtained through the above-mentioned correction process is shown in FIG. 15B with the horizontal axis of time. In FIG. 15B, a group of plotted dots 142u on the distorted sine wave indicates a locus of $v_u$, a group of plotted dots 142v on the distorted sine wave indicates a locus of $v_v$, and a group of plotted dots 142w on the distorted sine wave indicates a locus of $v_w$. As understood from FIG. 15B too, a voltage difference between the phase voltages is secured to be larger than a predetermined value by the above-mentioned correction process.

Thus, in this correction method, when the coordinate conversion is performed from the dq coordinates to the fixed coordinates (e.g., the $\alpha\beta$ coordinates), the two-step coordinate conversion is performed via the ab coordinates. Since the correction process with respect to the voltage vector is performed on the ab coordinates that facilitate the correction, the necessary correction can be performed simply and securely. Since it is sufficient to correct only the coordinate axis components $v_a$ and $v_b$ of the voltage vector (the specified voltage vector) independently on the ab coordinates, the correction contents can be simple. In particular, the correction is necessary for all the three phases if the applied voltage is low, and it is easy to determine correction quantity in this case, too.

Note that it is obvious from the above-mentioned equation (1-2) that this two-step coordinate conversion is equivalent to the coordinate conversion between the dq coordinates and the αβ coordinates (normal one-step coordinate conversion), i.e., that the equation (1-10) as below holds. Furthermore, if position sensorless vector control is performed without using the position sensor for detecting a rotor position, the above-mentioned d-axis and q-axis are replaced with the γ-axis and the δ-axis for consideration.

$$\begin{bmatrix} \cos\theta & -\sin\theta \\ \sin\theta & \cos\theta \end{bmatrix} = \begin{bmatrix} \cos((n+2)\pi/3) & -\sin((n+2)\pi/3) \\ \sin((n+2)\pi/3) & \cos((n+2)\pi/3) \end{bmatrix} \begin{bmatrix} \cos\theta_D & -\sin\theta_D \\ \sin\theta_D & \cos\theta_D \end{bmatrix} \quad (1\text{-}10)$$

Furthermore, as understood from the above description, the b-axis that is orthogonal to the a-axis is also orthogonal to the U-phase axis, the V-phase axis or the W-phase axis that is a fixed axis (see FIG. 9). When amplitude $|v_b|$ of the b-axis component of the voltage vector is smaller than the threshold value $\Delta$, the amplitude $|v_b|$ is increased up to $\Delta$ in the step S2 shown in FIG. 11. Therefore, the threshold value $\Delta$ corresponds to a maximum value of the b-axis component of the voltage correction quantity in the correction process of the step S2 (in other words, a maximum value of the voltage correction quantity in the b-axis direction).

[Position Sensorless Vector Control Based on Application of High Frequency Voltage]

In each of the examples that will be described later, the application of a high frequency voltage is utilized for estimating a rotor position so that the position sensorless vector control is realized. As the rotor position estimating method utilizing the application of a high frequency voltage, various methods are proposed. Hereinafter, a principle of the estimating method proposed by the applicant will be described. This estimating method can be utilized in each of the examples that will be described later.

Figure 27:
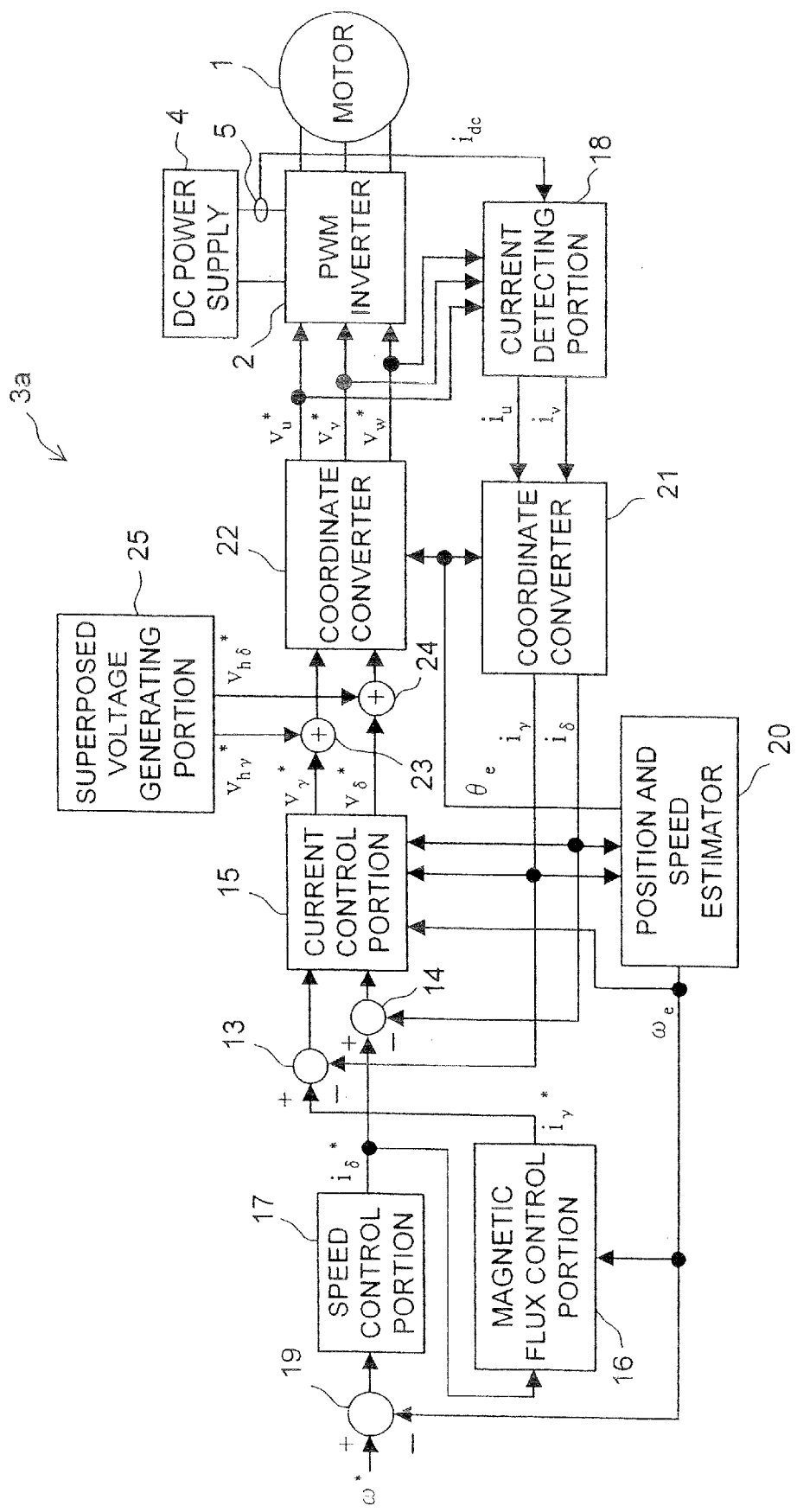
FIG. 27 is a block diagram showing a general structure of the motor driving system according to a first example of the present invention.

It is supposed that high frequency superposed voltage for estimating a rotor position is superposed to a γ-axis specified voltage value $v_\gamma^*$ and a δ-axis specified voltage value $v_\delta^*$ generated in accordance with the γ-axis specified current value $i_\gamma^*$ and the δ-axis specified current value $i_\delta^*$ in the motor driving system in which feedback control is performed so that the γ-axis current $i_\gamma$ and the δ-axis current $i_\delta$ follow respectively the γ-axis specified current value $i_\gamma^*$ and the δ-axis specified current value $i_\delta^*$ (e.g., the motor driving system shown in FIG. 27, which will be described later). This superposed voltage is generally a rotational voltage in which the voltage vector locus presents a circle.

The current expressed by the γ-axis specified current value $i_\gamma^*$ and the δ-axis specified current value $i_\delta^*$ is drive current for driving the motor 1, and the voltage expressed by the γ-axis specified voltage value $v_\gamma^*$ and the δ-axis specified voltage value $v_\delta^*$ is drive voltage applied to the motor 1 for supplying the drive current to the motor 1. When the above-mentioned superposed voltage is superposed on the drive voltage, superposed current corresponding to the superposed voltage is superposed on the drive current.

Figure 16:
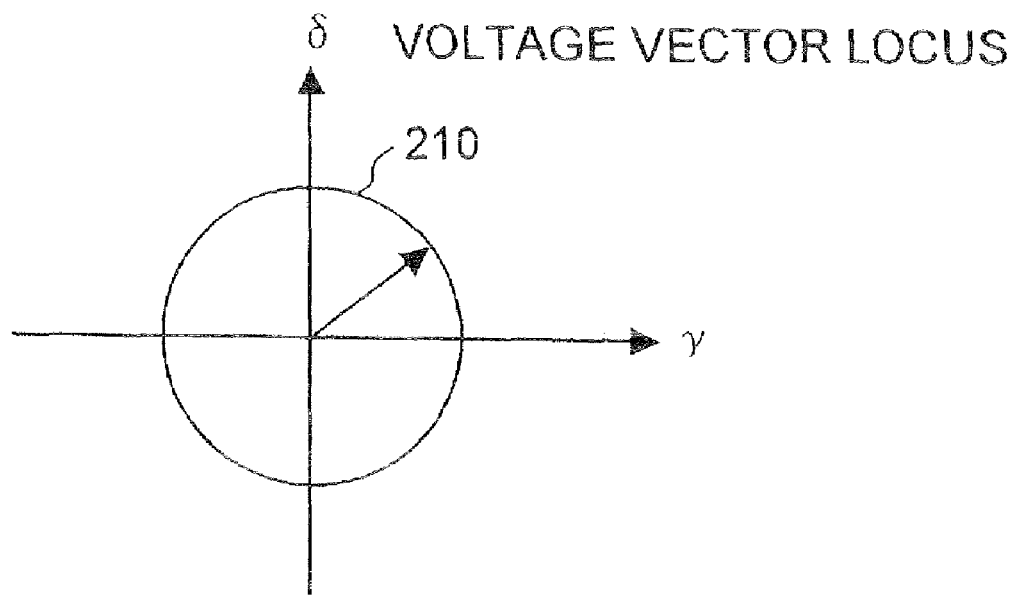
FIG. 16 is a diagram showing an example of the voltage vector locus of superposed voltage that can be superposed on the drive voltage of the motor shown in FIG. 1 (where, rotational voltage of a perfect circle is superposed).

The "high frequency" of the superposed voltage means that the frequency of the superposed voltage is sufficiently higher than the frequency of the drive voltage. Therefore, the frequency of the superposed current that is superposed in accordance with the superposed voltage is sufficiently higher than the frequency of the drive current. In addition, the "rotational voltage" means the voltage whose voltage vector presents a circular locus on the γδ coordinates like a voltage vector locus 210 shown in FIG. 16. For example, if the rotational voltage is three-phase balance voltage in the case of three-phase, the voltage vector locus presents a perfect circle having the center at the origin on the γδ coordinates like the voltage vector locus 210 shown in FIG. 16. Since this rotational voltage is a high frequency voltage that is asynchronous to the rotation of the motor 1, the application of the rotational voltage does not cause a rotation of the motor 1.

Figure 17:
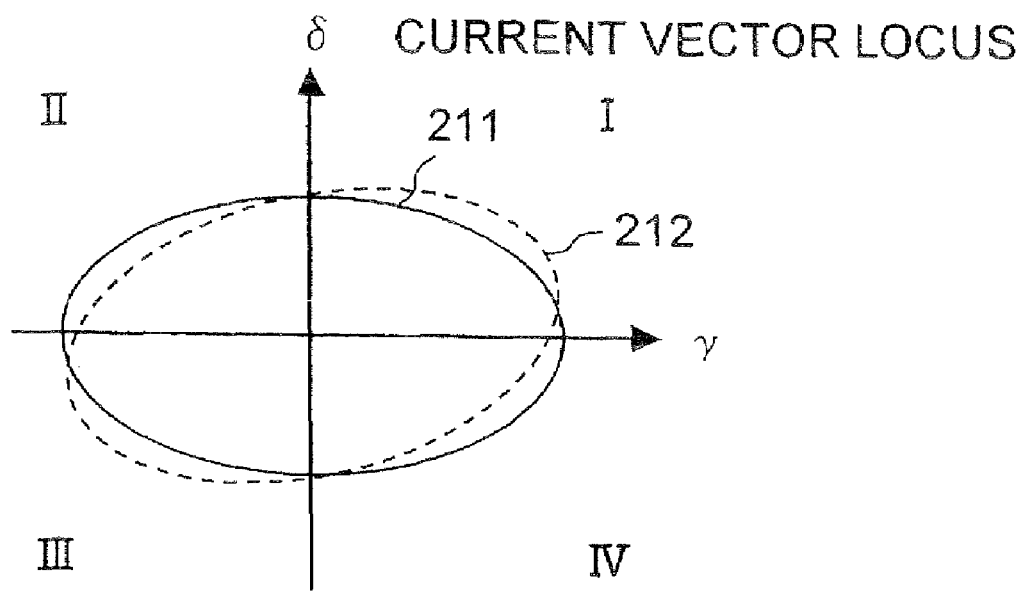
FIG. 17 is a diagram showing an example of a current vector locus of a superposed current flowing in the motor corresponding to the superposed voltage shown in FIG. 16.

If the motor 1 is an interior permanent-magnet type synchronous motor or the like and if the inequality $L_d<L_q$ holds, the current vector locus of the superposed current flowing in the motor 1 by the superposed voltage that presents the voltage vector locus 210 becomes an ellipse having the center at the origin on the γδ coordinates, the major axis in the γ-axis direction and the minor axis in the δ-axis direction like a current vector locus 211 shown in FIG. 17. However, the current vector locus 211 is a current vector locus in the case where the axis error $\Delta\theta$ is zero. The current vector locus of the superposed current in the case where the axis error $\Delta\theta$ is not zero becomes like the ellipse presented by a current vector locus 212, in which the major axis direction (or the minor axis direction) does not match the γ-axis direction (or the δ-axis direction). In other words, if the axis error $\Delta\theta$ is not zero, the current vector locus 211 is inclined with respect to the center at the origin on the γδ coordinates due to the salient magnetic poles of the motor 1 so as to present the current vector locus 212.

When the γ-axis component and the δ-axis component of the superposed current are referred to as γ-axis superposed current $i_{h\gamma}$ and δ-axis superposed current $i_{h\delta}$, respectively, the product ($i_{h\gamma} \times i_{h\delta}$) of them has a DC component depending on the inclination of the ellipse expressed by the current vector locus 212. The product ($i_{h\gamma} \times i_{h\delta}$) has a positive value in the first and the third quadrants, while it has a negative value in the second and the fourth quadrant of the current vector locus. Therefore, although it has no DC component if the ellipse is not inclined (in case of the current vector locus 211), it has a DC component if the ellipse is inclined (in case of the current vector locus 212). Note that "I, II, III and IV" in FIG. 17 (and in FIG. 21 and the like that will be described later) represent the first, the second, the third and the fourth quadrants on the γδ coordinates.

Figure 18:
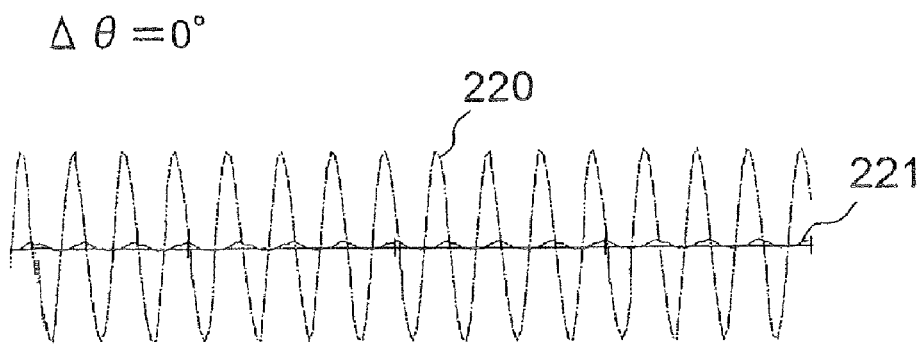
FIG. 18 is a diagram showing a product of a γ-axis component and a δ-axis component of the superposed current shown in FIG. 17 and a DC component of the product (where, axis error Δθ is 0 degree).
Figure 19:
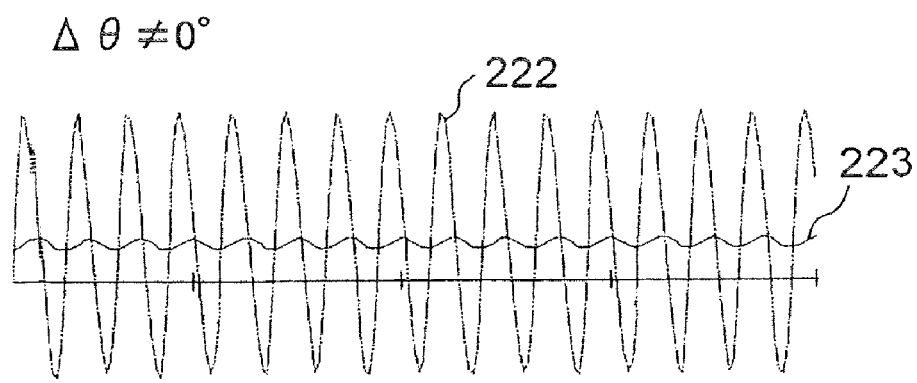
FIG. 19 is a diagram showing a product of a γ-axis component and a δ-axis component of the superposed current shown in FIG. 17 and a DC component of the product (where, axis error Δθ is not 0 degree)

FIG. 18 shows the product ($i_{h\gamma} \times i_{h\delta}$) and the DC component of the product by curves 220 and 221, respectively, with time in the horizontal axis in the case where the axis error $\Delta\theta$ is zero. FIG. 19 shows the product ($i_{h\gamma} \times i_{h\delta}$) and the DC component of the product by curves 222 and 223, respectively, with time in the horizontal axis in the case where the axis error $\Delta\theta$ is not zero. As understood from FIGS. 18 and 19, the DC component of the product ($i_{h\gamma} \times i_{h\delta}$) becomes zero if the $\Delta\theta$ is zero degree, and it is not zero if the $\Delta\theta$ is not zero degree. In addition, the DC component increases as the axis error $\Delta\theta$ increases (it is generally proportional to the axis error $\Delta\theta$). Therefore, when this DC component is controlled to converge to zero, the axis error $\Delta\theta$ also converges on zero. Utilizing this characteristic, a rotor position can be estimated.

The superposed voltage can be expressed by the equation (2-1) below. Here, $v_{h\gamma}^*$ and $v_{h\delta}^*$ represent respectively the γ-axis component and the δ-axis component of the superposed voltage that are superposed on the drive voltage (which is expressed by $v_\gamma^*$ and $v_\delta^*$). In addition, $\omega_h$ represents frequencies of $v_{h\gamma}^*$ and $v_{h\delta}^*$ (electrical angular velocities on the γδ coordinates), and $V_{h\gamma}$ and $V_{h\delta}$ represent respectively amplitude of the superposed voltage in the γ-axis direction (i.e., amplitude of $v_{h\gamma}^*$) and amplitude of the superposed voltage in the δ-axis direction (i.e., amplitude of $v_{h\delta}^*$). In addition, t represents time.

$$\begin{bmatrix} v_{h\gamma}^* \\ v_{h\delta}^* \end{bmatrix} = \begin{bmatrix} V_{h\gamma}\cos(\omega_h t) \\ V_{h\delta}\sin(\omega_h t) \end{bmatrix} \quad (2\text{-}1)$$

Figure 20:
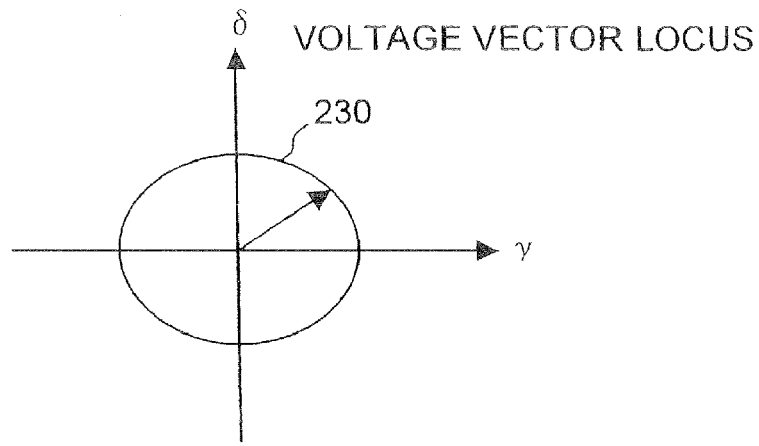
FIG. 20 is a diagram showing an example of the voltage vector locus of the superposed voltage that can be superposed on the drive voltage of the motor shown in FIG. 1 (where, elliptical rotational voltage is superposed).

If the rotational voltage is superposed as the superposed voltage, the amplitude $V_{h\gamma}$ of the superposed voltage in the γ-axis direction may be different from the amplitude $V_{h\delta}$ in the δ-axis direction (they are made different from each other in this embodiment as described later in detail). FIG. 20 shows a voltage vector locus 230 of the rotational voltage as the superposed voltage in the case where the amplitude $V_{h\gamma}$ is made larger than the amplitude $V_{h\delta}$. The voltage vector locus 230 presents an ellipse having the center at the origin on the γδ coordinates, the major axis in the γ-axis direction and the minor axis in the δ-axis direction.

Figure 21:
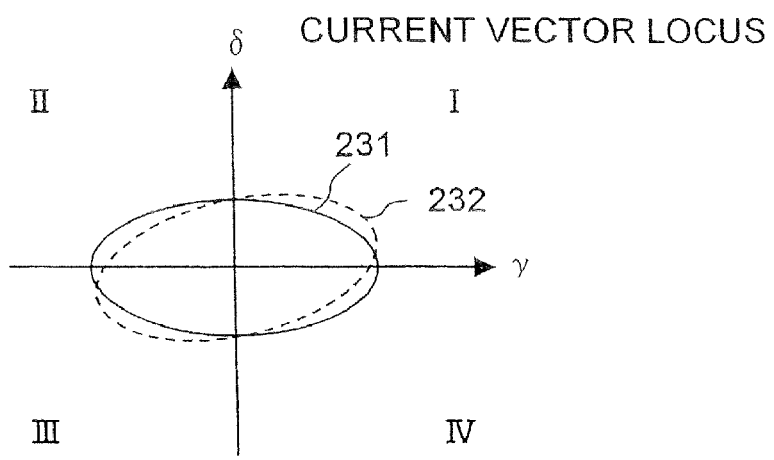
FIG. 21 is a diagram showing an example of a current vector locus of the superposed current when elliptical rotational voltage is superposed on the drive voltage of the motor shown in FIG. 1.

FIG. 21 shows current vector loci (231 and 232) of the superposed current that flow in accordance with the superposed voltage expressed by the voltage vector locus 230. In this case too, if the axis error Δθ is zero, the current vector locus of the superposed current presents the ellipse having the center at the origin on the γδ coordinates and the major axis in the γ-axis direction as the current vector locus 231. As a result, the product ($i_{h\gamma} \times i_{h\delta}$) does not have a DC component. On the other hand, if the axis error Δθ is not zero, the current vector locus of the superposed current is inclined from the current vector locus 231 with respect to the center of the origin as the current vector locus 232. As a result, the product ($i_{h\gamma} \times i_{h\delta}$) has a DC component. Therefore, the rotor position can be estimated in the same manner as the case where the rotational voltage of the perfect circle is superposed.

Further, it is also possible to adopt alternating voltage as the superposed voltage. If only one of the amplitude $V_{h\gamma}$ and the amplitude $V_{h\delta}$ is zero, the superposed voltage becomes alternating voltage. For example, if $V_{h\gamma} \neq 0$ and $V_{h\delta} = 0$ hold, the superposed voltage becomes the alternating voltage in the γ-axis direction so that the voltage vector locus of the superposed voltage presents a line segment on the γ-axis having the center at the origin on the γδ coordinates. In this case too, if the axis error Δθ is zero, the current vector locus of the superposed current presents the line segment on the γ-axis having the center at the origin on the γδ coordinates as the current vector locus 241 shown in FIG. 22. As a result, the product ($i_{h\gamma} \times i_{h\delta}$) does not have a DC component. On the other hand, if the axis error Δθ is not zero, the current vector locus of the superposed current is inclined from the current vector locus 241 with respect to the center of the origin as the current vector locus 242. As a result, the product ($i_{h\gamma} \times i_{h\delta}$) has a DC component. Therefore, the rotor position can be estimated in the same manner as the case where the rotational voltage of the perfect circle is superposed.

Next, a theoretical formula of the above-mentioned estimation principle will be examined. The case where the d-axis and the q-axis are estimated (i.e., the case where Δθ shown in FIG. 7 is estimated) is considered. First, the equation about the superposed component is shown in the following equation (3-1). Here, the following equations (3-2a), (3-2b), (3-2c), (3-2d) and (3-2e) hold. Note that "p" represents the differential operator.

$$p\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \begin{bmatrix} v_{h\gamma}^* \\ v_{h\delta}^* \end{bmatrix} \quad (3\text{-}1)$$

$$L_\gamma = L_0 + L_1 \cos 2\Delta\theta \quad (3\text{-}2a)$$

$$L_\delta = L_0 - L_1 \cos 2\Delta\theta \quad (3\text{-}2b)$$

$$L_{\gamma\delta} = L_1 \sin 2\Delta\theta \quad (3\text{-}2c)$$

$$L_0 = \frac{L_d + L_q}{2} \quad (3\text{-}2d)$$

$$L_1 = \frac{L_d - L_q}{2} \quad (3\text{-}2e)$$

If the superposed voltage to be applied is expressed by the above equation (2-1), the orthogonal biaxial components $i_{h\gamma}$ and $i_{h\delta}$ of the superposed current that flows in accordance with application of the superposed voltage are expressed by the following equation (3-3). Since the γ-axis and the δ-axis are orthogonal to each other, the components $i_{h\gamma}$ and $i_\delta$ can be collectively referred to as the orthogonal biaxial components. In the equation (3-3), "s" represents the Laplace operator, and "$\theta_h = \omega_h t$" holds.

$$\begin{bmatrix} i_{h\gamma} \\ i_{h\delta} \end{bmatrix} = \frac{1}{L_d L_q} \begin{bmatrix} L_\delta & -L_{\gamma\delta} \\ -L_{\gamma\delta} & L_\gamma \end{bmatrix} \frac{1}{s} \begin{bmatrix} v_{h\gamma}^* \\ v_{h\delta}^* \end{bmatrix} \quad (3\text{-}3)$$

$$= \frac{1}{\omega_h L_d L_q} \begin{bmatrix} L_0 - L_1\cos 2\Delta\theta & -L_1\sin 2\Delta\theta \\ -L_1\sin 2\Delta\theta & L_0 + L_1\cos 2\Delta\theta \end{bmatrix} \begin{bmatrix} V_{h\gamma}\sin\theta_h \\ -V_{h\delta}\cos\theta_h \end{bmatrix}$$

When a product of the orthogonal biaxial components of the superposed current is rearranged based on the above equation (3-3), the following equation (3-4) is obtained. Here, "$K_1$" to "$K_7$" are coefficients that are fixed if the $L_d$, $L_q$, $V_{h\gamma}$ and $V_{h\delta}$ are designated.

$i_{h\gamma} \times i_{h\delta} = K_1 \sin(2\theta_h) + K_2 \sin(2\Delta\theta) + K_3 \sin(4\Delta\theta) + K_4 \sin(2\Delta\theta + 2\theta_h) + K_5 \sin(2\Delta\theta - 2\theta_h) + K_6 \sin(4\Delta\theta + 2\theta_h) + K_7 \sin(4\Delta\theta - 2\theta_h)$ (3-4)

The DC component of the product ($i_{h\gamma} \times i_{h\delta}$) is expressed by $(i_{h\gamma} \times i_{h\delta})_{DC}$. This DC component does not include a term that varies in accordance with $\theta_h$, so it is expressed in the equation (3-5).

$(i_{h\gamma} \times i_{h\delta})_{DC} = K_2 \sin(2\Delta\theta) + K_3 \sin(4\Delta\theta)$ (3-5)

If "Δθ≈0" holds, the approximations "sin(2Δθ)≈2Δθ" and "sin(4Δθ)≈4Δθ" hold. Therefore, the axis error Δθ can be expressed in the following equation (3-6). In the equation (3-6), "K" denotes a coefficient that is defined by the coefficients $K_2$ and $K_3$. Furthermore, if the superposed voltage is the rotational voltage of a perfect circle, the coefficient $K_3$ becomes zero so that the term of "sin(4Δθ)" is eliminated from the equation (3-5).

$\Delta\theta = K \cdot (i_{h\gamma} \times i_{h\delta})_{DC}$ (3-6)

[Combination of Single Shunt Current Detecting Method and Position Sensorless Vector Control Based on the Application of a High Frequency Voltage]

When the above-mentioned single shunt current detecting method is adopted, a single current sensor is sufficient so that cost reduction can be achieved. In addition, if the application of a high frequency voltage is utilized, the rotor position can be estimated appropriately particularly at a standstill or at a low rotation speed of the motor 1. Therefore, the motor driving system having the combination thereof can exert excellent performances in cost and control aspects, but it is necessary to give special consideration when they are combined. It is because that if the single shunt current detecting method adopted, it is necessary to use the voltage correction process as shown in FIG. 11 so as to prevent a period in which the phase currents of two phases cannot be measured, and the voltage correction may cause a difference between the desired superposed voltage (the superposed voltage to be superposed ideally) and the superposed voltage that is actually superposed. The control system tries to perform the control on the precondition that the desired superposed voltage is superposed, so this difference can cause deterioration of accuracy of estimating the position (estimation accuracy of the rotor position).

Figure 23:
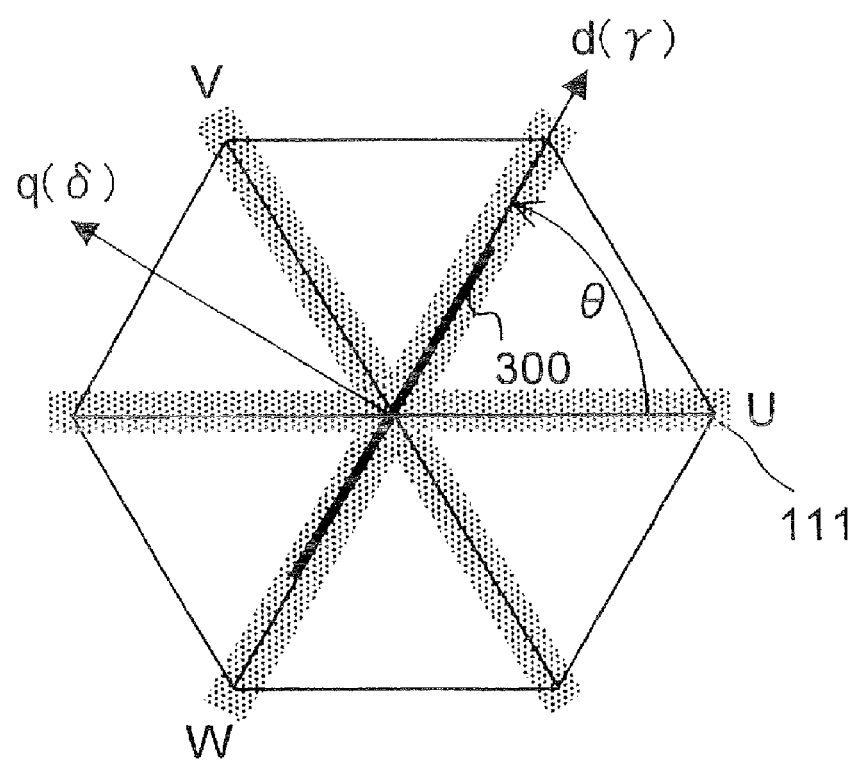
FIG. 23 is a space vector diagram in the case where alternating voltage in the γ-axis direction is superposed as the superposed voltage (where the motor is at a standstill).

This problem will be described moire in detail with reference to FIG. 23. FIG. 23 is a space vector diagram in the case where alternating voltage in the γ-axis direction is superposed as the superposed voltage. In FIG. 23, the thick solid line denoted by the reference numeral 300 is a voltage vector locus of this superposed voltage at a rotation standstill of the motor 1. FIG. 23 and FIGS. 24A-24C as well as FIGS. 25A-25C that will be described later are on the assumption that control for matching the γ-axis with the d-axis is performed. As shown in FIG. 23, if the γ-axis (d-axis) is located in the region 111 where the phase currents of two phases cannot be detected, it is necessary to correct the specified voltage value including the superposed voltage (i.e., it is necessary to correct the drive voltage on which the superposed voltage is superposed). If the superposed voltage is alternating voltage in the γ-axis direction, this voltage correction changes the superposed voltage largely from the desired superposed voltage, so that accuracy for estimating the position is deteriorated. This problem will happen not only at a standstill but also at a very low rotation speed as well. The very low rotation speed means that the rotation speed of the motor 1 is very low.

Figures 24A, 24B, 24C:
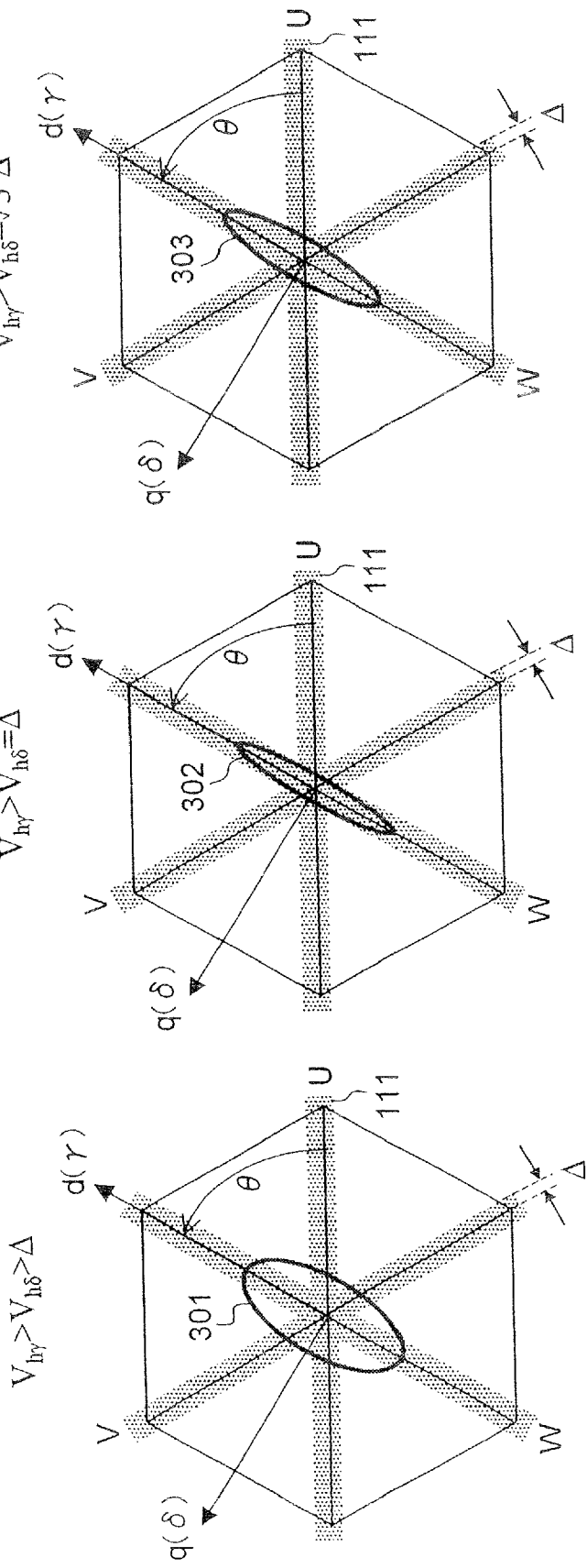
FIGS. 24A-24C are diagrams for explaining characteristics of the superposed voltage according to the embodiment of the present invention.

Considering this fact, in the motor driving system according to this embodiment, the superposed voltage is regarded as the rotational voltage (at a standstill in particular). FIG. 24A is a space vector diagram in the case where elliptical rotational voltage is superposed as the superposed voltage. The ellipse denoted by the reference numeral 301 is a voltage vector locus of this superposed voltage at a standstill of the motor 1. Apart of the voltage vector locus 301 is located out of the region 111. When the voltage vector of the superposed voltage goes out of the region 111, the superposed voltage is not affected by the voltage correction. Therefore, the influence of the voltage correction becomes smaller in the case where the elliptical rotational voltage presenting the voltage vector locus 301 is the superposed voltage than in the case where the alternating voltage as shown in FIG. 23 is superposed.

Furthermore in the following description, the ellipse means a shape of the voltage vector locus of the superposed voltage in the space vector diagram (e.g., on the γδ coordinates), unless there is a particular description.

Basically, although the influence of the voltage correction is, decreased if amplitude of the rotational voltage is increased, the current component concerning a torque is increased if amplitude in the δ-axis direction is increased. As a result, the q-axis current varies, so that torque pulsation is apt to occur. Therefore, as shown in the voltage vector locus 301, $V_{h\gamma}$ is made larger than $V_{h\delta}$ so that the direction of the minor axis of the ellipse matches the δ-axis direction. Thus, the torque pulsation caused by the superposing can be reduced.

However, as shown in FIG. 24A, the amplitude $V_{h\delta}$ of the superposed voltage in the δ-axis direction should be set to a value larger than the threshold value Δ as the maximum value of the b-axis component of the voltage correction quantity (see the above expression (1-5) and FIG. 12B and the like). It is because that an ellipse 302 shown in FIG. 24B indicates a voltage vector locus of the superposed voltage at a standstill in the case where "$V_{h\delta}=\Delta$" holds, and that if "$V_{h\delta}>\Delta$" holds, a part of the voltage vector locus may be out of the region 111 if the amplitude $V_{h\gamma}$ of the γ-axis direction is set appropriately even at a standstill and in the case where the d-axis matches the fixed axis of the armature winding. On the contrary, if "$V_{h\delta}<\Delta$" holds, the influence of the voltage correction increases when the d-axis is included in the region 111, so that the estimation error of the rotor position increases.

In summary, the superposed voltage that satisfies the following expression (4-1) should be superposed. However, even if the following expression (4-1) is satisfied, there will be the case where the voltage vector locus of the superposed voltage does not appear outside the region 111 depending on the amplitude $V_{h\gamma}$. Therefore, it is desirable that the elliptical rotational voltage that satisfies the following expression (4-2) should be the superposed voltage. It is because that an ellipse 303 shown in FIG. 24C indicates the voltage vector locus of the superposed voltage at a standstill when $V_{h\delta}$ matches the product of the square root of 3 and Δ (this product corresponds to the radius of the circle 131 shown in FIG. 9), but there will be certain timing for the voltage vector of the superposed voltage to appear outside the region 111 in any state if the following expression (4-2) is satisfied. Note that it is possible to replace the inequality sign ">" on the right side of $V_{h\delta}$ with "≧" in the expressions (4-1) and (4-2).

$$V_{h\gamma} > V_{h\delta} > \Delta \tag{4-1}$$

$$V_{h\gamma} > V_{h\delta} > \sqrt{3}\Delta \tag{4-2}$$

The above expression (4-1) or (4-2) is the inequality that should be satisfied at a standstill of the motor 1. If the motor 1 is rotating, the above expression (4-1) or (4-2) should not necessarily be satisfied (however, the expression may be satisfied). For example, it is possible to adopt the structure in which a size of the minor axis of the ellipse (i.e., the amplitude $V_{h\delta}$) decreases along with increase of the rotation speed ($\omega_e$ or ω* that will be described later) or the drive voltage of the motor 1. Here, the drive voltage means amplitude of the drive voltage, which can be expressed by the square root of the sum of the square of $v_\gamma^*$ and the square of $v_\delta^*$, for example.

The standstill state of the motor 1 corresponds to the case where the drive voltage to be applied to the motor 1 is zero, while the rotating state of the motor 1 corresponds to the case where the drive voltage to be applied to the motor 1 is not zero. Since the rotation speed is usually increased along with increase of the drive voltage (the amplitude of the drive voltage), there is no difference between the concept of decreasing a size of the minor axis of the ellipse in accordance with increase of the rotation speed of the motor 1 and the concept of decreasing a size of the minor axis of the ellipse in accordance with increase of the drive voltage, or they are similar concepts.

As shown in FIGS. 25A-25C, for example, the voltage vector locus of the superposed voltage is altered in accordance with the rotation speed (or the drive voltage). FIGS. 25A, 25B and 25C show the space vector diagrams when the motor 1 is at a standstill ($\omega_e=0$), at a low rotation speed ($\omega_e=\omega_1>0$) and at high rotation speed ($\omega_e=\omega_2>\omega_1$), respectively Reference numeral 311 in FIG. 25A, reference numeral 312 in FIG. 25B and reference numeral 313 in FIG. 25C indicate examples of the voltage vector locus of the superposed voltage when the motor 1 is at a standstill, at a low rotation speed and at high rotation speed, respectively. Reference numeral 322 in FIG. 25B and reference numeral 323 in FIG. 25C indicate the voltage vectors of the drive voltage when the motor 1 is at a low rotation speed and at high rotation speed, respectively. If the motor 1 is rotating and the drive voltage is not zero, the voltage vector locus of the superposed voltage is shifted in the space vector diagram by the voltage vector of the drive voltage.

In addition, a broken line ellipse 319 shown in FIG. 25B indicates the voltage vector locus 311 at a standstill with the center at the endpoint of the voltage vector 322 expressed on FIG. 25B. Note that the above-mentioned FIGS. 16, 17 and 20-22 are diagrams showing the voltage vector locus or the current vector locus when the drive voltage is zero.

Since the voltage vector locus of the superposed voltage is shifted by the voltage vector of the drive voltage when the motor 1 is rotating, the voltage vector locus is apt to appear outside the region 111. Therefore, it is possible to decrease a size of the minor axis of the ellipse when the motor 1 is rotating. Thus, an effect of reducing the torque pulsation can be obtained. In addition, it is possible to make the superposed voltage be alternating voltage in the γ-axis direction by satisfying "$V_{h\delta}=0$" at a high rotation speed in which the drive voltage is sufficiently high, as shown in FIG. 25C (however, the elliptical rotational voltage may be remained). It is because that if the superposed voltage is made to be alternating voltage, the voltage vector locus of the superposed voltage presents a line segment, and that the voltage vector locus can appear outside the region 111 sufficiently if the drive voltage is high even if it is not elliptical voltage. If the superposed voltage is made to be alternating voltage in the γ-axis direction, more effect of reducing the torque pulsation can be obtained.

Figure 26A:
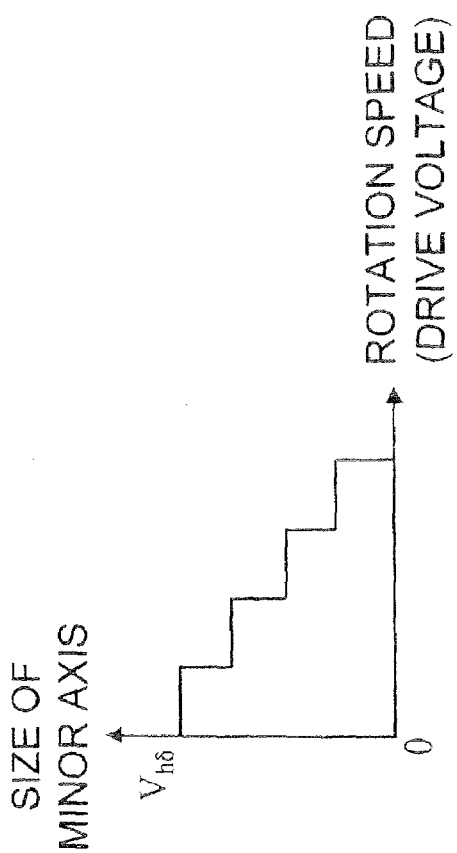
FIGS. 26A and 26B are diagrams showing decreases in size of the minor axis of the ellipse that is the voltage vector locus of the superposed voltage according to the embodiment of the present invention in accordance with increase of the rotation speed or the drive voltage.
Figure 26B:
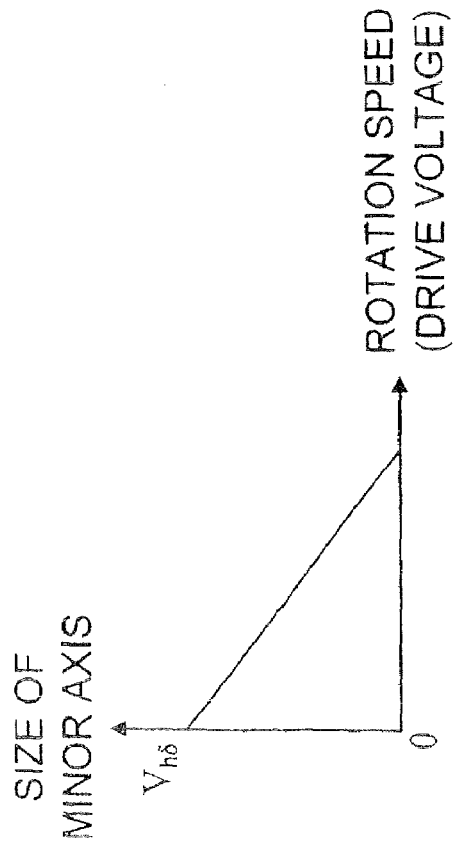

The decrease in size of the minor axis of the ellipse in accordance with increase of the rotation speed or the drive voltage of the motor 1 may be performed continuously as shown in FIG. 96A or step by step as shown in FIG. 26B. More specifically, the size of the minor axis of the ellipse may be decreased in accordance with the increase of the rotation speed or the drive voltage as it increases, or the size of the minor axis of the ellipse may be decreased by a step at the timing when the rotation speed or the drive voltage has increased by a certain quantity. Furthermore, as the example shown in FIG. 25C or 26B) it is possible to make the superposed voltage be alternating voltage in the γ-axis direction by satisfying "$V_{h\gamma}\neq 0$" and "$V_{h\delta}=0$" when the rotation speed ($\omega_e$ or $\omega^*$ that will be described later) becomes a predetermined speed or higher or when the drive voltage (amplitude of the drive voltage) becomes a predetermined voltage or higher.

In addition, if a size of the minor axis of the ellipse at a low rotation speed is set to a value similar to that at a standstill, the voltage vector locus of the superposed voltage becomes like the broken line ellipse 319 shown in FIG. 25B so that the voltage vector locus can enter the region 111 more easily than the voltage vector locus 312. This also indicates that it is desirable to decrease a size of the minor axis at a rotating state than at a standstill.

Furthermore, "A New High-Frequency Voltage Injection Method for Sensorless Drive of Permanent-Magnet Synchronous Motors with Pole Saliency", Shinnaka, Institute of Electrical Engineers of Japan, Papers D, 2006, vol. 126-11, pp. 1572-1584 (hereinafter referred to as a first non-patent document) discloses a method of increasing the size of the minor axis of the ellipse of the high frequency voltage ($v_{1h}$) in accordance with increase of the rotation speed as shown in the following equation (A). According to this method, the high frequency voltage becomes alternating voltage in the γ-axis direction at a standstill (see equation (23) in the above-mentioned first non-patent document). Therefore, if the above-mentioned method of the first non-patent document is applied to the single shunt current detecting method, the estimation error of the rotor position will increase because of the large influence of the voltage correction at a standstill and at a very low rotation speed. In addition, there will be another problem that the torque pulsation may increase along with increase of the rotation speed. Note that $V_h$ and $\omega_h$ are fixed values in the equation (A).

$$v_{1h} = V_h \begin{bmatrix} \cos\omega_h t \\ \dfrac{\omega}{\omega_h}\sin\omega_h t \end{bmatrix} \quad (A)$$

Hereinafter, first to sixth examples will be described as concrete examples of the above-mentioned motor driving system. A matter described in a certain example can also be applied to other examples as long as there is no contradiction.

FIRST EXAMPLE

A first example will be described. FIG. 27 is a general structure block diagram of a motor driving system according to a first example. In FIG. 27, the same parts as those shown in FIG. 1 are denoted by the same reference numerals.

The motor driving system shown in FIG. 27 includes a motor 1, an inverter 2, a DC power supply 4 and a current sensor 5. It also includes a controller 3a that works as the controller 3 (the motor control device) shown in FIG. 1. The controller 3a includes subtracters 13 and 14, a current control portion 15, a magnetic flux control portion 16, a speed control portion 17, a current detecting portion 18, a subtracter 19, a position and speed estimator 20 (hereinafter referred to as "estimator 20" simply), coordinate converters 21 and 22, adders 23 and 24, and a superposed voltage generating portion 25.

As described above, the current sensor 5 detects the bus current and delivers a signal indicating a current value of the bus current. The bus current is denoted by $i_{dc}$. The current detecting portion 18 refers to the three-phase specified voltage values $v_u^*$, $v_v^*$ and $v_w^*$ delivered by the coordinate converter 22 (i.e., to the set values CntU, CntV and CntW of the counter shown in FIG. 6), so as to decide which phases are the maximum phase, the intermediate phase and the minimum phase, respectively, and to decide the timings ST1 and ST2 at which the output signal of the current sensor 5 should be sampled. Then, based on current values of the bus current obtained at the timings, the U-phase current $i_u$ and the V-phase current $i_v$ are calculated and delivered. On this occasion, the relational expression "$i_u+i_v+i_w=0$" is used, if necessary ($i_w$ represents the W-phase current).

The coordinate converter 21 converts the U-phase current $i_u$ and the V-phase current $i_v$ into the γ-axis current $i_\gamma$ and the δ-axis current $i_\delta$ based on the estimated rotor position $\theta_e$, and it delivers the converted current as control current.

Figure 28:
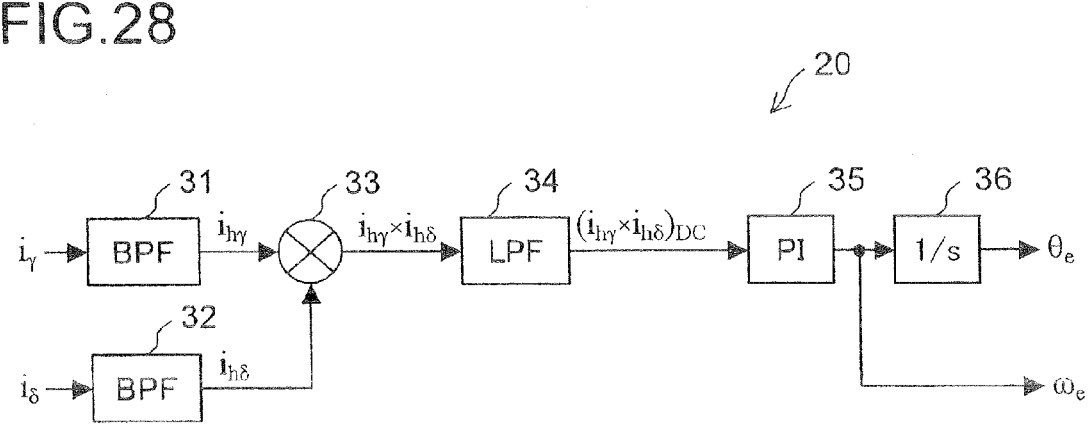
FIG. 28 is an internal block diagram of the estimator shown in FIG. 27.

The estimator 20 estimates the rotor position and the motor speed (rotation speed) based on $i_\gamma$ and $i_\delta$ from the coordinate converter 21 and delivers the estimated rotor position $\theta_e$ and the estimated motor speed $\omega_e$. The inside block of the estimator 20 is shown in FIG. 28. The estimator 20 shown in FIG. 28 includes band-pass filters (hereinafter referred to as "BPFs") 31 and 32, a multiplier 33, a low-pass filter (hereinafter referred to as a "LPF") 34, a proportional-plus-integral calculator 35, and an integrator 36.

The BPF 31 extracts the γ-axis component $i_{h\gamma}$ of the superposed current from a value of the γ-axis current $i_\gamma$ delivered from the coordinate converter 21. Similarly, the BPF 32 extracts the δ-axis component $i_{h\delta}$ of the superposed current from a value of the δ-axis current $i_\delta$ delivered from the coordinate converter 21. The multiplier 33 calculates a product $(i_{h\gamma} \times i_{h\delta})$ of $i_{h\gamma}$ and $i_{h\delta}$ extracted by the BPFs 31 and 32. The LPF 34 removes the high frequency component from the product $(i_{h\gamma} \times i_{h\delta})$ and extracts a DC component $(i_{h\gamma} \times i_{h\delta})_{DC}$ of the product $(i_{h\gamma} \times i_{h\delta})$.

The proportional-plus-integral calculator 35 cooperates with individual portions of the controller 3a to perform the proportional plus integral control so that PLL (Phase Locked Loop) control is realized. The proportional-plus-integral calculator 35 calculates the estimated motor speed $\omega_e$ so that the DC component $(i_{h\gamma} \times i_{h\delta})_{DC}$ delivered from the LPF 34 converges on zero (i.e., the axis error $\Delta\theta$ converges on zero). The integrator 36 integrates the estimated motor speed $\omega_e$ delivered from the proportional-plus-integral calculator 35 so as to calculate the estimated rotor position $\theta_e$. The calculated values $\omega_e$ and $\theta_e$ are both supplied as an output value of the estimator 20 to the individual portions of the controller 3a that need the value.

With reference to FIG. 27 again, a specified motor speed value ω*, which is a specified value for making the motor 1 (rotor 6) rotate at desired rotation speed, is supplied externally to the motor driving system. The subtracter 19 subtracts the estimated motor speed $\omega_e$ delivered by the estimator 20 from the specified motor speed value ω*, and a result of the subtraction (speed error) is delivered. The speed control portion 17 calculates the δ-axis specified current value $i_\delta^*$ indicating the current value that the δ-axis current $i_\delta$ should follow, based on a result of subtraction $(\omega^* - \omega_e)$ performed by the subtracter 19. For example, the value $i_\delta^*$ is calculated so that the result $(\omega^* - \omega_e)$ converges on zero by the proportional plus integral control. The magnetic flux control portion 16 uses $\omega_e$ and $i_\delta^*$ so as to calculate the γ-axis specified current value $i_\gamma^*$ indicating the current value that the γ-axis current $i_\gamma$ should follow. For example, it calculates the value $i_\gamma^*$ for realizing maximum torque control.

The subtracter 13 subtracts $i_\gamma$ delivered by the coordinate converter 21 from $i_\gamma^*$ delivered by the magnetic flux control portion 16 so as to calculate the current error $(i_\gamma^* - i_\gamma)$. The subtracter 14 subtracts $i_\delta$ delivered by the coordinate converter 21 from $i_\delta^*$ delivered by the speed control portion 17 so as to calculate the current error $(i_\delta^* - i_\delta)$.

The current control portion 15 calculates the γ-axis specified voltage value $v_\gamma^*$ and the δ-axis specified voltage value $v_\delta^*$ indicating respectively the γ-axis component and the δ-axis component of the drive voltage of the motor 1 based on individual current errors calculated by the subtracters 13 and 14, $i_\gamma$ and $i_\delta$ from the coordinate converter 21 and $\omega_e$ from the estimator 20, so that $i_\gamma$ follows $i_\gamma^*$ and that $i_\delta$ follows $i_\delta^*$.

The superposed voltage generating portion 25 generates and delivers $v_{h\gamma}^*$ and $v_{h\delta}^*$ expressed by the above equation (2-1), so that the above-mentioned superposed voltage is superposed on the drive voltage. The adders 23 and 24 adds $v_{h\gamma}^*$ and $v_{h\delta}^*$ from the superposed voltage generating portion 25 to $v_\gamma^*$ and $v_\delta^*$ from the current control portion 15, so as to calculate $(v_\gamma^* + v_{h\gamma}^*)$ and $(v_\delta^* + v_{h\delta}^*)$ indicating the drive voltage on which the superposed voltage is superposed.

The coordinate converter 22 refers to $\theta_e$ from the estimator 20 and performs the voltage correction on $(v_\gamma^* + v_{h\gamma}^*)$ and $(v_\delta^* + v_{h\delta}^*)$ so that the phase currents of two phases can be detected. Then, it generates the three-phase specified voltage values $v_u^*$, $v_v^*$ and $v_w^*$. The inverter 2 supplies the three-phase alternating voltages to the motor 1 in accordance with the three-phase specified voltage values, as described above.

Figure 29:
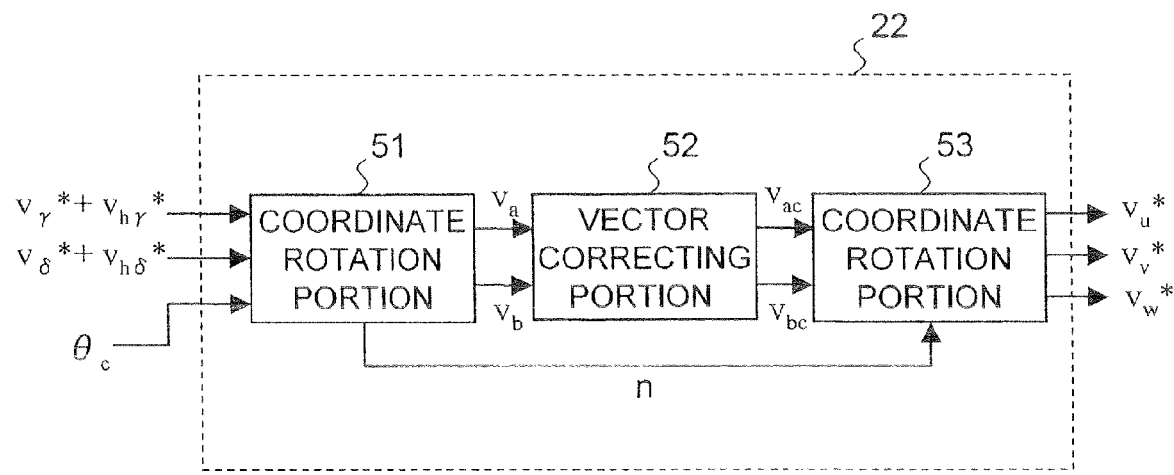
FIG. 29 is an internal block diagram of the coordinate converter (a two-phase to three-phase coordinate converter) shown in FIG. 27.

FIG. 29 shows an internal block diagram of the coordinate converter 22. The coordinate converter 22 includes coordinate rotation portions 51 and 53 and a vector correcting portion 52.

The coordinate rotation portion 51 is provided with $\theta_e$, $(v_\gamma^* + v_{h\gamma}^*)$ and $(v_\delta^* + v_{h\delta}^*)$. The coordinate rotation portion 51 handles θ, $v_d$ and $v_q$ in the above equations (1-1) to (1-4) respectively as $\theta_e$, $(v_\gamma^* + v_{h\gamma}^*)$ and $(v_\delta^* + v_{h\delta}^*)$, and it converts $(v_\gamma^* + v_{h\gamma}^*)$ and $(v_\delta^* + v_{h\delta}^*)$ into $v_a$ and $v_b$ in accordance with the above equation (1-3). In other words, it converts specified voltage vector of two phases on the γδ coordinates expressed by $(v_\gamma^* + v_{h\gamma}^*)$ and $(v_\delta^* + v_{h\delta}^*)$ into specified voltage vector of two phases on the ab coordinates expressed by $v_a$ and $v_b$ (these specified voltage vectors correspond to the voltage vector 110 shown in FIG. 8).

In order to perform the calculation based on the equation (1-3), the phase difference $\theta_D$ is necessary. The phase difference $\theta_D$ is calculated by the above-mentioned method referring to the equation (1-4). In addition, "n" that is determined by the coordinate rotating portion 51 when the phase difference $\theta_D$ is calculated can be used for calculation in the coordinate rotating portion 53.

The vector correcting portion 52 performs the correction process in the step S2 of FIG. 11 on $v_a$ and $v_b$, so that the corrected values $v_a$ and $v_b$ are delivered as $v_{ac}$ and $v_{bc}$, respectively. However, if the correction is not necessary, "$v_{ac} = v_a$" and "$v_{bc} = v_b$" hold.

The coordinate rotation portion 53 converts the corrected a-axis voltage and b-axis voltage (i.e., $v_{ac}$ and $v_{bc}$) into the three-phase specified voltage values $(v_u^*, v_v^*$ and $v_w^*)$ in accordance with the above equations (1-8) and (1-9). On this occasion, $v_a$, $v_b$, $v_u$, $v_v$ and $v_w$ in the above equations (1-8) and (1-9) are handled as $v_{ac}$, $v_{bc}$, $v_u^*$, $v_v^*$ and $v_w$, respectively.

The superposed voltage generating portion 25 shown in FIG. 27 generates the superposed voltage expressed by the above equation (2-1). On this occasion, it generates the superposed voltage in accordance with the rotation speed or the drive voltage of the motor 1 as described above. In other words, for example, it refers to $\omega_e$ or ω* indicating the rotation speed of the motor 1, and it superposes the superposed voltage that satisfies the above expression (4-1) or (4-2) at a standstill of the motor 1, so that a size of the minor axis of the ellipse of the superposed voltage is decreased continuously or step by step along with an increase of the rotation speed or the drive voltage. Alternatively, for example, it is possible to adopt the structure in which if the rotation speed ($\omega_e$ or ω) becomes a predetermined speed or higher, or if the drive voltage (amplitude of the drive voltage) becomes a predetermined voltage or higher, the superposed voltage is made alternating voltage in the γ-axis direction by satisfying "$V_{h\gamma} \neq 0$" and "$V_{h\delta} = 0$".

SECOND EXAMPLE

Figure 30:
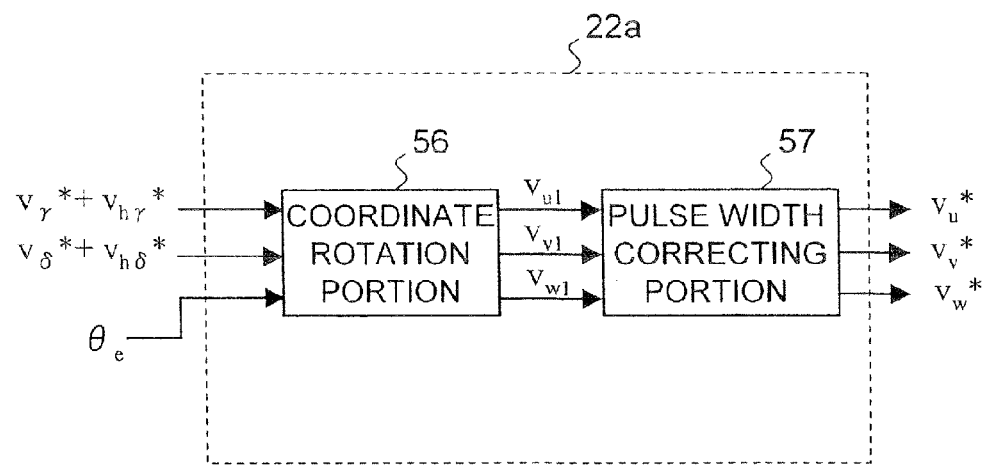
FIG. 30 is related to a second example of the present invention and is an internal block diagram of a variation of the coordinate converter (a two-phase to three-phase coordinate converter) shown in FIG. 27.

In addition, it is possible to use a coordinate converter 22a shown in FIG. 30 instead of the coordinate converter 22 shown in FIG. 29. While the coordinate converter 22 shown in FIG. 29 performs the voltage correction at the stage of the specified voltage vector of two phases, the coordinate converter 22a shown in FIG. 30 performs the voltage correction at the stage of the three-phase voltages, which leads to the same result as the voltage correction performed by the coordinate converter 22 shown in FIG. 29. As an example for describing the coordinate converter 22a, a second example will be described. A block diagram of a general structure of a motor driving system according to the second example is similar to that of the first example (see FIG. 27), so overlapping illustrations will be omitted. However, the coordinate converter 22a shown in FIG. 30 is used in the second example as the coordinate converter 22.

The coordinate converter 22a shown in FIG. 30 includes a coordinate rotation portion 56 and a pulse width correcting portion 57. Similarly to the input to the coordinate rotation portion 51 shown in FIG. 29, the coordinate rotation portion 56 is provided with $\theta_e$, $(v_\gamma^* + v_{h\gamma}^*)$ and $(v_\delta^* + v_{h\delta}^*)$. The coordinate rotation portion 56 converts $(v_\gamma^* + v_{h\gamma}^*)$ and $(v_\delta^* + v_{h\delta}^*)$ indicating the specified voltage values of two phases into $v_{u1}$, $v_{v1}$ and $v_{w1}$ indicating the three-phase specified voltage values temporarily in accordance with the following equation (5-1). The pulse width correcting portion 57 performs voltage correction (pulse width correction) on $v_{u1}$, $v_{v1}$ and $v_{w1}$, which leads to the same result as the voltage correction performed by the coordinate converter 22 shown in FIG. 29, so that the three-phase specified voltage values $v_u^*$, $v_v^*$ and $v_w^*$ are generated. The three-phase specified voltage values $v_u^*$, $v_v^*$ and $v_w^*$ generated by the pulse width correcting portion 57 are the same as those generated by the coordinate rotation portion 53 shown in FIG. 29. The three-phase specified voltage values $v_u^*$, $v_v^*$ and $v_w^*$ generated by the pulse width correcting portion 57 are sent to the inverter 2 and the current detecting portion 18 shown in FIG. 27.

$$\begin{bmatrix} v_{u1} \\ v_{v1} \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* + v_{h\gamma}^* \\ v_\delta^* + v_{h\delta}^* \end{bmatrix} \quad (5\text{-}1)$$

$$v_{w1} = -(v_{u1} + v_{v1})$$

The method of correcting the specified voltage values (pulse widths of the PWM signals for individual phases) at the stage of the three-phase voltages so that the phase currents of two phases can be detected is known. For example, the method described in JP-A-2003-189670 can be utilized as the method.

THIRD EXAMPLE

Next, a simulation result of evaluating estimation accuracy of the motor driving system according to the first or the second example will be described as a third example. In this simulation, a period for enabling detection of the phase currents of two phases is set to a value of approximately 5 microseconds, and the threshold value Δ indicating the maximum value of the b-axis component of the voltage correction quantity is set to 10 volts for securing the period. In other words, Δ is set to 10 volts so that the time periods T1-T2 and T2-T3 shown in FIG. 4 can be ensured to be approximately 5 microseconds or longer. In addition, the DC voltage supplied from the DC power supply 4 shown in FIG. 27 is set to 280 volts, and the amplitude $(V_{h\gamma})$ of the superposed voltage in the γ-axis direction is fixed to 40 volts.

FIGS. 31A and 31B and FIGS. 32A and 32B show the simulation result. In graphs shown in FIGS. 31A and 31B and FIGS. 32A and 32B, the horizontal axis represents time (seconds). It is supposed that the motor 1 rotates at a real motor speed corresponding to 2 (Hz) in the period from t=0 to t=1 and at a real motor speed corresponding to 4 (Hz) in the period from t=1 to t=2. Under this condition, the amplitude $V_{h\delta}$ of the superposed voltage in the δ-axis direction is changed variously.

Figure 31A:
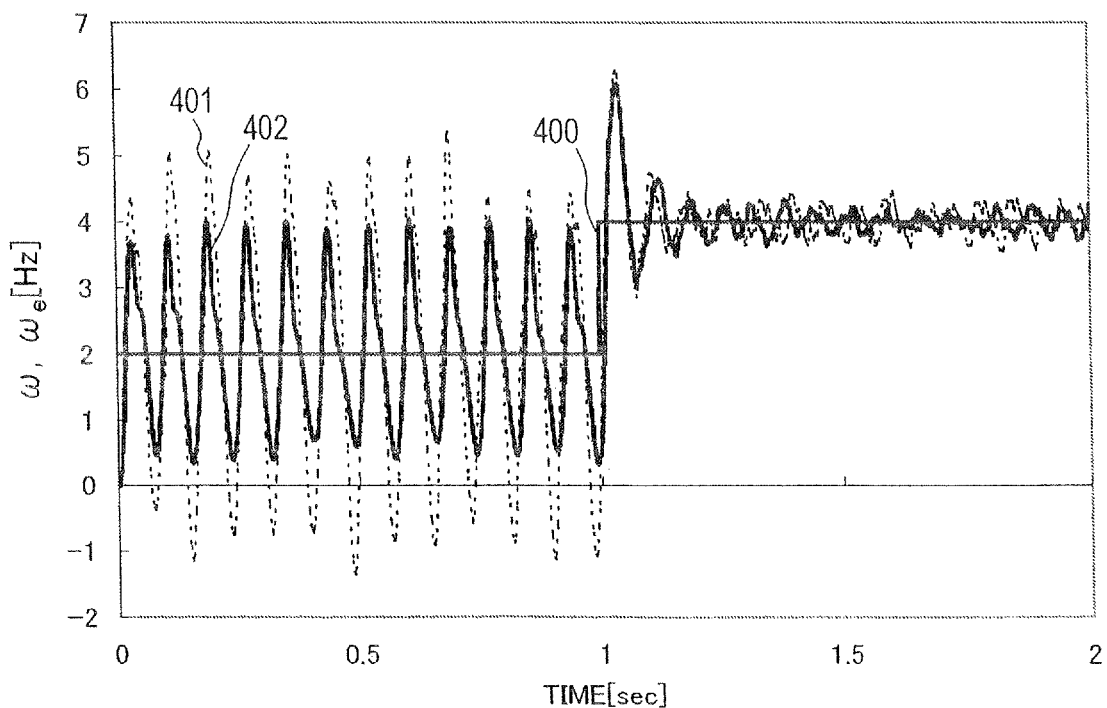
FIGS. 31A and 31B are diagrams showing a simulation result concerning estimation by the motor driving system shown in FIG. 27.
Figure 31B:
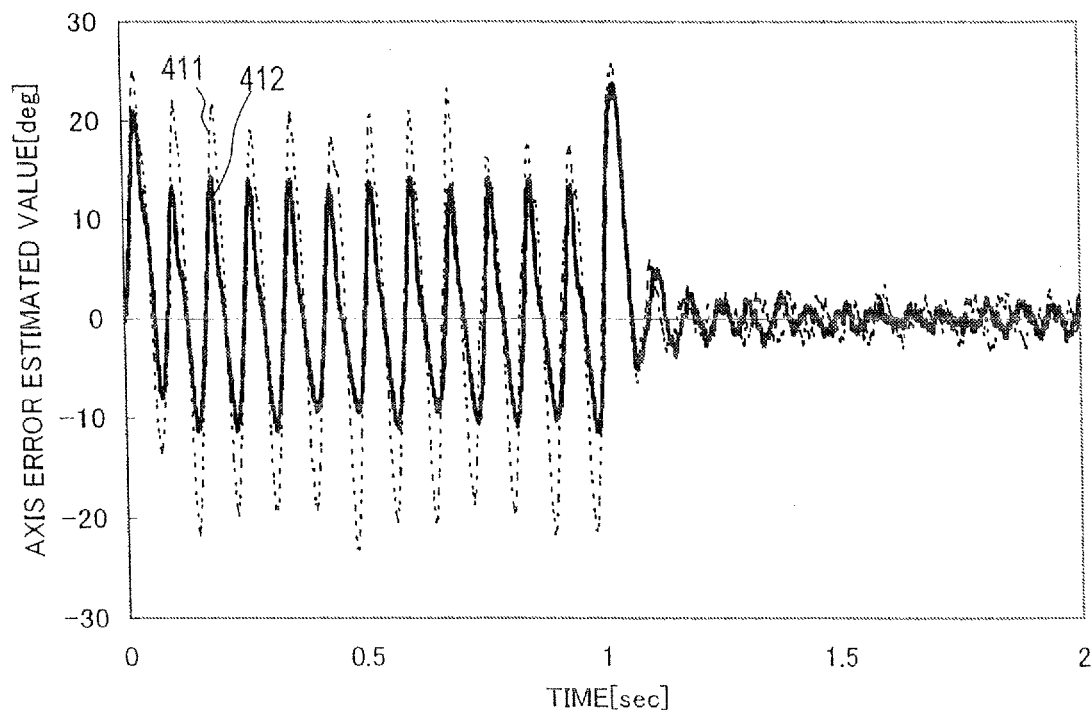

In FIG. 31A, the thick solid line denoted by reference numeral 400 indicates an assumed value of the real motor speed ω, while the broken line 401 and the solid line 402 indicate the estimated motor speed $\omega_e$ calculated by the estimator 20 shown in FIG. 27. The broken line 401 indicates the estimated motor speed $\omega_e$ when $V_{h\delta}$ is 0 volt, while the solid line 402 indicates the same when $V_{h\delta}$ is 5 volts. In FIG. 31B, the broken line 411 and the solid line 412 indicate an estimated value of the axis error Δθ (the unit is degrees in the electrical angle). The broken line 411 indicates the estimated value when $V_{h\delta}$ is 0 volt, while the solid line 412 indicates the same when $V_{h\delta}$ is 5 volts. The estimated value of the axis error Δθ can be calculated from output of the LPF 34 shown in FIG. 28 (see the above equation (3-6) too).

The period from t=0 to t=1 corresponds to the period of the rotation at a very low speed, and it is understood that if the superposed voltage is made to be alternating voltage in the period (i.e., if $V_{h\delta}$ is made to be zero), the motor speed and the axis error cannot be estimated appropriately. This is because that the voltage correction for detecting the single shunt current affects the estimation. If the superposed voltage is made to present an ellipse, the above phenomenon is improved. However, if a size of the minor axis of the ellipse is small like the solid lines 402 and 412 ($V_{h\delta}$=5 volts), a result of the improvement is not sufficient.

On the other hand, if the rotation speed increases so that the influence of the voltage correction decreases like the period from t=1 to t=2, the estimation can be performed appropriately in both cases where $V_{h\delta}$ is 0 volt and where $V_{h\delta}$ is 5 volts. Therefore, if the rotation speed is relatively high, the torque pulsation can be reduced while maintaining appropriate estimation by decreasing $V_{h\delta}$.

Figure 32A:
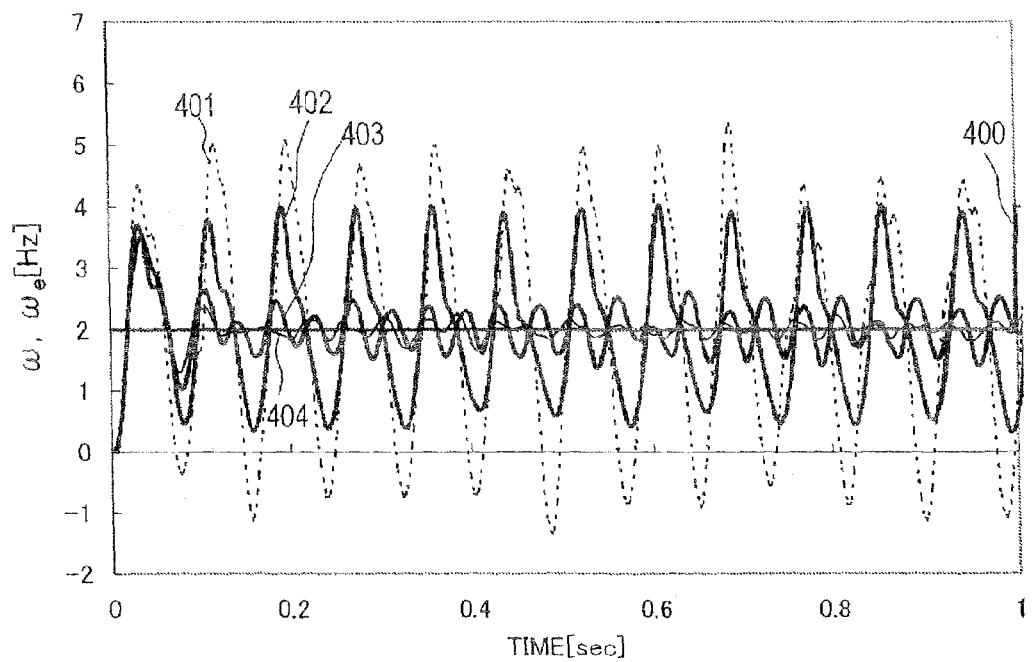
FIGS. 32A and 32B are diagrams showing a simulation result concerning estimation by the motor driving system shown in FIG. 27.
Figure 32B:
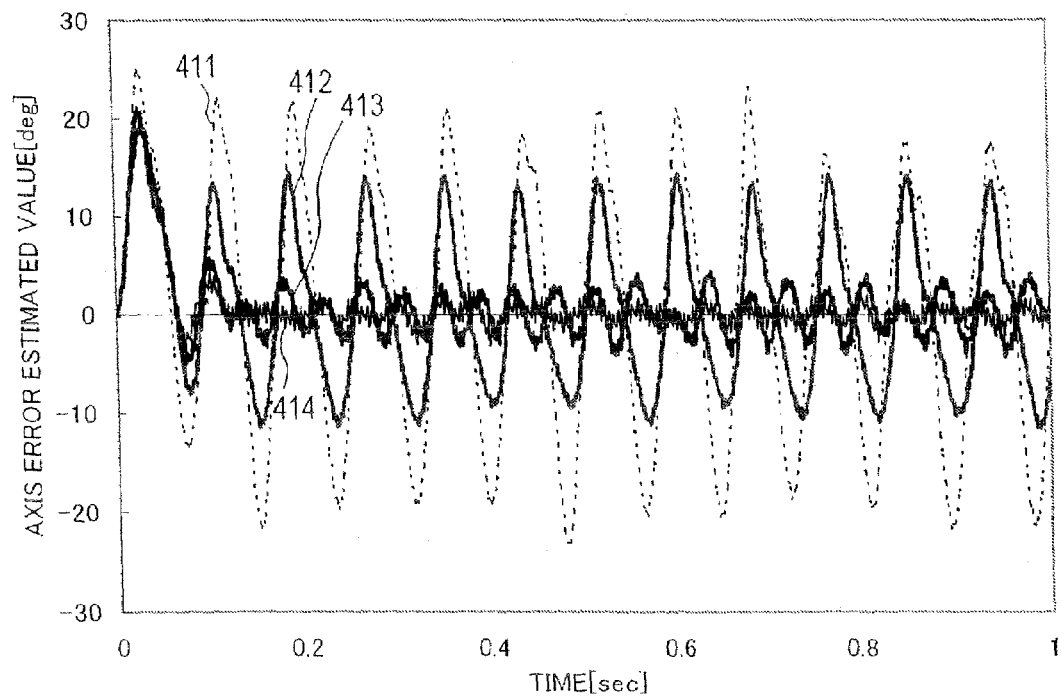

FIG. 32A shows a graph corresponding to a graph shown in FIG. 31A plus additional solid lines 403 and 404. FIG. 32B shows a graph corresponding to a graph shown in FIG. 31B plus additional solid lines 413 and 414. The broken line 401 and the solid line 402 in FIG. 32A are the same as those in FIG. 31A, while the broken line 411 and the solid line 412 in FIG. 32B are the same as those in FIG. 31B. However, FIGS. 32A and 32B are enlarged graphs of the period from t=0 to t=1. In FIG. 32A, the solid lines 403 and 404 indicate the estimated motor speed $\omega_e$ calculated by the estimator 20 shown in FIG. 27. The solid line 403 indicates the estimated motor speed $\omega_e$ when $V_{h\delta}$ is 10 volts, and the solid line 404 indicates the same when $V_{h\delta}$ is 17 volts. In FIG. 32B, the solid lines 413 and 414 indicate the estimated value of the axis error Δθ. The solid line 413 indicates the estimated value when $V_{h\delta}$ is 10 volts, and the solid line 414 indicates the same when $V_{h\delta}$ is 17 volts.

Supposing that the amplitude $V_{h\delta}$ indicating the size of the minor axis of the ellipse is the threshold value Δ (10 volts) or higher, it is understood that the estimation can be performed appropriately also at a very low rotation speed. In particular, if the amplitude $V_{h\delta}$ is set to a value of 17 volts that is approximately (the square root of three)×Δ, the effect is large. (see the above expressions (4-1) and (4-2)).

FOURTH EXAMPLE

Figure 22:
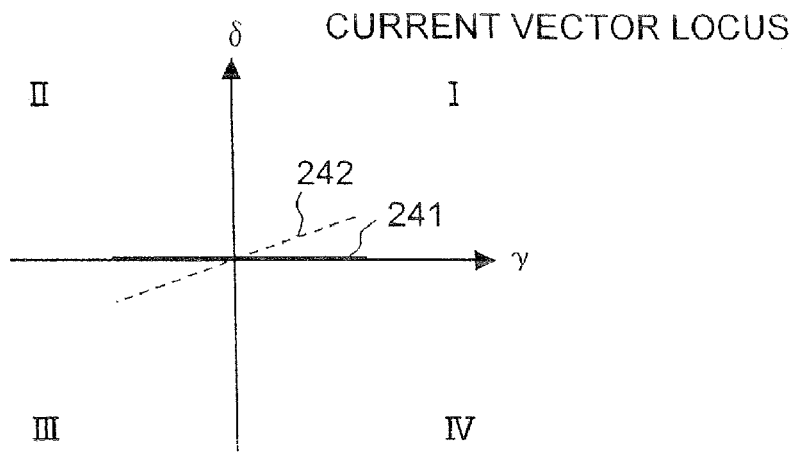
FIG. 22 is a diagram showing an example of a current vector locus of the superposed current when alternating voltage is superposed on the drive voltage of the motor shown in FIG. 1.

The first and the second examples as well as the fifth and the sixth example that will be described later are based on the assumption that the motor 1 is an interior permanent-magnet type synchronous motor or the like, and that the motor 1 has salient magnetic poles constitutionally. However, the technical contents described above can also be applied to a surface permanent-magnet type synchronous motor (hereinafter referred to as an SPMSM) that is a non-salient pole machine. In other words, an SPMSM can be adopted as the motor 1. However, if the motor 1 is an SPMSM, the inclination of the current vector locus as shown in FIG. 21 or 22 cannot be detected usually when the axis error Δθ becomes non-zero.

Therefore, in this case, it is preferable to generate magnetic saturation so that the SPMSM as the motor 1 has salient magnetic poles. More specifically, it is preferable to increase the amplitude $V_{h\gamma}$ of the superposed current in the γ-axis direction so that the γ-axis component ($i_{h\gamma}$) of the superposed current increases, thereby magnetic saturation occurs positively in the motor 1. If the magnetic saturation occurs, the d-axis inductance $L_d$ decreases so that the superposed current is apt to flow in the d-axis direction. In other words, since the SPMSM behaves as if it has salient magnetic poles, so it is possible to perform the estimation process similar to the case where the motor 1 is a salient pole machine.

FIFTH EXAMPLE

Next, a fifth example will be described. In the fifth example, the above-mentioned voltage correction process is applied to a maximum torque control axis that is described in "Position Sensorless Vector control for Permanent Magnet Synchronous Motors Based on Maximum Torque Control Frame", IDA and two others, Institute of Electrical Engineers, Industrial Application Department Conference Lecture Papers, August 2006, pp. 395-388 (I-385 to I-388) (hereinafter referred to as a second non-patent document).

Figure 33:
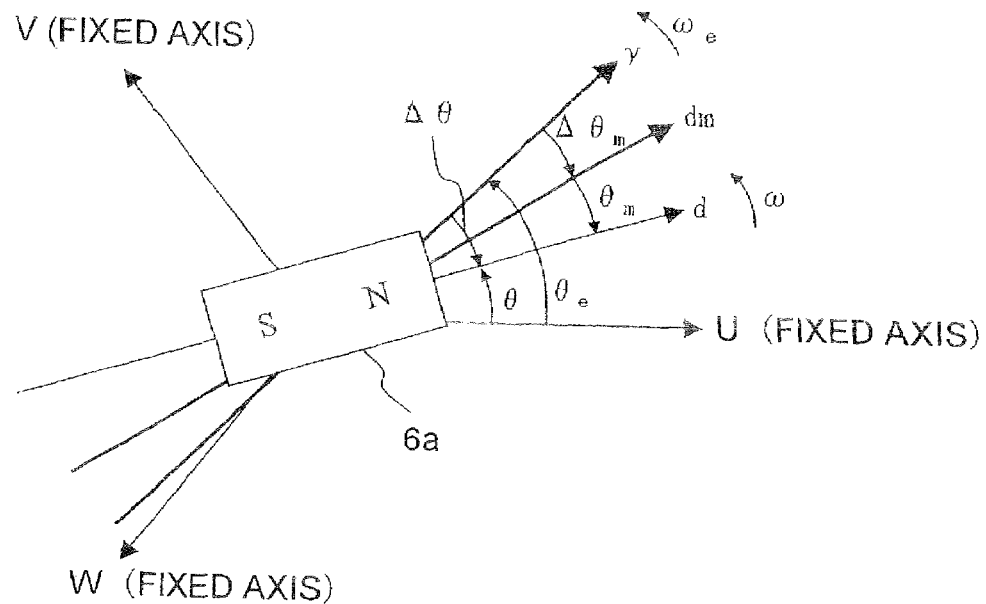
FIG. 33 is an analysis model diagram according to a fifth example of the present invention.
Figure 34:
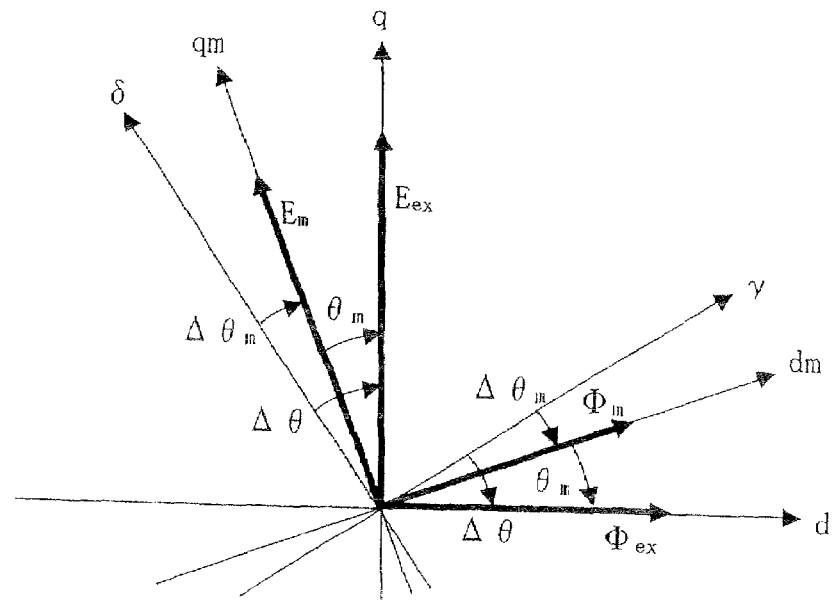
FIG. 34 is an analysis model diagram according to the fifth example of the present invention.

First, with reference to FIGS. 33 and 34, a dm-axis and a qm-axis corresponding to the maximum torque control axis will be described. FIGS. 33 and 34 are analysis model diagrams that are applied to the fifth example. FIG. 33 shows fixed axes of the armature windings of the U-phase, the V-phase and the W-phase. In the fifth example too, the d-axis, the q-axis, the γ-axis, the δ-axis, θ, $θ_e$, Δθ, ω and $ω_e$ are defined in the same manner as those in FIG. 7.

In addition, the qm-axis is defined as a rotation axis having the same direction as the current vector to be supplied to the motor 1 for realizing the maximum torque control. Then, the dm-axis is defined as the axis that lags behind the qm-axis by an electrical angle of 90 degrees. The coordinates having the dm-axis and the qm-axis as the coordinate axes is referred to as dm-qm coordinates.

The motor current for realizing the maximum torque control has a positive q-axis component and a negative d-axis component. Therefore, a phase of the qm-axis leads a phase of the q-axis. In FIGS. 33 and 34, the counterclockwise direction is the leading direction of the phase.

The phase (angle) of the q-axis viewed from the qm-axis is denoted by $θ_m$, and the phase (angle) of the qm-axis viewed from the δ-axis is denoted by $Δθ_m$. In this case, of course, the phase of the d-axis viewed from the dm-axis is also $θ_m$, and the phase of the dm-axis viewed from the γ-axis is also $Δθ_m$. $θ_m$ is a lead angle of the qm-axis (dm-axis) viewed from the q-axis (d-axis). $Δθ_m$ represents an axis error between the qm-axis and the δ-axis. The Δθ that is an axis error between the d-axis and the γ-axis is expressed by "$Δθ = Δθ_m + θ_m$".

As described above, the dm-axis leads the d-axis in phase, and $θ_m$ is supposed to have a negative value on this occasion. In the same manner, if the γ-axis leads the dm-axis in phase, $Δθ_m$ has a negative value. The vectors ($E_m$ and the like) shown in FIG. 34 will be described later.

In addition, the dm-axis component and the qm-axis component of the motor current $I_a$ are represented by the dm-axis current $i_{dm}$ and the qm-axis current $i_{qm}$, respectively. The dm-axis component and the qm-axis component of the motor voltage $V_a$ are represented by the dm-axis voltage $v_{dm}$ and the qm-axis voltage $v_{qm}$, respectively.

In the fifth example, the axis error $Δθ_m$ between the qm-axis (dm-axis) and the δ-axis (γ-axis) is estimated, and the γ-axis as an estimation axis is converged on the dm-axis (i.e., the axis error $Δθ_m$ is converges on zero). As described in the above second non-patent document, the use of the dm-qm coordinates contributes to facilitating the adjustment of parameters. In addition, as understood clearly from the definition of the qm-axis, a current locus of the motor current for realizing the maximum torque control is on the qm-axis. Therefore, the maximum torque control can be realized only by making $i_γ^*$ be zero or a predetermined value close to zero regardless of a value of $i_δ$ ($i_δ^*$). Thus, it contributes to facilitating a computation load.

[Description of Expansion Induction Voltage Model in Maximum Torque Control Axis]

A theoretical formula related to the estimation of the dm-qm coordinates will be described. Note that details of the dm-axis and the qm-axis are described in the specification of Japanese patent application No. 2006-177646 and are also described in the second non-patent document mentioned above.

The expansion induction voltage equation (in other words, extended electromotive force equation) on a common dq-coordinates is expressed by the equation (6-1), and the expansion induction voltage (in other words, extended electromotive force) $E_{ex}$ is expressed by the equation (6-2). Note that "p" in each of the following equations is the differential operator.

$$\begin{bmatrix} v_d \\ v_q \end{bmatrix} = \begin{bmatrix} R_a + pL_d & -\omega L_q \\ \omega L_q & R_a + pL_d \end{bmatrix} \begin{bmatrix} i_d \\ i_q \end{bmatrix} + \begin{bmatrix} 0 \\ E_{ex} \end{bmatrix} \quad (6\text{-}1)$$

$$E_{ex} = \omega((L_d - L_q)i_d + \Phi_a) - (L_d - L_q)(pi_q) \quad (6\text{-}2)$$

When coordinates of the equation (6-1) on the real axis is converted into γδ coordinates of the control system, the equation (6-3) is obtained. Neglecting the third term on the right-hand side of the equation (6-3) for simplification, the equation (6-4) is obtained.

$$\begin{bmatrix} v_γ \\ v_δ \end{bmatrix} = \begin{bmatrix} R_a + pL_d & -\omega L_q \\ \omega L_q & R_a + pL_d \end{bmatrix} \begin{bmatrix} i_γ \\ i_δ \end{bmatrix} + \quad (6\text{-}3)$$

$$E_{ex} \begin{bmatrix} -\sin Δθ \\ \cos Δθ \end{bmatrix} - (pΔθ)L_d \begin{bmatrix} -i_δ \\ i_γ \end{bmatrix}$$

$$\begin{bmatrix} v_γ \\ v_δ \end{bmatrix} = \begin{bmatrix} R_a + pL_d & -\omega L_q \\ \omega L_q & R_a + pL_d \end{bmatrix} \begin{bmatrix} i_γ \\ i_δ \end{bmatrix} + E_{ex} \begin{bmatrix} -\sin Δθ \\ \cos Δθ \end{bmatrix} \quad (6\text{-}4)$$

Noting the dm-qm coordinates, the equation (6-4) can be rewritten into the equation (6-5).

$$\begin{bmatrix} v_{dm} \\ v_{qm} \end{bmatrix} = \begin{bmatrix} R_a + pL_d & -\omega L_q \\ \omega L_q & R_a + pL_d \end{bmatrix} \begin{bmatrix} i_{dm} \\ i_{qm} \end{bmatrix} + E_{ex} \begin{bmatrix} -\sin θ_m \\ \cos θ_m \end{bmatrix} \quad (6\text{-}5)$$

Here, if $L_{q1}i_{qm}$ is defined by the equation (6-6), the equation (6-7) is obtained from the equation (6-5). However, $E_m$ is expressed by the equation (6-8). $L_{q1}$ is virtual inductance depending on $θ_m$. $L_{q1}$ is defined for convenience sake in order to handle the $E_{ex} \cdot \sin θ_m$ in the second term on the right-hand side of the equation (6-5) as a voltage drop caused by the virtual inductance. Note that $L_{q1}$ has a negative value.

$$L_{q1}i_{qm} = \sin\theta_m\{\Phi_a + (L_d - L_q)i_d\} \qquad (6\text{-}6)$$
$$= \sin\theta_m\{\Phi_a + (L_d - L_q)i_{qm}\sin\theta_m\}$$

$$\begin{bmatrix} v_{dm} \\ v_{qm} \end{bmatrix} = \begin{bmatrix} R_a + pL_d & -\omega(L_q + L_{q1}) \\ \omega L_q & R_a + pL_d \end{bmatrix}\begin{bmatrix} i_{dm} \\ i_{qm} \end{bmatrix} + E_m\begin{bmatrix} 0 \\ 1 \end{bmatrix} \qquad (6\text{-}7)$$

$$E_m = (\omega((L_d - L_q)i_d + \Phi_a) - (L_d - L_q)(pi_q))\cos\theta_m \qquad (6\text{-}8)$$
$$= E_{ex}\cos\theta_m$$

Further, if "$L_m = L_q + L_{q1}$" is defined, the equation (6-9) is obtained from the equation (6-7). Here, $E_{exm}$ is expressed by the following equation (6-10).

$$\begin{bmatrix} v_{dm} \\ v_{qm} \end{bmatrix} = \begin{bmatrix} R_a + pL_d & -\omega L_m \\ \omega L_m & R_a + pL_d \end{bmatrix}\begin{bmatrix} i_{dm} \\ i_{qm} \end{bmatrix} + \begin{bmatrix} 0 \\ E_m \end{bmatrix} + \qquad (6\text{-}9)$$
$$\omega(L_q - L_m)\begin{bmatrix} 0 & 0 \\ 1 & 0 \end{bmatrix}\begin{bmatrix} i_{dm} \\ i_{qm} \end{bmatrix}$$
$$= \begin{bmatrix} R_a + pL_d & -\omega L_m \\ \omega L_m & R_a + pL_d \end{bmatrix}\begin{bmatrix} i_{dm} \\ i_{qm} \end{bmatrix} +$$
$$\begin{bmatrix} 0 \\ E_m + \omega(L_q - L_m)i_{dm} \end{bmatrix}$$
$$= \begin{bmatrix} R_a + pL_d & -\omega L_m \\ \omega L_m & R_a + pL_d \end{bmatrix}\begin{bmatrix} i_{dm} \\ i_{qm} \end{bmatrix} + \begin{bmatrix} 0 \\ E_{exm} \end{bmatrix}$$
$$E_{exm} = (\omega((L_d - L_q)i_d + \Phi_a) - (L_d - L_q)(pi_q))\cos\theta_m + \qquad (6\text{-}10)$$
$$\omega(L_q - L_m)i_{dm}$$
$$= E_m + \omega(L_q - L_m)i_{dm}$$

If there is the axis error $\Delta\theta_m$ between the γ-axis and the dm-axis the equation (6-9) is deformed as the following equation (6-11).

$$\begin{bmatrix} v_\gamma \\ v_\delta \end{bmatrix} = \begin{bmatrix} R_a + pL_d & -\omega L_m \\ \omega L_m & R_a + pL_d \end{bmatrix}\begin{bmatrix} i_\gamma \\ i_\delta \end{bmatrix} + \qquad (6\text{-}11)$$
$$E_{exm}\begin{bmatrix} -\sin\Delta\theta_m \\ \cos\Delta\theta_m \end{bmatrix} - (p\Delta\theta_m)L_d\begin{bmatrix} -i_\delta \\ i_\gamma \end{bmatrix}$$

In addition, if approximations "$p\,\Delta\theta_m \approx 0$", "$i_{dm} \approx 0$" and "$(L_d - L_q)(pi_q) \approx 0$" are satisfied, $E_{exm}$ expressed by the equation (6-10) is approximated as the following equation (6-12).

$$E_{exm} = (\omega((L_d - L_q)i_d + \Phi_a) - (L_d - L_q)(pi_q))\cos\theta_m + \qquad (6\text{-}12)$$
$$\omega(L_q - L_m)i_{dm}$$
$$\approx (\omega((L_d - L_q)i_\delta\sin\theta_m + \Phi_a) - (L_d - L_q)(pi_q))\cos\theta_m +$$
$$\omega(L_q - L_m)i_{dm}$$
$$\approx \omega((L_d - L_q)i_\delta\sin\theta_m + \Phi_a)\cos\theta_m$$

In addition, "$L_m = L_q + L_{q1}$" is substituted into the above equation (6-6), and the obtained equation is solved for $\theta_m$. Further, supposing that "$i_\delta \approx i_{qm}$" holds, the following equation (6-13) is obtained. As expressed by the equation (6-13), since $\theta_m$ is a function of $i_\delta$, $E_{exm}$ is also a function of $i_\delta$.

$$\theta_m = \sin^{-1}\left(\frac{\Phi_a - \sqrt{\Phi_a^2 + 4(L_q - L_m)(L_q - L_d)i_\delta^2}}{2i_\delta(L_q - L_d)}\right) \qquad (6\text{-}13)$$

A value of the parameter $L_m$ for estimating the dm-qm coordinates is expressed by the following equation (6-4). The expression "$i_{dm} = 0$" and the following equations (6-15) and (6-16) are substituted into the above equation (6-6), and the obtained equation is solved for $L_{q1}$. A result thereof is utilized so that the equation (6-14) can be obtained.

$$L_m = L_q + L_{q1} \qquad (6\text{-}14)$$
$$= L_q + \frac{i_d\{\Phi_a + (L_d - L_q)i_d\}}{i_d^2 + i_q^2}$$

$$i_{qm} = \sqrt{i_d^2 + i_q^2} \qquad (6\text{-}15)$$

$$\sin\theta_m = \frac{i_d}{\sqrt{i_d^2 + i_q^2}} \qquad (6\text{-}16)$$

In addition, the equation (6-17) of the d-axis current $i_d$ matching with the maximum torque control and the equation (6-15) indicating a relationship among $i_d$, $i_q$ and $i_{qm}$ are utilized for deforming the above equation (6-14). Then, $L_m$ becomes a function of $i_{qm}$ (i.e., the term of $i_d$ and the term of $i_q$ disappear in the equation for calculating $L_m$). Therefore, if "$i_\delta \approx i_{qm}$" holds, a value of $L_m$ expressed as a function of $i_{qm}$ can be calculated based on $i_\delta$.

$$i_d = \frac{\Phi_a}{2(L_q - L_d)} - \sqrt{\frac{\Phi_a^2}{4(L_q - L_d)^2} + i_q^2} \qquad (6\text{-}17)$$

Furthermore, when the parameter $L_m$ is calculated, it is possible to apply approximation of "$i_\delta \approx i_{qm}$" and utilize approximate expression of $L_m$ expressed as a function of $i_\delta$. Alternatively, it is possible to prepare values of $L_m$ corresponding to $i_\delta$ as table data in advance and to look up the table data for obtaining a value of $L_m$.

Note that $E_{ex}$ and $E_m$ in the above equations (6-2), (6-8) and the like can be regarded as voltage vectors in the rotating coordinate system. FIG. 34 shows them as vectors. In addition, the magnetic flux vectors $\Phi_{ex}$ and $\Phi_m$ corresponding to $E_{ex}$ and $E_m$ are also shown as vectors in FIG. 34.

[Example of Structure of Motor Driving System]

Figure 35:
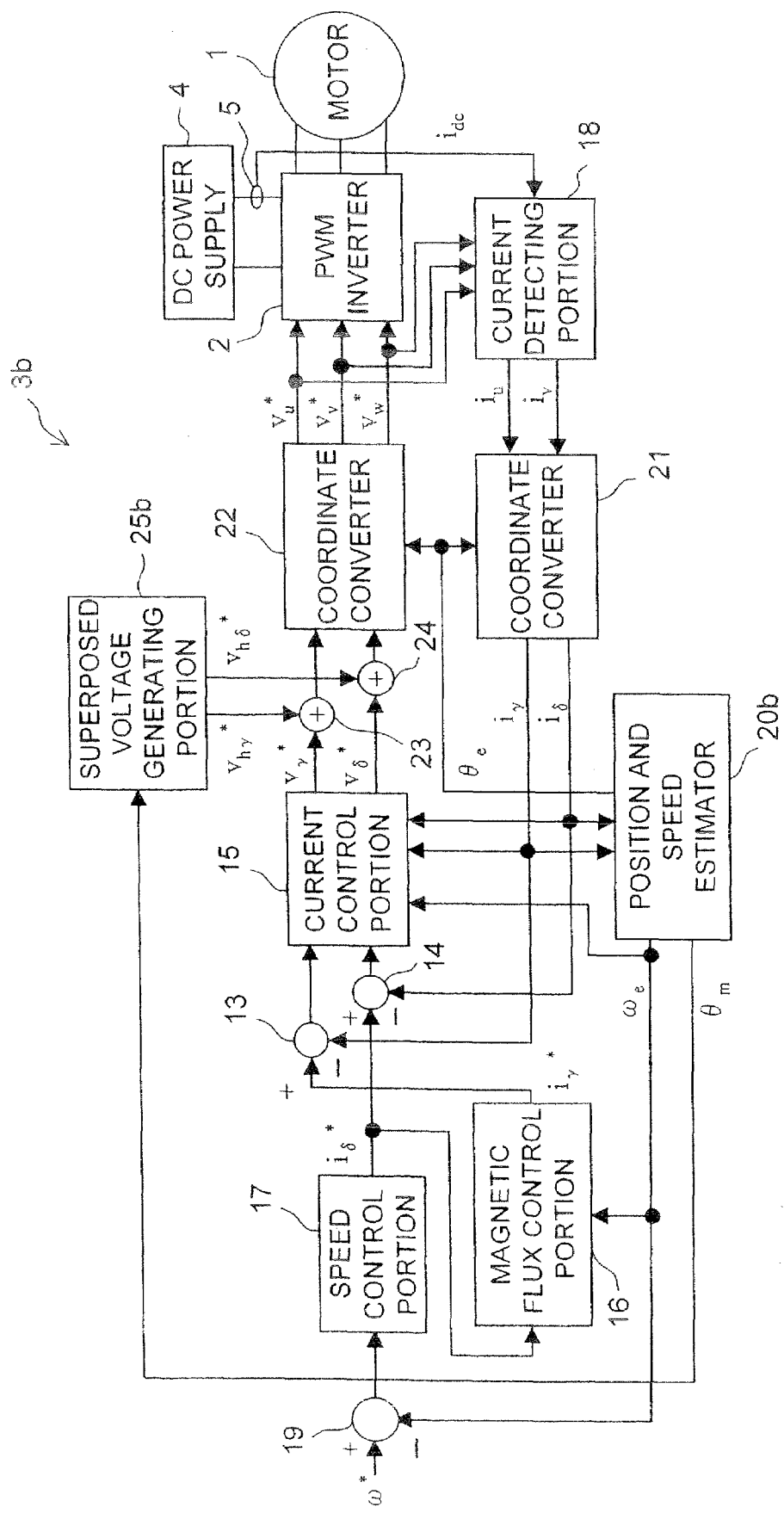
FIG. 35 is a block diagram showing a general structure of the motor driving system according to the fifth example of the present invention.

Next, an example of a structure of the motor driving system based on the dm-qm coordinates according to the fifth example will be described. FIG. 35 is a block diagram showing a general structure of the motor driving system according to the fifth example. In FIG. 35 the same parts as those shown in FIGS. 1 and 27 are denoted by the same reference numerals.

The motor driving system shown in FIG. 35 includes the motor 1, the inverter 2, the DC power supply 4 and the current sensor 5. It also includes a controller 3b that works as the controller 3 shown in FIG. 1. The controller 3b has a structure similar to that of the controller 3a shown in FIG. 27. The controller 3b has a position and speed estimator 20b (hereinafter referred to as an "estimator 20b" simply) and a superposed voltage generating portion 25b instead of the estimator 20 and the superposed voltage generating portion 25 of the controller 3a shown in FIG. 27. Other structure of the controller 3b is similar to that of the controller 3a. However, the magnetic flux control portion 16 of the controller 3b delivers zero or a predetermined value close to zero as $i_\gamma^*$ for realizing the maximum torque control as described above.

Hereinafter, overlapping descriptions about the parts that are similar to those of the controller 3a will be omitted, and the estimator 20b and the superposed voltage generating portion 25b that are unique to the controller 3b will be described. Furthermore, if the items described for the first example are applied to the fifth example, a difference between the reference numerals 20 and 20b as well as a difference between the reference numerals 25 and 25b will be neglected as necessity.

The estimator 20b performs the estimation operation so that not the axis error $\Delta\theta$ between the d-axis and the γ-axis but the axis error $\Delta\theta_m$ between the dm-axis and the γ-axis converges on zero for estimating the dm-axis and the qm-axis.

Figure 36:
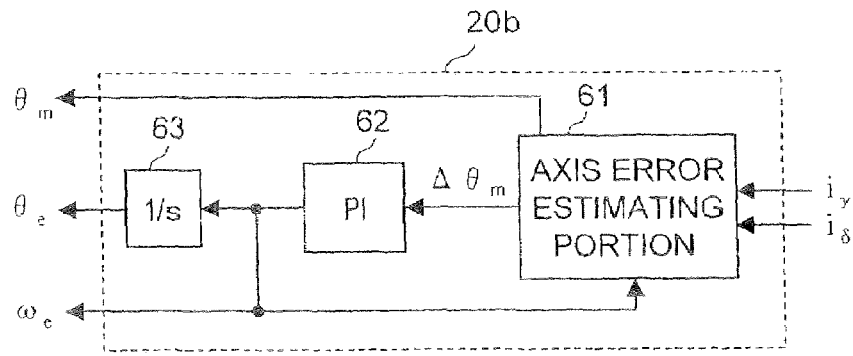
FIG. 36 is an internal block diagram of the estimator shown in FIG. 35.

FIG. 36 shows an internal block diagram of the estimator 20b. The estimator 20b includes an axis error estimating portion 61, a proportional-plus-integral calculator 62 and an integrator 63.

The axis error estimating portion 61 calculates the axis error $\Delta\theta_m$ by using $i_\gamma$ and $i_\delta$ from the coordinate converter 21 shown in FIG. 35. The proportional-plus-integral calculator 62 cooperates with individual portions of the controller 3b to perform the proportional plus integral control so that PLL (Phase Locked Loop) control is realized. It calculates the estimated motor speed $\omega_e$ so that the axis error $\Delta\theta_m$ calculated by the axis error estimating portion 61 converges on zero. The integrator 63 integrates the estimated motor speed $\omega_e$ delivered from the proportional-plus-integral calculator 62 so as to calculate the estimated rotor position $\theta_e$. The calculated values $\omega_e$ and $\theta_e$ are both supplied as an output value of the estimator 20b to the individual portions of the controller 3b that need the value. In addition, the axis error estimating portion 61 also calculates the phase $\theta_m$ (see FIG. 33), and the calculated phase $\theta_m$ is sent to the superposed voltage generating portion 25b shown in FIG. 35.

Figure 37:
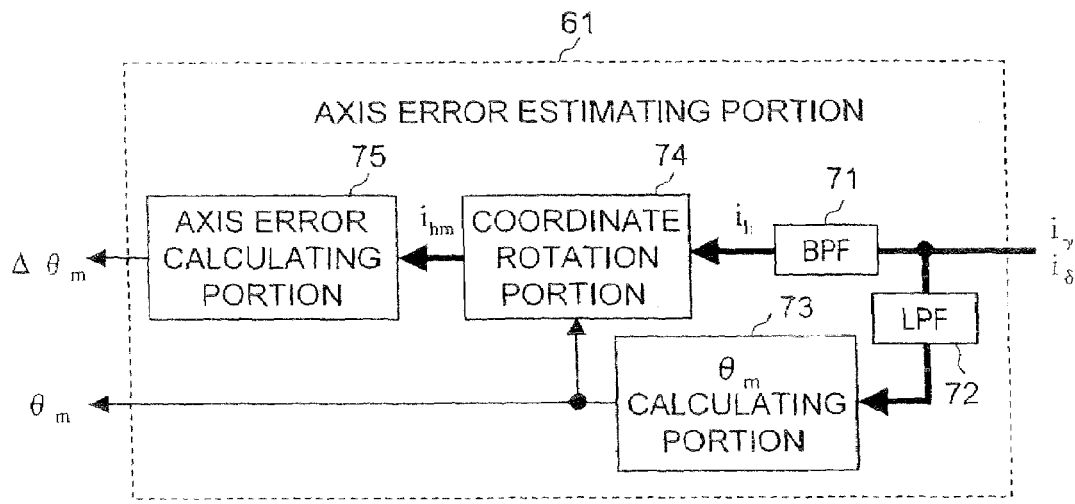
FIG. 37 is an internal block diagram of the axis error estimating portion shown in FIG. 36.
Figure 38:
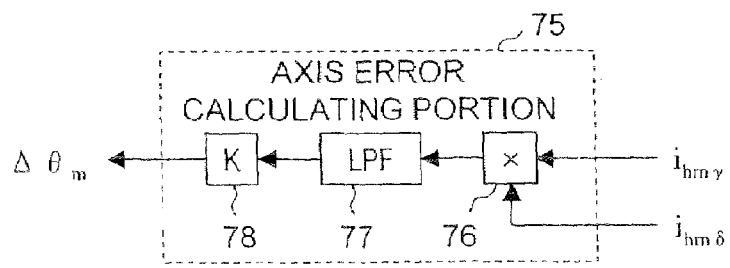
FIG. 38 is an internal block diagram of the axis error calculating portion shown in FIG. 37.

An example of an internal structure of the axis error estimating portion 61 is shown in FIG. 37. As shown in FIG. 37, the axis error estimating portion 61 includes a band-pass filter (BPF) 71, a low-pass filter (LPF) 72, a $\theta_m$ calculating portion 73, a coordinate rotation portion 74 and an axis error calculating portion 75. In addition, as shown in FIG. 38, the axis error calculating portion 75 includes a multiplier 76, an LPF 77 and a coefficient multiplier 78. Furthermore, a frequency of the superposed voltage generated by the superposed voltage generating portion 25b shown in FIG. 35 (electrical angular velocity on the γδ coordinates) is $\omega_h$ in the same manner as the superposed voltage generating portion 25 shown in FIG. 27.

The BPF 71 extracts a frequency component of $\omega_h$ from $i_\gamma$ and $i_\delta$ supplied from the coordinate converter 21 shown in FIG. 35 so as to deliver the γ-axis superposed current $i_{h\gamma}$ and the δ-axis superposed current $i_{h\delta}$. The BPF 71 is a band-pass filter that receives $i_\gamma$ and $i_\delta$ as an input signal and includes a frequency of $\omega_h$ in the pass band. Typically, for example, a center frequency of the pass band is $\omega_h$. In addition, the frequency component of the drive current is removed by the BPF 71.

The LPF 72 removes the frequency component of $\omega_h$ from $i_\gamma$ and $i_\delta$ supplied by the coordinate converter 21 shown in FIG. 35, and the result is sent to the $\theta_m$ calculating portion 73. In other words, the LPF 72 removes the components of superposed current ($i_{h\gamma}$ and $i_{h\delta}$) from $i_\gamma$ and $i_\delta$.

$\theta_m$ calculating portion 73 calculates the phase $\theta_m$ based on a value of the $i_\gamma$ and $i_\delta$ from which the frequency component of $\omega_h$ has been removed. More specifically, the value of $i_\delta$ from which the frequency component of $\omega_h$ has been removed is utilized as $i_\delta$ in the above equation (6-13), and $\theta_m$ is calculated by using the above equation (6-13). On this occasion, it is possible to prepare values of $\theta_m$ corresponding to $i_\delta$ as table data in advance and to look up the table data for obtaining a value of $\theta_m$.

The coordinate rotation portion 74 uses the following equation (7-1) for performing coordinate rotation of the current vector $i_h$ formed by $i_{h\gamma}$ and $i_{h\delta}$ from the BPF 71 by the phase $\theta_m$, so as to calculate the current vector $i_{hm}$. On this occasion, a value of $\theta_m$ calculated by the $\theta_m$ calculating portion 73 is used. The current vectors $i_h$ and $i_{hm}$ are expressed as shown in the following equations (7-2a) and (7-2b). The components $i_{h\gamma}$ and $i_{h\delta}$, which are orthogonal biaxial components forming the current vector $i_h$, are the γ-axis component and the δ-axis component of the current vector $i_h$, respectively. The components $i_{hm\gamma}$ and $i_{hm\delta}$ are orthogonal biaxial components forming the current vector $i_{hm}$. The components $i_{hm\gamma}$ and $i_{hm\delta}$ calculated by the coordinate rotation portion 74 are sent to the axis error calculating portion 75.

$$\begin{bmatrix} i_{hm\gamma} \\ i_{hm\delta} \end{bmatrix} = \begin{bmatrix} \cos\theta_m & \sin\theta_m \\ -\sin\theta_m & \cos\theta_m \end{bmatrix} \begin{bmatrix} i_{h\gamma} \\ i_{h\delta} \end{bmatrix} \quad (7\text{-}1)$$

$$i_h = \begin{bmatrix} i_{h\gamma} \\ i_{h\delta} \end{bmatrix} \quad (7\text{-}2a)$$

$$i_{hm} = \begin{bmatrix} i_{hm\gamma} \\ i_{hm\delta} \end{bmatrix} \quad (7\text{-}2b)$$

Figure 39:
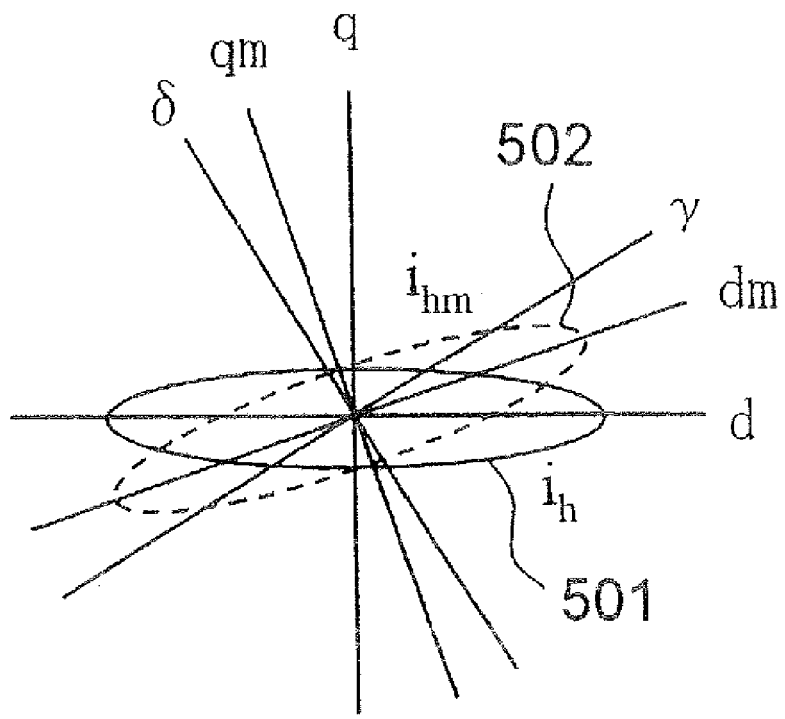
FIG. 39 is related to the fifth example of the present invention and is a diagram showing a current vector locus of the superposed current flowing in accordance with the superposed voltage (in the case where the superposed voltage is elliptical rotational voltage).

The significance of the coordinate rotation will be described supplementarily with reference to FIG. 39 that shows an example of the current vector locus before and after the coordinate rotation. The case where an elliptical rotational voltage is superposed will be considered. As described later too, the ellipse of the rotational voltage is the ellipse that is inclined from the γ-axis in the clockwise direction by $\theta_m$ (i.e., the ellipse that is axially symmetric with respect to the d-axis on the assumption that the γ-axis matches with the dm-axis). In this case, the locus of the current vector $i_h$ on the rotating coordinate system presents an ellipse that is axially symmetric with respect to the d-axis like the current vector locus 501 (i.e., an ellipse having the major axis in the d-axis direction) because of the salient magnetic poles of the motor 1. The coordinate rotation portion 74 multiplies a rotation matrix to the current vector $i_h$ so that the ellipse becomes axially symmetric with respect to the dm-axis so as to calculate the current vector $i_{hm}$. Thus, the locus of the current vector $i_{hm}$ becomes like the current vector locus 502.

The current vector locus 502 presents the ellipse on the rotating coordinate system, and the major axis direction thereof matches with the dm-axis direction if $\Delta\theta m$ is 0 degree. But, it does not match with the dm-axis direction if $\Delta\theta_m$ is not 0 degree. Therefore, when the DC component of the product $(i_{hm\gamma} \times i_{hm\delta})$ of the orthogonal biaxial components of the current vector $i_{hm}$ is expressed by $(i_{hm\gamma} \times i_{hm\delta})_{DC}$, the DC component $(i_{hm\gamma} \times i_{hm\delta})_{DC}$ becomes zero if the axis error $\Delta\theta_m$ is zero and is generally proportional to the axis error $\Delta\theta_m$, in the same manner as the relationship between the DC component of the product $(i_{h\gamma} \times i_{h\delta})$ and the axis error $\Delta\theta$. Therefore, if a coefficient of proportionality is denoted by K, the axis error $\Delta\theta_m$ can be expressed by the following equation (7-3).

$$\Delta\theta_m = K \cdot (i_{hm\gamma} \times i_{hm\delta})_{DC} \quad (7\text{-}3)$$

In order to realize the calculation of the equation (7-3), the axis error calculating portion 75 is constituted as shown in FIG. 38. More specifically, the multiplier 76 calculates the product $(i_{hm\gamma} \times i_{hm\delta})$ of $i_{hm\gamma}$ and $i_{hm\delta}$ calculated by the coordinate rotation portion 74, and the LPF 77 extracts a DC component of the product $(i_{hm\gamma} \times i_{hm\delta})$ so as to obtain $(i_{hm\gamma} \times i_{hm\delta})_{DC}$. The coefficient multiplier 78 multiplies the coefficient of proportionality K on the DC component $(i_{hm\gamma} \times i_{hm\delta})_{DC}$ delivered from the LPF 77 so as to calculate the axis error $\Delta\theta_m$ expressed in the equation (7-3). The axis error $\Delta\theta_m$ delivered from the coefficient multiplier 78 is sent to the proportional-plus-integral calculator 62 as the axis error $\Delta\theta_m$ estimated by the axis error estimating portion 61 shown in FIG. 36, so that $\omega_e$ and $\theta_e$ are calculated as described above, in which axis error $\Delta\theta_m$ converges on zero. In other words, the γ-axis follows the dm-axis (dm-qm coordinates are estimated).

Figure 40:
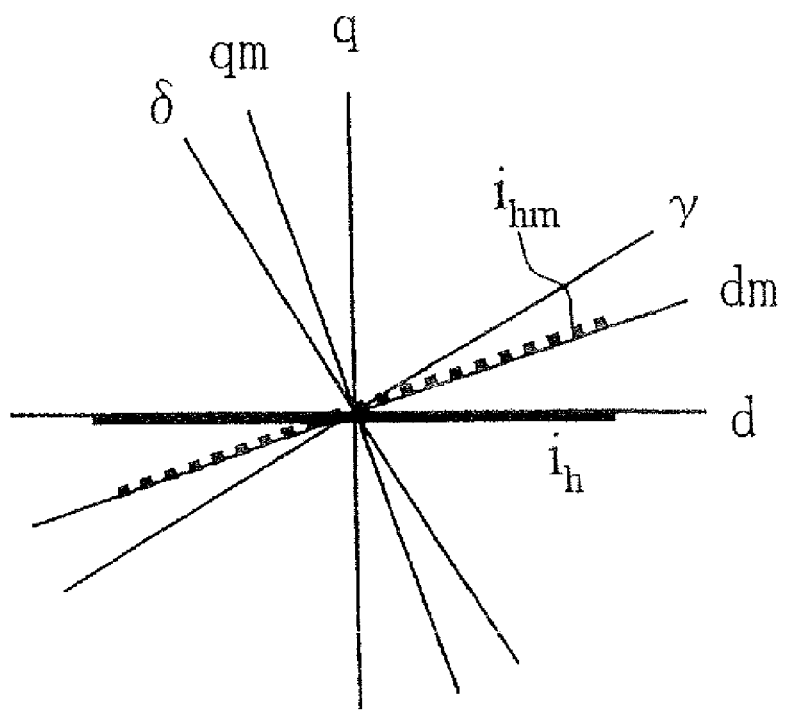
FIG. 40 is related to the fifth example of the present invention and is a diagram showing a current vector locus of the superposed current flowing in accordance with the superposed voltage (in the case where the superposed voltage is alternating voltage).
Figure 41:
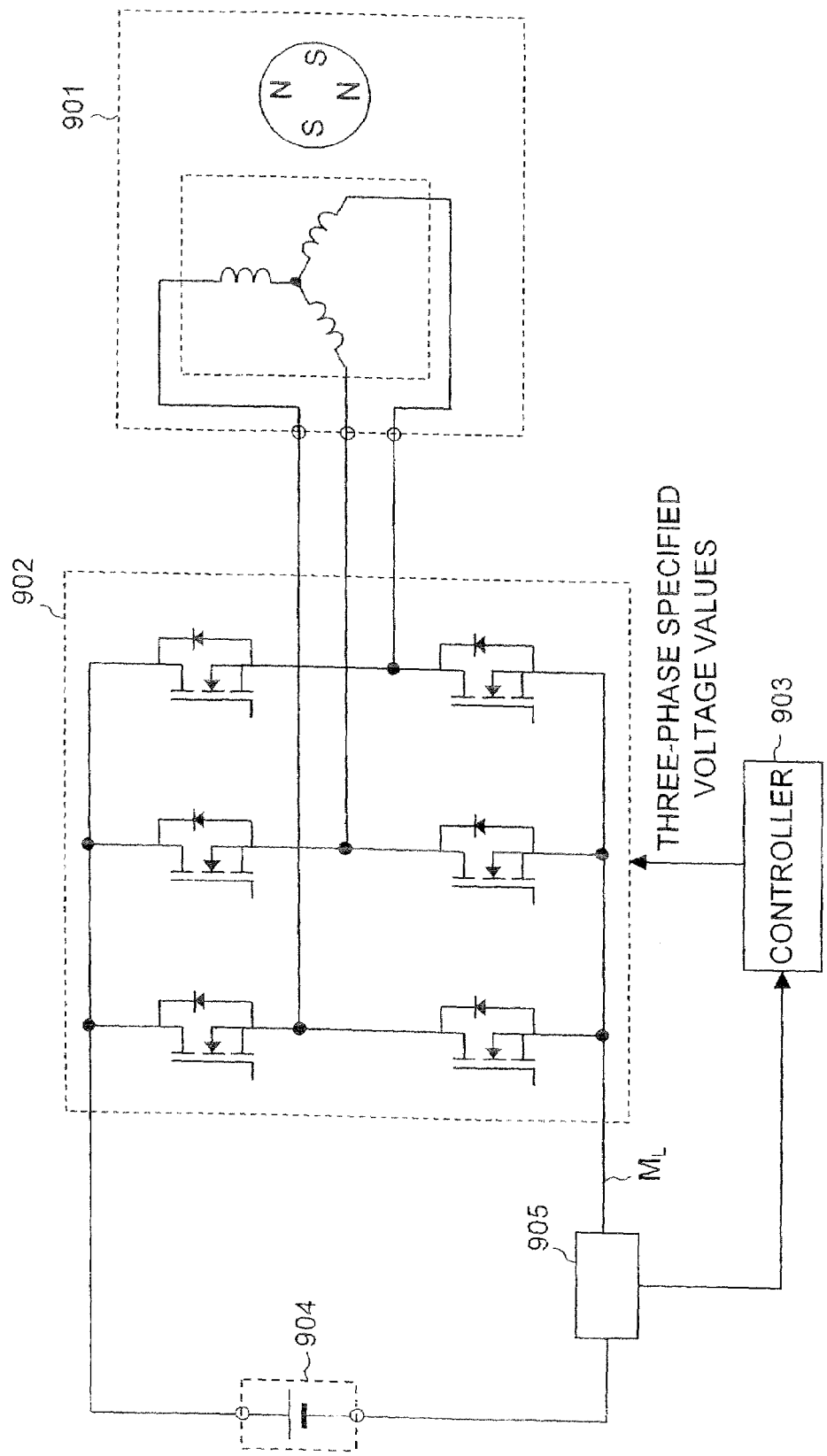
FIG. 41 is a block diagram showing a general structure of a conventional motor driving system adopting the single shunt current detecting method.
Figure 42:
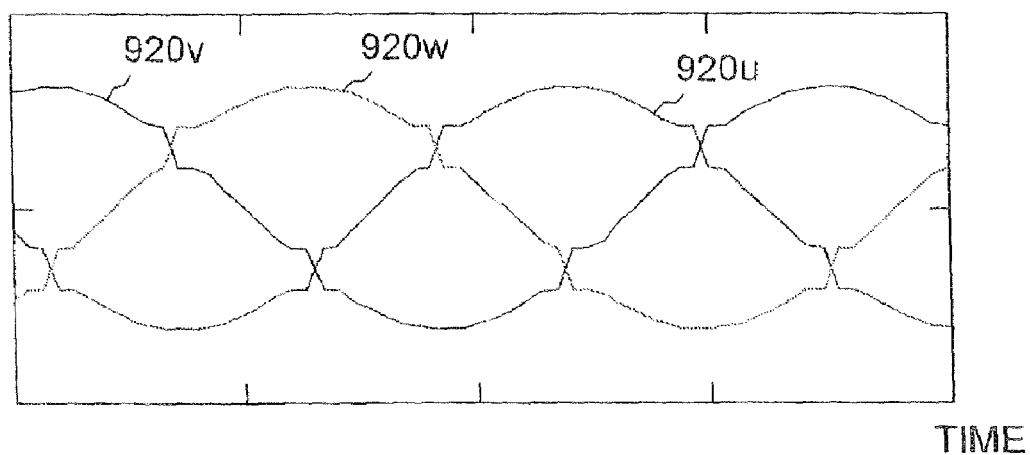
FIG. 42 is related to the prior art and is a diagram showing an example of correcting the specified voltage value (pulse width) in the case where the single shunt current detecting method is adopted.

Furthermore, FIG. 40 shows a locus of the current vector $i_h$ and a locus of the current vector $i_{hm}$ in the case where an alternating voltage having only the d-axis component is applied as the superposed voltage.

As described above in the fifth example, the superposed voltage generating portion 25b superposes the elliptical rotational voltage or the alternating voltage as the superposed voltage to the drive voltage. On the other hand, it is necessary to make the current vector locus of the current vector $i_h$ be axially symmetric with respect to the d-axis in order to perform the above-mentioned axis error estimation based on the DC component $(i_{hm\gamma} \times i_{hm\delta})_{DC}$. For this purpose, it is necessary to make the voltage vector locus of the superposed voltage be axially symmetric with respect to d-axis.

The superposed voltage generating portion 25 according to the first example generates and delivers the superposed voltage (which is composed of $v_{h\gamma}^*$ and $V_{h\delta}^*$) expressed by the above equation (2-1), and the superposed voltage generating portion 25b refers to the phase $\theta_m$ supplied from the estimator 20b so as to generate and deliver the superposed voltage (which is composed of $v_{h\gamma}^*$ and $v_{h\delta}^*$) expressed by the following equation (7-4) in order to satisfy the above-mentioned necessity. In the controller 3b shown in FIG. 35, the adders 23 and 24 add $v_{h\gamma}^*$ and $v_{h\delta}^*$ from the superposed voltage generating portion 25b to the $v_\gamma^*$ and $v_\delta^*$ from the current control portion 15 so as to calculate $(v_\gamma^*+v_{h\gamma}^*)$ and $(v_\delta^*+v_{h\delta}^*)$, which is sent to the coordinate converter 22. The function of the coordinate converter 22 is the same as that described above in the first or the second example.

$$\begin{bmatrix} v_{h\gamma}^* \\ v_{h\delta}^* \end{bmatrix} = \begin{bmatrix} V_{h\gamma}\cos(\omega_h t + \theta_m) \\ V_{h\delta}\sin(\omega_h t + \theta_m) \end{bmatrix} \quad (7\text{-}4)$$

The superposed voltage generating portion 25b also generates the superposed voltage corresponding to the rotation speed or the drive voltage of the motor 1 similarly to the superposed voltage generating portion 25. More specifically, it refers to $\omega_e$ or $\omega^*$ indicating the rotation speed of the motor 1, for example, and it superpose the superposed voltage that satisfies the above expression (4-1) or (4-2) at a standstill of the motor 1, so as to decrease the size of the minor axis of the ellipse of the superposed voltage continuously or step by step along with increase of the rotation speed or the drive voltage. Alternatively, it is possible, for example, to make the superposed voltage be an alternating voltage in the γ-axis direction by satisfying the "$V_{h\gamma}\approx 0$" and "$V_{h\delta}=0$", when the rotation speed ($\omega_e$ or $\omega^*$), becomes a predetermined speed or higher, or when the drive voltage (amplitude of the drive voltage) becomes a predetermined voltage or higher.

Furthermore, although the above description of the fifth example is based on the assumption that the maximum torque control (or a similar control) is realized, it is possible to obtain a desired vector control that is different from the maximum torque control by utilizing the contents of the above description. For example, it is possible to adopt a rotation axis as the qm-axis, which has a phase further leading the rotation axis that matches with the direction of the current vector to be supplied to the motor 1 when the maximum torque control is realized. Thus, iron loss can be reduced, and efficiency of the motor is improved. If the phase of the qm-axis leads appropriately, it is possible to realize a maximum efficiency control.

SIXTH EXAMPLE

In order to prevent a pair of switching elements connected in series from being turned on at the same time, dead time is assigned when the inverter is used for the drive control of the motor. After one of the switching elements (e.g., the upper arm 8u in FIG. 1) is switched from on to off, an output of the signal for turning on the other switching element of the pair (e.g., the lower arm 9u in FIG. 1) is inhibited for a predetermined period of time. This predetermined period of time is the dead time. As an example in which the dead time is attended in particular, a sixth example will be described. Contents describe in the sixth example are utilized with in combination with the other examples described above.

When the dead time is assigned, a voltage drop will occur. The voltage equation of the motor considering the voltage drop is expressed as the following equation (8-1), and it is known that the voltage drop can be modeled by the following equation (8-2). For example, the technique concerning this modeling is disclosed in the document "Parameter Measurement of Sensorless Permanent Magnet Synchronous Motor", Takeshita and three others, Institute of Electrical Engineers of Japan, Papers D, 1999, vol. 119-10, pp. 1184-1191 and in the document "Parameter Identification of PM Motor System at Standstill", Morimoto and other two persons, Institute of Electrical Engineers of Japan, Papers D, 2003, vol. 123-9, pp. 1081-1082. Here, sgn($i_u$) becomes 1 when "$i_u \geq 0$" holds, and it becomes −1 when "$i_u < 0$" holds. Ditto for symbols sgn($i_v$) and sgn($i_w$).

$$\begin{bmatrix} v_d \\ v_q \end{bmatrix} = \begin{bmatrix} R_a & -\omega L_q \\ \omega L_d & R_a \end{bmatrix} \begin{bmatrix} i_d \\ i_q \end{bmatrix} + \quad (8\text{-}1)$$

$$p\begin{bmatrix} L_d & 0 \\ 0 & L_q \end{bmatrix}\begin{bmatrix} i_d \\ i_q \end{bmatrix} + \begin{bmatrix} 0 \\ \omega \Phi_a \end{bmatrix} - \begin{bmatrix} \Delta v_d \\ \Delta v_q \end{bmatrix}$$

$$\begin{bmatrix} \Delta v_d \\ \Delta v_q \end{bmatrix} = \sqrt{\frac{2}{3}}\Delta V \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix} \quad (8\text{-}2)$$

$$\begin{bmatrix} \text{sgn}(i_u) \\ \text{sgn}(i_v) \\ \text{sgn}(i_w) \end{bmatrix}$$

$$= \Delta V \cdot \begin{bmatrix} D_d \\ D_q \end{bmatrix}$$

Symbols $\Delta v_d$ and $\Delta v_q$ are respectively the d-axis component and the q-axis component of the voltage drop due to the assigned dead time. Symbols $\Delta v_d$ and $\Delta v_q$ and $\Delta V$ indicate voltage error between the applied voltages to the motor 1 expressed by the three-phase specified voltage values ($v_u^*$, $v_v^*$ and $v_w^*$) and the actual applied voltages to the motor 1.

This voltage error is generated by the assigned dead time, and it can include a voltage error due to on-voltage of each switching element in the inverter 2.

Influence of the voltage drop $\Delta v_d$ and $\Delta v_q$ due to the dead time becomes large at a standstill and at a low rotation speed, in which the applied voltage to the motor 1 is low. Therefore, estimation accuracy of the rotor position will be deteriorated unless a certain countermeasure is taken. Concerning this, a dead time compensating method is proposed conventionally in non-patent documents including "On-Line Dead-Time Compensation Method for Permanent Magnet Synchronous Motor Drive", Urasaki and other three persons. Institute of Electrical Engineers of Japan, Industrial Application Department, 2002 Convention Lecture Papers, 2002, pp. 1491-1496. However, if this method is used, a load of calculation for compensating the dead time will increase.

The correction voltage for performing the single shunt current detection as described above (the maximum value of the correction voltage in the b-axis direction is the threshold value $\Delta$) can be regarded as a disturbance voltage against for the estimation of the rotor position. Furthermore, it is described above that a size of the minor axis of the ellipse of the superposed voltage is set to a threshold value $\Delta$ or higher in order to suppress the influence of the disturbance voltage. On the other hand, $\Delta v_d$ and $\Delta v_q$ can be rewritten as the following equation (8-3). Therefore, $\Delta v_d$ and $\Delta v_q$ can be regarded as a disturbance voltage due to the assigned dead time that varies by $\Delta_d$ depending on polarities of $i_u$, $i_v$ and $i_w$, in the same manner as the disturbance voltage for realizing the single shunt current detection.

$$\begin{bmatrix} \Delta v_d \\ \Delta v_q \end{bmatrix} = \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix} \quad (8\text{-}3)$$
$$\sqrt{\frac{2}{3}} \Delta V \begin{bmatrix} \operatorname{sgn}(i_u) \\ \operatorname{sgn}(i_v) \\ \operatorname{sgn}(i_w) \end{bmatrix}$$
$$= \begin{bmatrix} \cos\theta & \cos(\theta - 2\pi/3) & \cos(\theta + 2\pi/3) \\ -\sin\theta & -\sin(\theta - 2\pi/3) & -\sin(\theta + 2\pi/3) \end{bmatrix}$$
$$\begin{bmatrix} \Delta_d \cdot \operatorname{sgn}(i_u) \\ \Delta_d \cdot \operatorname{sgn}(i_v) \\ \Delta_d \cdot \operatorname{sgn}(i_w) \end{bmatrix}$$

Thus, if a size of the minor axis of the ellipse of the superposed voltage is set to a value $\Delta_d$ or larger, it is possible to reduce the influence of the assigned dead time to estimation accuracy of the rotor position without compensating the dead time as described in the above non-patent document, in the same manner as the above-mentioned suppression of the influence of the voltage correction for the single shunt current detection. Note that $\Delta_d$ can be set in advance.

This example of structure of the motor driving system considering the dead time is similar to that shown in FIG. 27 or 35, The motor driving system shown in FIG. 27 will be exemplified, and the method of reducing the influence of the assigned dead time will be described. Parts that are not described in particular are the same as those in other examples described above.

The superposed voltage generating portion 25 generates and delivers $v_{h\gamma}^*$ and $v_{h\delta}^*$ expressed by the above equation (2-1), so that "$V_{h\gamma} > V_{h\delta} > \Delta_d$" or "$V_{h\gamma} > V_{h\delta} \geq \Delta_d$" holds. The adders 23 and 24 add $v_{h\gamma}^*$ and $v_{h\delta}^*$ from the superposed voltage generating portion 25 to $v_\gamma^*$ and $v_\delta^*$ from the current control portion 15 so as to calculate $(v_\gamma^* + v_{h\gamma})$ and $(v_\delta^* + v_{h\delta}^*)$ indicating the drive voltage on which the superposed voltage is superposed.

The coordinate converter 22 calculates the three-phase specified voltage values ($v_u^*$, $v_v^*$ and $v_w^*$) from $(v_\gamma^* + V_{h\gamma}^*)$ and $(v_\delta^* + v_{h\delta}^*)$ in the same manner as the first or the second example. In accordance with the three-phase specified voltage values the PWM signals for individual switching elements constituting the inverter 2 are generated. On this occasion, the PWM signals are assigned with the dead time. More specifically, the PWM signals calculated in accordance with the three-phase specified voltage values are corrected considering the dead time, and the corrected PWM signals are supplied to control terminals (a base or a gate) of the individual switching elements in the inverter 2 so that the motor 1 is driven.

Furthermore, the generation of the PWM signal and the assigning of the dead time are realized by the PWM signal generating portion and the dead time assigning portion (not shown) disposed between the coordinate converter 22 and the inverter 2. They can be considered to be included in the controller 3a shown in FIG. 27 or the controller 3b shown in FIG. 35. It is also possible to regard that the PWM signal generating portion and the dead time assigning portion are included in the inverter 2.

In addition, the method of generating the superposed voltage considering the voltage drop due to the dead time as described above in the sixth example can be performed separately from the single shunt current detecting method, so the method is valid to the motor driving system in which the single shunt current detecting method is not adopted. If the single shunt current detecting method is not adopted, two current sensors made up of a Hall device or the like are provided for measuring the U-phase current $i_u$ and the V-phase current $i_v$, so that the coordinate converter 21 (see FIG. 27 or 35) calculates $i_\gamma$ and $i_\delta$ based on the measured values and $\theta_e$. Since the single shunt current detecting method is not adopted, the voltage correction process is not necessary in the coordinate converter 22. More specifically, if the single shunt current detecting method is not adopted, the three-phase specified voltage values are calculated by simply performing a three-phase to two-phase conversion of $(v_\gamma^* + v_{h\gamma}^*)$ and $(v_\delta^* + v_{h\delta}^*)$ based on $\theta_e$, and the dead time is assigned to the PWM signal based on this three-phase specified voltage values. The PWM signal assigned with the dead time is supplied to the control terminal (the base or the gate) of each switching element in the inverter 2.

<<Variations etc.>>

The numeric values designated specifically in the above description are merely examples, and of course, they can be changed to various other values. Hereinafter, Note 1 to Note 5 will be written as variations of the embodiments described above or annotations. Contents of each Note can be combined with others as long as there is no contradiction.

[Note 1]

Although the inverter 2 uses three-phase modulation in the above description, the present invention does not depend on the modulation technique. For example, if the inverter 2 performs two-phase modulation, an energizing pattern will be different from that of the three-phase modulation shown in FIG. 3. Since the lower arm of the minimum phase is always turned on in the two-phase modulation, there is no energizing pattern corresponding to the periods T0-T1 and T6-T7 shown in FIG. 4. After all, however, if the bus current is detected based on the energizing pattern corresponding to the periods T1-T2 and T2-T3, the currents of the maximum phase and the minimum phase can be detected without a difference.

[Note 2]

The individual portions that constitute the above-mentioned motor driving system can freely use every value generated in the motor driving system, as need arises.

[Note 3]

It is arbitrary to select any method for deriving every value to be derived including the above-mentioned various specified values ($i_\gamma^*$, $i_\delta^*$, $v_\gamma^*$, $v_\delta^*$ and the like) and other state quantities ($\theta_e$, $\omega_e$ and the like). More specifically, they may be calculated in the control portion or may be derived from preset table data, for example.

[Note 4]

The entire or a part of the functions of the control portion (3, 3a or 3b) can be realized by using software (programs) incorporated in a general-purpose microcomputer, for example. If software is used for realizing the control portion, the block diagram indicating structures of the individual portions of the control portion is regarded to be a functional block diagram. It is also possible, of course, to constitute the control portion not by software (programs) but by hardware alone or by a combination of software and hardware.

[Note 5]

In this specification, the symbols ($i_\gamma$ and the like) are used for representing the state quantities and the like only by themselves for a simple description. Therefore, in this specification, "$i_\gamma$" and "γ-axis current $i_\gamma$" points the same thing, for example.

The present invention can be applied to every electric device that uses a motor. Since the motor can be driven appropriately at a standstill or a low rotation speed of the motor without using a position sensor, the present invention can be applied appropriately to an electric car or bike using a driving motor, for example.

What is claimed is:

1. A motor control device comprising a current detecting portion for detecting phase current that flows in an armature winding of a stator of a three-phase motor based on current that flows between an inverter for driving the motor and a DC power supply, the motor control device performing a position sensorless vector control for the motor based on a control current that is obtained by a three-phase to two-phase conversion of the phase current based on an estimated rotor position of the motor, the motor control device further comprising:

a superposing portion for superposing a superposed voltage having a predetermined frequency on a drive voltage for driving the motor; and an estimating portion for deriving the estimated rotor position based on a superposed current that is extracted from the control current and flows in the motor in accordance with the superposed voltage, wherein a voltage vector locus of the superposed voltage from the superposing portion presents an ellipse.

2. The motor control device according to claim 1, further comprising a voltage correcting portion for correcting the drive voltage on which the superposed voltage is superposed so that phase currents of two phases can be detected, wherein the motor control device controls the motor in accordance with the voltage after the correction.

3. The motor control device according to claim 2, wherein a minor axis of the ellipse has a size corresponding to quantity of the voltage correction performed by the voltage correcting portion.

4. The motor control device according to claim 2, wherein a size of a minor axis of the ellipse is larger than a maximum value of a b-axis component of quantity of the voltage correction performed by the voltage correcting portion, when the b-axis is orthogonal to a fixed axis of a U-phase, a V-phase or a W-phase.

5. The motor control device according to claim 1, wherein the superposing portion reduces a size of a minor axis of the ellipse in accordance with increase of a rotation speed or the drive voltage of the motor.

6. The motor control device according to claim 1, wherein the superposing portion changes the superposed voltage to be an alternating voltage so that the voltage vector locus changes from the ellipse to a line segment when a rotation speed of the motor becomes a predetermined speed or higher or when the drive voltage becomes a predetermined voltage or higher.

7. The motor control device according to claim 1, wherein a minor axis of the ellipse is parallel with the δ-axis, which is an estimation axis for control corresponding to a q-axis that is orthogonal to magnetic flux generated by a permanent magnet constituting a rotor of the motor.

8. A motor control device for performing a position sensorless vector control of a three-phase motor based on a control current that is obtained by a three-phase to two-phase conversion of a phase current that flows in an armature winding of a stator of the motor, the three-phase to two-phase conversion being based on an estimated rotor position of the motor that is connected to an inverter, the motor control device comprising:

a superposing portion for superposing a superposed voltage having a predetermined frequency on a drive voltage for driving the motor;

an estimating portion for deriving the estimated rotor position based on the superposed current that is extracted from the control current and flows in the motor in accordance with the superposed voltage;

a PWM signal generating portion for generating a PWM signal for a switching circuit that constitutes the inverter in accordance with the drive voltage on which the superposed voltage is superposed; and a dead time assigning portion for assigning dead time to the PWM signal, wherein the motor is driven by an output of the inverter based on the PWM signal to which the dead time is assigned, a voltage vector locus of the superposed voltage from the superposing portion presents an ellipse, and a minor axis of the ellipse has a size corresponding to quantity of a voltage drop due to the dead time.

9. A motor driving system comprising:

a three-phase motor;

an inverter for driving the motor; and a motor control device according to claim 1, for controlling the inverter so as to drive the motor.

10. A motor driving system comprising:

a three-phase motor;

an inverter for driving the motor; and a motor control device according to claim 8, for controlling the inverter so as to drive the motor.

* * * * *